United States Patent [19]

Nakano

[11] Patent Number: 5,278,782
[45] Date of Patent: Jan. 11, 1994

[54] SQUARE ROOT OPERATION DEVICE

[75] Inventor: Hiraku Nakano, Kyoto, Japan

[73] Assignee: Matsushita Electric Industrial Co., Ltd., Osaka, Japan

[21] Appl. No.: 893,089

[22] Filed: Jun. 3, 1992

[30] Foreign Application Priority Data

Jun. 3, 1991 [JP] Japan .................. 3-131001
May 6, 1992 [JP] Japan .................. 4-113309

[51] Int. Cl.$^5$ ............................. G06F 7/38
[52] U.S. Cl. ..................... 364/752; 364/748
[58] Field of Search ............... 364/748, 751, 752

[56] References Cited

U.S. PATENT DOCUMENTS

| | | | |
|---|---|---|---|
| 4,338,675 | 7/1982 | Palmer et al. | 364/748 |
| 4,734,878 | 3/1988 | Sutcliffe | 364/752 |
| 4,878,190 | 10/1989 | Darley et al. | 364/752 |
| 4,939,686 | 7/1990 | Fandrianto | 364/752 |
| 4,949,296 | 8/1990 | Malinowski | 364/752 |
| 4,999,801 | 3/1991 | Katsuno | 364/748 |
| 5,060,182 | 10/1991 | Briggs et al. | 364/752 |
| 5,128,891 | 7/1992 | Lynch et al. | 364/752 X |
| 5,159,566 | 10/1992 | Briggs et al. | 364/752 |

FOREIGN PATENT DOCUMENTS

2-25924  3/1990  Japan .

OTHER PUBLICATIONS

P. Montuschi et al., "On The Efficient Implementation Of Higher Radix Square Root Algorithms", Dipartimento di Automatica e Informatica, pp. 154–161, IEEE Symposium on Computer Arithmetic, 1989.

*Primary Examiner*—Long T. Nguyen
*Assistant Examiner*—Chuong D. Ngo
*Attorney, Agent, or Firm*—Willian Brinks Olds Hofer Gilson & Lione

[57] ABSTRACT

By taking a high-order position in an operand which is normalized in a two bit unit by means of and output from a normalizing circuit as an address, an approximation of square root's reciprocal is indexed by means of a table information storing unit. By multiplying an output of a residue holding circuit which takes a 0th residue as a normalized operand by the approximation of square root's reciprocal by using a multiplying circuit, a partial square root value is found. The individual partial square root values each having a overlapped bit at each iteration are merged with one another by means of a digit aligning circuit and an adder. A residue for a next step in iterative computation is found by subtracting a product of a merged square root value and a partial square root value from a residue by means of an inverting circuit, a multiplicand generator, a (R+S×T) operation unit.

30 Claims, 33 Drawing Sheets

FIG. 2A

| | bit number | 7 7766<br>2 1098 |
|---|---|---|
| | input<br>normalized significand | |
| | residue(0)<br>square root's reciprocal | |
| | residue(0) * reciprocal<br>partial square root b1<br>b1(multiplicand)<br>left shift 11-bit residue(0)<br>b1 * b1 | 0 0011 |
| | residue(1) | |
| | residue(1) * reciprocal<br>partial square root b2<br>( b1*2 + b2 )(multiplicand)<br>left shift 11-bit residue(1)<br>( b1*2 + b2 ) * b2 | 0 0000 |
| | residue(2) | |
| | residue(2) * reciprocal<br>partial square root b3<br>{( b1 + b2 )*2 + b3 }<br>left shift 11-bit residue(2)<br>{( b1 + b2 )*2 + b3 } * b3 | 0 0001 |
| | residue(3) | |

FIG. 2B

| 6666 | 6666 | 5555 | 5555 | 5544 | 4444 | 4444 | 3333 | 3333 |
|------|------|------|------|------|------|------|------|------|
| 7654 | 3210 | 9876 | 5432 | 1098 | 7654 | 3210 | 9876 | 5432 |

|      |      | 0111 | 1100 | 1000 | 1000 | 1011 | 1000 | 1001 | 1110 |
|------|------|------|------|------|------|------|------|------|------|
|      |      |      | 0110 | 0010 | 1110 | 0010 | 0111 | 1010 |      |

|      |      |      | 0110 | 0010 | 1110 | 0010 | 0111 | 1010 |

| 1000 | 0100 | 0000 | 0111 | 0111 | 1111 | 0011 | 1100 | 0001 |

| 0000 | 0000 | 0000 | 0111 | 0000 | 1000 | 0000 | 0000 | 0000 |
| 0011 | 0001 | 0111 | 0001 | 0011 | 1101 | 0101 | 1110 | 0001 |
| 0011 | 0001 | 0111 | 0000 | 0100 | 0000 | 0000 | 0000 | 0000 |

|      |      |      | 0000 | 1111 | 1101 | 0101 | 1110 | 0001 |

| 1001 | 0000 | 0010 | 0001 | 1010 | 0000 | 1001 | 0000 | 0101 |

| 0000 | 0000 | 0000 | 1110 | 0001 | 0000 | 0001 | 0010 | 0000 |
| 0000 | 0111 | 1110 | 1010 | 1111 | 0000 | 1001 | 0010 | 1110 |
| 0000 | 0111 | 1110 | 1001 | 0000 | 1010 | 0010 | 0000 | 0000 |

|      |      |      | 0001 | 1110 | 0110 | 0111 | 0010 | 1110 |

| 0001 | 0100 | 1011 | 1001 | 0000 | 0100 | 1100 | 0110 | 0000 |

| 0000 | 0000 | 0000 | 1110 | 0001 | 0000 | 0010 | 0100 | 0000 |
| 0000 | 1111 | 0011 | 0011 | 1001 | 0111 | 0100 | 1111 | 1000 |
| 0000 | 1111 | 0011 | 0111 | 0111 | 0110 | 1111 | 1000 | 1010 |

|      |      |      | 1100 | 0010 | 0000 | 0101 | 0110 | 1101 |

FIG. 3A bit number

```
7 7766
2 1098
``` residue(3)

residue(3) * reciprocal
partial square root b4
 { ( b1 + b2 + b3 )*2 + b4 }
left shift 11bit residue(3)
 { ( b1 + b2 + b3 )*2 + b4 } * b4

1 1101 residue(4)

residue(4) * reciprocal
partial square root b5
 { ( b1 + b2 + b3 + b4 )*2 + b5 }
left shift 11bit residue(4)
 { ( b1 + b2 + b3 + b4 )*2 + b5 } * b5

1 1111 residue(5)

| | bit number | 8888 7777 7777 7766 |
| --- | --- | --- |
| | | 3210 9876 5432 1098 | input
normalized significand residue(0)
square root's rociprocal residue(0) * reciprocal     0000 0100 1110 1110
partial square root b1
b1 (multiplicand)
b1 * b1 residue(1)
left shift 11-bit residue(1)

residue(1) * reciprocal     1111 1001 1001 0110
partial square root b2
( b1*2 + b2 )(multiplicand)
( b1*2 + b2 ) * b2 residue(2)
left shift 11-bit residue(2)

residue(2) * resiprocal     0000 1010 1101 0000
partial square root b3
{ ( b1 + b2 )*2 + b3 }
{ ( b1 + b2 )*2 + b3 } * b3 residue(3)

FIG. 8B

| 6666 | 6666 | 5555 | 5555 | 5544 | 4444 | 4444 | 3333 | 3333 |
|------|------|------|------|------|------|------|------|------|
| 7654 | 3210 | 9876 | 5432 | 1098 | 7654 | 3210 | 9876 | 5432 |
|      | 0000 | 0000 | 0000 | 0110 | 0001 | 0100 | 1100 | 1011 |
|      | 0110 | 0001 | 0100 | 1100 | 1011 | 0101 | 0111 | 1110 |
| 0000 | 0110 | 0001 | 0100 | 1100 | 1011 | 0101 | 0111 | 1110 |
| 1011 | 0101 | 1011 | 1110 | 0101 | 1101 | 0110 | 0010 | 0111 |
| 0000 | 0000 | 0000 | 0001 | 0011 | 1011 | 1100 | 0000 | 0000 |
| 0000 | 0110 | 0001 | 0101 | 1100 | 1000 | 0100 | 0000 | 0000 |
| 1111 | 1111 | 1111 | 1111 | 0000 | 0011 | 0001 | 0111 | 1110 |
| 1111 | 1000 | 0001 | 1000 | 1011 | 1111 | 0110 | 1100 | 0010 |
| 1111 | 0010 | 1010 | 0011 | 0001 | 0011 | 1000 | 0111 | 0000 |
| 0000 | 0000 | 0000 | 0010 | 0111 | 0111 | 0110 | 0110 | 0101 |
| 1111 | 1000 | 0001 | 0111 | 0001 | 0100 | 1100 | 0111 | 1100 |
| 0000 | 0000 | 0000 | 0001 | 1010 | 1010 | 1010 | 0100 | 0101 |
| 0000 | 1101 | 0101 | 0101 | 0010 | 0010 | 1110 | 1011 | 0100 |
| 0110 | 0001 | 1100 | 0110 | 1001 | 0111 | 0111 | 0101 | 0000 |
| 0000 | 0000 | 0000 | 0010 | 0111 | 0111 | 0100 | 1100 | 1011 |
| 0000 | 1101 | 0101 | 0100 | 1111 | 0110 | 1011 | 0100 | 1011 |
| 0000 | 0000 | 0000 | 0000 | 0010 | 1100 | 0011 | 0110 | 1000 |

| | | |
|---|---|---|
| bit number | 8888<br>3210 | 7777 7777 7766<br>9876 5432 1098 | input
normalized significand residue(0)
square root's reciprocal residue(0) * reciprocal          0001   1100 0010 0000
partial square root b1
b1 (multiplicand)
b1 * b1 residue(1)
left shift 11-bit residue(1)

residue(1) * reciprocal          0000   0100 1000 0001
partial square root b2
( b1*2 + b2 )(multiplicand)
( b1*2 + b2 ) * b2 residue(2)
left shift 11-bit residue(2)

residue(2) * reciprocal          0000   1000 1010 0101
partial square root b3
{( b1 + b2 )*2 + b3}
{( b1 + b2 )*2 + b3} * b3 residue(3)

FIG. 17B

| | | | | | | | | |
|---|---|---|---|---|---|---|---|---|
| 6666 | 6666 | 5555 | 5555 | 5544 | 4444 | 4444 | 3333 | 3333 |
| 7654 | 3210 | 9876 | 5432 | 1098 | 7654 | 3210 | 9876 | 5432 |

| | | | | | | | | |
|---|---|---|---|---|---|---|---|---|
|      | 0111 | 1100 | 1000 | 1000 | 1011 | 1000 | 1001 | 1110 |
| 0011 | 0001 | 0111 | 0001 | 0011 | 1101 | 0101 | 1110 | 0001 |
| 0011 | 0001 | 0111 | 0001 | 0011 | 1101 | 0101 | 1110 | 0001 |
| 0011 | 1011 | 1111 | 1001 | 1110 | 0000 | 1001 | 0000 | 0101 |
| 0000 | 0000 | 0000 | 0111 | 0000 | 1000 | 0000 | 0000 | 0000 |
| 0011 | 0001 | 0111 | 0000 | 0100 | 0000 | 0000 | 0000 | 0000 |
| 0000 | 0000 | 0000 | 0000 | 1111 | 1101 | 0101 | 1110 | 0001 |
| 0000 | 0111 | 1110 | 1010 | 1111 | 0000 | 1001 | 0010 | 1110 |
| 0000 | 1101 | 0000 | 0100 | 1000 | 0010 | 1110 | 0110 | 0000 |
| 0000 | 0000 | 0000 | 1110 | 0001 | 0000 | 0001 | 0010 | 0000 |
| 0000 | 0111 | 1110 | 1001 | 0000 | 1010 | 0010 | 0000 | 0000 |
| 0000 | 0000 | 0000 | 0001 | 1110 | 0110 | 0111 | 0010 | 1110 |
| 0000 | 1111 | 0011 | 0011 | 1001 | 0111 | 0100 | 1111 | 1000 |
| 1100 | 1000 | 0010 | 0110 | 0011 | 0000 | 0111 | 1111 | 1000 |
| 0000 | 0000 | 0000 | 1110 | 0001 | 0000 | 0010 | 0100 | 0000 |
| 0000 | 1111 | 0011 | 0111 | 0111 | 0110 | 1111 | 1000 | 1010 |
| 1111 | 1111 | 1111 | 1100 | 0010 | 0000 | 0101 | 0110 | 1101 |

| | | |
|---|---|---|
| bit number | 8888 7777 7777 7766 | |
| | 3210 9876 5432 1098 | | residue(3)
left shift 11-bit residue(3)

residue(3) * reciprocal   1110  1110 0101 1111
partial square root b4
{ ( b1 + b2 + b3 )*2 + b4 }
{ ( b1 + b2 + b3 )*2 + b4 } * b4 residue(4)
left shift 11-bit residue(4)

residue(4) * resiprocal   1111  1000 0010 0100
partial square root b5
{ ( b1 + b2 + b3 + b4 )*2 + b5 }
{ ( b1 + b2 + b3 + b4 )*2 + b5 } * b5 residue(5)

| | bit number | 8888 7777 7777 7766 |
| | | 3210 9876 5432 1098 | input
normalized significand residue(0)
square root's reciprocal residue(0) * reciprocal            0001  1110 0001 1001
partial square root b1
b1 (multiplicand)
b1 * b1 residue(1)
left shift 11-bit residue(1)

residue(1) * reciprocal            0000  1010 0111 1110
partial square root b2
( b1*2 + b2 )(multiplicand)
( b1*2 + b2 ) * b2 residue(2)
left shift 11-bit residue(2)

residue(2) * resiprocal            0011  0000 0101 0000
partial square root b3
{ ( b1 + b2 )*2 + b3 }
{ ( b1 + b2 )*2 + b3 } * b3 residue(3)

FIG. 20B

| 6666 | 6666 | 5555 | 5555 | 5544 | 4444 | 4444 | 3333 | 3333 |
| --- | --- | --- | --- | --- | --- | --- | --- | --- |
| 7654 | 3210 | 9876 | 5432 | 1098 | 7654 | 3210 | 9876 | 5432 |
|      | 0001 | 0000 | 0100 | 1100 | 0100 | 1110 | 0100 | 1101 |
| 0011 | 1000 | 1001 | 1100 | 1001 | 1011 | 1000 | 1000 | 1101 |
| 0011 | 1000 | 1001 | 1100 | 1001 | 1011 | 1000 | 1000 | 1101 |
| 0010 | 1011 | 0010 | 0101 | 0001 | 1010 | 0111 | 0001 | 0111 |
| 0000 | 0000 | 0000 | 0111 | 1000 | 0110 | 0000 | 0000 | 0000 |
| 0011 | 1000 | 1001 | 1010 | 0010 | 0100 | 0000 | 0000 | 0000 |
| 0000 | 0000 | 0000 | 0010 | 0111 | 0111 | 1000 | 1000 | 1101 |
| 0001 | 0011 | 1011 | 1100 | 0100 | 0110 | 1100 | 0011 | 1110 |
| 0001 | 1010 | 0111 | 0011 | 1000 | 1011 | 1111 | 1000 | 1110 |
| 0000 | 0000 | 0000 | 1111 | 0000 | 1100 | 0010 | 1001 | 1110 |
| 0001 | 0011 | 1011 | 0000 | 1110 | 1010 | 1100 | 1100 | 0010 |
| 0000 | 0000 | 0000 | 1011 | 0101 | 1011 | 1111 | 0111 | 1100 |
| 0101 | 1010 | 1101 | 1111 | 1011 | 1110 | 0101 | 1111 | 0000 |
| 0111 | 0010 | 1011 | 1011 | 1000 | 1100 | 0000 | 0101 | 0000 |
| 0000 | 0000 | 0000 | 1111 | 0000 | 1100 | 0101 | 0011 | 1101 |
| 0101 | 1010 | 1110 | 0000 | 0111 | 0010 | 0101 | 0111 | 0110 |
| 1111 | 1111 | 1111 | 1111 | 0100 | 1100 | 0000 | 0111 | 1001 |

| bit number | 8888 7777 7777 7766 |
|---|---|
|  | 3210 9876 5432 1098 | residue(3)
left shift 11-bit residue(3)

residue(3) * reciprocal    1111 1101 0000 0010
partial square root b4
{ ( b1 + b2 + b3 )*2 + b4 }
{ ( b1 + b2 + b3 )*2 + b4 } * b4 residue(4)
left shift 11-bit residue(4)

residue(4) * resiprocal    0001 0100 1010 1100
partial square root b5
{ ( b1 + b2 + b3 + b4 )*2 + b5 }
{ ( b1 + b2 + b3 + b4 )*2 + b5 } * b5 residue(5)

FIG. 21B

| 6666 | 6666 | 5555 | 5555 | 5544 | 4444 | 4444 | 3333 | 3333 |
|------|------|------|------|------|------|------|------|------|
| 7654 | 3210 | 9876 | 5432 | 1098 | 7654 | 3210 | 9876 | 5432 |

| 1111 | 1111 | 1111 | 1111 | 0100 | 1100 | 0000 | 0111 | 1001 |
| 1111 | 1010 | 0110 | 0000 | 0011 | 1100 | 1111 | 0011 | 1000 |

| 1000 | 1000 | 1000 | 0111 | 1100 | 1001 | 1010 | 1110 | 1000 |

| 0000 | 0000 | 0000 | 1111 | 0000 | 1100 | 0101 | 0011 | 1111 |
| 1111 | 1010 | 0101 | 1011 | 0110 | 0000 | 1000 | 0101 | 1110 |

| 0000 | 0000 | 0000 | 0100 | 1101 | 1100 | 0110 | 1101 | 1001 |
| 0010 | 0110 | 1110 | 0011 | 0110 | 1100 | 1110 | 1111 | 0111 |

| 1110 | 1011 | 1101 | 1011 | 1011 | 0000 | 1100 | 0000 | 1101 |

| 0000 | 0000 | 0000 | 1111 | 0000 | 1100 | 0101 | 0011 | 1111 |
| 0010 | 0110 | 1101 | 1010 | 1101 | 0100 | 1011 | 1011 | 0111 |

| 0000 | 0000 | 0000 | 1000 | 1001 | 1000 | 0011 | 0011 | 1111 |

SQUARE ROOT OPERATION DEVICE

BACKGROUND OF THE INVENTION

This invention pertains to square root operation devices for use in data processors.

In many of conventional square root operation devices, square rooting is executed by the Newton-Raphson method. The first process of finding the square root of a numeric value A is to find out $1/\sqrt{A}$, and the next process is to result by A so as to obtain $\sqrt{A}$. In the Newton-Raphson method, $1/\sqrt{A}$ is found by means of convergent which the number of iteration to be carried out until a convergent condition is reached becomes lower as the initial value of a reciprocal approaches a true value. In such high-speed square root operation devices as set forth in U.S. Pat. No. 499,801 and relevant Japanese Patent Pub. No. 25924, a target (i.e., $1/\sqrt{A}$) is reached after convergent calculation about three or four times.

Additionally, there is a known square root operation device different from the foregoing type, which utilizes a technique similar to a square root computation based on "calculation-on-paper". In such a technique, a square is partially found by means of iterative calculation in descending order by the same number of digits each time, wherein the radicand is an initial, or the 0th partial residue, the (i+1)th partial square root is the i-th partial residue and the first to i-th partial square root values, the multiplicand is obtained by adding the (i+1)th partial square root value to twice the first to partial square root values, the product is found by taking the (i+1)th partial residue as a multiplier, and the partial residue is determined by subtracting the product from the i-th partial square root value. An example of square root operation devices based on this technique is shown in the paper of P. Montuschi and L. Giminiera, "ON EFFICIENT IMPLEMENTATION OF HIGHER RADIX SQUARE ROOT ALGORITHMS," Proc. 9th IEEE Symposium on Computer pp, 154-161, September 1989.

However, in the foregoing square root operation device according to the Newton-Raphson method, the significand part of a floating-point number input operand is input in a multiplying circuit as a multiplicand and a multiplier. Therefore, when finding the square root of a double-precision floating-point number in an IEEE standard, a 53×53 multiplying circuit, which corresponds to the bit length of a significand part with an addition of a leading bit, is required. When multiplication instructions and square root operation instructions are not executed at the same time and even when the multiplying circuit for executing a multiplication instruction is used for the execution of a square root operation instruction, no difficulties However, in the case that there is no data interdependence between the multiplication instruction and the square root operation instruction, and that both the instructions are carried out at the same time, a problem that hardware materials increase greatly arises due to the provision of such a 53×53 bit multiplying circuit for square root operation.

In the square root operation device proposed by P. Montuschi et al, the number of bits obtained by a single iterating calculation is two. Furthermore, when finding out the square root of a double-precision floating-point number in an IEEE standard, it is necessary to execute iterative calculation twenty-eight times in order that a 55-bit root made up of 53 bits for a significand part 53 bit for a guard bit and one bit for a round bit. As a result, such a proposed square root operation device is not suitable for high-speed operations.

The present invention provides a square root operation device by means of which square roots are founded at although the same uses an operand length for fixed-point numbers and a multiplying circuit smaller than the bit length of a significand part for floating-point numbers, as the bit length of a multiplier.

DISCLOSURE OF THE INVENTION

In order to overcome the foregoing problems, the present invention was made to provide a square root operation device comprising a table information storing means for indexing an approximation of square root's reciprocal on an input operand, a residue holding means for holding a residue when a square root is found by means of iteration of a fixed number of bits in descending order, a multiplying means for executing a multiplication wherein the residue output from the residue holding means serves as a multiplicand and the approximation of square root's reciprocal output from the table information storing means, as a multiplier, a merged square root value holding means for holding a merged square root as a combination of individual partial square root values at each iteration, taking a high-order position of the product output from the multiplying means as a partial square root value, and a multiplicand generating means for generating data resulting from lumping the merged square root value output from the merged square root value holding means and the square root output from the multiplying means, as a multiplicand. The square root operation device of the invention further includes an operation means with the following functions. In other words, this operation means executes the operation $(R-S\times T)$ by inputting a residue output from the residue holding means, a multiplicand output from the multiplicand generating means and the partial square root value (T) output from the multiplying means respectively.

To improve the speed of operation, a partial square root value calculation adding means is provided at an inputting stage of the multiplying means or the $(R-S\times T)$ operating means. The partial square root value calculation adding means executes a rounding off at a place lower than the least significant bit in the partial square root value by one bit by inputting high-order positions of the output thereof. Before describing the fact that square root operation can be executed by the above structure, a square root operation method employed in the present invention will be described. The square rooting process on an exponent part in a floating-point number is simple, which will be detailed later in preferred embodiments of the invention, accordingly. Here, square rooting of a significand part in a floating-point number or square rooting of a positive fixed-point number will be described, wherein the radicand A is normalized in a two bit unit and satisfies the equation ( $$2^{-2} \leq A < 1 \tag{1}$$

The square root of A is group-divided in a fixed number of bits, n, which is represented in the equation (2this time, $a_{ij}$ is 0 or 1. Particularly, from the equation (1).

$$\sqrt{A} = a_1 + a_2 + a_3 + a_4 + a_5 + \ldots \tag{2}$$

-continued
$$(a_1 = 2^{-1n}(a_{11} \cdot 2^{n-1} + a_{12} \cdot 2^{n-2} + \ldots + a_{1n} \cdot 2^0))$$

On the contrary, the equation (3) is obtained by squaring the right and left sides of the equation (2

$$A = (a_1 + a_2 + a_3 + a_{a5} + \ldots)^2 \quad (3).$$

M is taken as an approximation of square root's reciprocal of A. The precision of M shall satisfy the conditions of the equation (4).

$$|\sqrt{A} \cdot M - 1| \leq 2^{-(n+1)} \quad (4)$$

Then, with the following steps, the square root of A can be found. The equation (4) is a sufficient condition for finding out a partial square root value by an n-bit.

(i) Multiply A ($=R_0$) by M. Then, a fixed number bits, n at high-order positions in the result is taken as b (ii) After calculating the equation: $R_1 = R_0 - b_1 \times b_1$. left-shift $R_1$ by a given n-bit of (i).

Thereafter, iterate (iii) and (iv) as required.

(iii) Multiply $R_i$ by M. Then, a fixed number of bits, n+1 at high-order positions in the result is taken as $b_{i+1}$, provided $b_{i+1}$ is taken from a higher-order position than $b_1$ by one bit and one extra bit shall be taken at a further higher-order position for making correction for $b_i$.

(iv) After calculating the equation:

$$R_{i+1} = R_i - \{(b_1 + \ldots + b_i) \times 2 + b_{i+1}\} \times b_{i+1},$$

left-shift $R_{i+1}$ by a given n-bit of (i).

The fact that the square root of A can be found by the foregoing processes is shown by proving that the following (Matter A) holds.

Matter A

When the sum of $b_1 + b_2 + \ldots + b_i$ is compared with that of $a_1 + a_2 + \ldots + a_i$, the former is equal to, greater than by $2^{-in}$, or lower than by $2^{-in}$ the latter.

Proof

If i=1, the following equation (5) holds by the equation (3).

$$a_1 \times \sqrt{A} \leq A < (a_1 + 2^{-n}) \times \sqrt{A} \quad (5)$$

Multiply both sides of the equation (5) by M to give the equation (6).

$$a_1 \times (1 - 2^{-(n+1)}) \leq A \times M < (a_1 + 2^{-n}) \times (1 + 2^{-(n+1)}) \quad (6)$$

Since the n-bits of the places of $2^{-1}$ to $2^{-n}$ of each of the right and left sides of the equation (6) are $a_1 - 2^{-n}$ and $a_1 + 2^{-n}$, the (Matter A) holds when i=1 if the n-bit at a place corresponding to $A \times M$ is selected as $b_1$.

Next, assume that the (Matter A) holds until i≦k. A k-th partial residue $R_k$ can be expressed by the equation (7).

$$R_k = R_{k-1} - \{(b_1 + b_2 + \ldots + b_{k-1}) \times 2 + b_k\} \times b_k$$
$$= R_{k-2} - \{(b_1 + b_2 + \ldots + b_{k-2}) \times 2 + b_{k-1}\} \times b_{k-1}$$
$$- \{(b_1 + b_2 + \ldots + b_{k-1}) \times 2 + b_k\} \times b_k \quad (7)$$
$$\vdots$$
$$= R_0 - b_1 \times b_2$$
$$- \{b_1 \times 2 + b_2\} \times b_2$$
$$\vdots$$
$$- \{(b_1 + b_2 + \ldots + b_{k-2}) \times 2 + b_{k-1}\} \times b_{k-1}$$
$$- \{(b_1 + b_2 + \ldots + b_{k-1}) \times 2 + b_k\} \times b_k$$
$$= R_0 - (b_1 + b_2 + \ldots + b_k)^2$$
$$= (a_1 + a_2 + a_3 + \ldots)^2 - (b_1 + b_2 + \ldots + b_k)^2$$
$$= \{(a_1 + a_2 + \ldots + a_k) + (b_1 + b_2 + \ldots + b_k) + a_{k+1} + \ldots\} \times$$
$$\{(a_1 + a_2 + \ldots + a_k) - (b_1 + b_2 + \ldots + b_k) + a_{k+1} + \ldots\}$$

(i) In the case of $b_1 + b_2 + \ldots + b_k = a_1 + a_2 + \ldots + a_k$:

$$(2\sqrt{A} - a_{k+1}) \times a_{k+1} \leq R_k < 2\sqrt{A} \times (a_{k+1} + 2^{-(k+1)n}) \quad (8)$$

As for the left side of the equation (8), if $(2\sqrt{A} - a_{k+1} - X) \times (a_{k+1} + X)$ is considered as a quadratic function of X, it is a monotonically increasing function in the range of $[0, 2^{-(k+1)n}]$ since the minimum is taken when X=0. Multiply both sides of the equation (8) by M to give the following equation (9).

$$2(1 - 2^{-(n+1)} - a_{k+1}) \times a_{k+1} \leq R_k \times M < 2(1 + 2^{-(n+1)}) \times (a_{k+1} + 2^{-(k+1)n}) \quad (9)$$

The n-bit at the places of $2^{-kn}$ to $2^{-(k+1)n+1}$ each of the right and left sides of the equation (9) are $a_{k+1} - 2^{-(k+1)n}$ and $a_{k+1} + 2^{-(k+1)n}$. Thus, the (Matter A) also holds when i=k+1 if the n-bit at a corresponding place to $R_k \times M$ is taken as $b_{k+1}$.

(ii) In the case of $$b_1 + b_2 + \ldots + b_k = a_1 + a_2 + \ldots + a_k + 2^{-kn}; \quad (10)$$

$$(2\sqrt{A} + 2^{-kn}) \times (-2^{-kn} + a_{k+1}) < R_k <$$
$$2\sqrt{A} \times (-2^{-kn} + a_{k+1} + 2^{-(k+1)n})$$

For the left side of the equation (10), the multiplier is negative in the last expression of the equation (7), in this case. Thus, the absolute value of the product is evaluated a little greater by taking $2^{-kn} - (a_{k+1} + a_{k+2} + \ldots) = 0$ from $2^{-kn} > a_{k+1} + a_{k+2} + \ldots$ Multiply both sides of the equation (10) by M to give the equation (11).

$$2(1 - 2^{-(n+1)} + 2^{-kn}) \times (-2^{-kn} + a_{k+1}) < R_k \times$$
$$M < 2(1 - 2^{-(n+1)}) \times (-2^{-kn} + a_{k+1} + 2^{-(k+1)n}) \quad (11).$$

If a sign bit is added at a higher-order places than $2^{-kn}$, the n-bit at the places of $2^{-kn}$ to $2^{-(k+1)n+1}$ of each of the right and left sides of the equation (11) is:

$$-2^{-kn} + a_{k+1} - 2^{-(k+1)n} \text{ and}$$
$$-2^{-kn} + a_{k+1} + 2^{-(k+1)n}.$$

Thus, when $b_1 + b_2 + \ldots + b_{k+1}$ is compared with $a_1 + a_2 + \ldots + a_{k+1}$, the former is equal to, greater than by $2^{-(k+1)n}$, or lower than by $2^{-(k+1)n}$ the latter. Therefore, the (Matter A) also holds when i=k+1.

(iii) In the case of $b_1 + b_2 + \ldots + b_k = a_1 + a_2 + \ldots + a_k - 2^{-kn}$:

$$(2\sqrt{A} - 2 \cdot 2^{-kn}) \times (2^{-kn} + a_{k+1}) < R_k < \quad (12)$$

$$(2\sqrt{A} - 2^{-kn}) \times (2^{-kn} + a_{k+1} + 2^{-(k+1)n})$$

$$2(1 - 2^{-(n+1)} - 2^{-kn+1}) + (2^{-kn} + a_{k+1}) < R_k \times M < \quad (13)$$

$$2(1 + 2^{-(n+1)} - 2^{-kn}) \times (2^{-kn} + a_{k+1} + 2^{-(k+1)n})$$

If one bit is added at a high-order position as the n-bit at the places of $2^{-kn}$ to $2^{-(k+1)n+1}$ of each of the right and left sides of the equation (13) and $2^{-kn+1}$, $2^{-kn} + a_{k+1} - 2^{-(k+1)n}$ and $2^{-kn} + a_{k+1} + 2^{-(k+1)n}$ are given. Compared with $a_1 + a_2 + \ldots + a_{k+1}$, $b_1 + b_2 + \ldots + b_{k+1}$ is equal to, greater than by $2^{-(k+1)n}$, or lower than by $2^{-(k+1)n}$ the latter. Therefore, the (Matter A) holds even when $i = k+1$.

If it is presumed that the (Matter A) holds $i \leq k$ by the above (i), (ii) and (iii), the fact that the (Matter A) holds also when $i = k+1$ is derived.

In the case of $i = 1$, the fact that the (Matter A) holds is previously proved. Thus, the (Matter A) holds on any natural number $i$ by mathematical induction.

The approximation of square root's reciprocal of A is stored in a table information storing means, and a high-order bit in A is indexed as an address. The product of $R_0 (= A)$ stored as a 0-th residue in a residue holding means and the approximation is calculated by a multiplying means to give $b_1$ as a high-order bit of the product. Next, a multiplicand generating means outputs $b_1$ at a first iterative computation. $R_0$, $b_1$ and $b_1$ are fed into a $(R - S \times T)$ operating means to give $R_1$. $b_1$ is stored in a merged square root value holding means. $R_1$ is left-shifted by a fixed number of bits and is stored in the residue holding means. Then, the following processes are repeatedly carried out, taking $i \geq 1$, until the bit length of a merged square root value becomes greater than that of a target square root.

The product of $R_i$ stored as an i-th residue in the residue holding means and the approximation of the square root's reciprocal of A is calculated by the multiplying means to give $b_{i+1}$ as a high-order bit of the product. Next, in a multiplicand generating means, $(b_1 + \ldots + b_i)$ is left-shifted one bit place, is merged with $b_{i+1}$, and is output as a multiplicand. $R_i$, $\{b_{i+1} + \ldots + b_i) \times 2 + b_{i+1}\}$ and $b_{i+1}$ are input in the $(R - S \times T)$ operating means to give $R_{i+1}$. Next, $(b_1 + \ldots + b_{i+1})$ is stored in the merged square root value holding means. $R_{i+1}$ is left-shifted by a fixed number of bit places and then is stored in the residue holding means.

Additionally, the same result can be obtained by storing $R_{i+1}$ in the residue holding means without left-shifting it by a fixed number of bit places and by left-shifting $R_i$ by a fixed number of bit places just prior to calculating $R_i - \{(b_1 + \ldots + b_i) \times 2 + b_{i+1}\} \times b_{i+1}$ in the next iterative computation.

As described above, the present invention comprises the residue holding means, the table information storing means for storing the approximation of square root's reciprocal. the multiplying means for finding out a partial square root, and the $(R - S \times T)$ operating means for finding the products, lining up in ascending order, of a merged square root value and a partial square root value by means of iterative computation. With such an arrangement, square root operations are executed using an operand length in the case of a fixed-point number, or a multiplying circuit smaller than a bit length of a significant part in the case of a floating-point number.

Therefore, the present invention is able to provide a data processor capable of carrying out the concurrent execution of a multiplication instruction and a square root operation without increasing hardware materials more than necessary.

Furthermore, the data processor of the invention provides performance not inferior to conventional square root operation devices in accordance with the Newton-Raphson method. Moreover, by inputting the high-order positions in a product output from the multiplying means or the $(R - S \times T)$ operating means, rounding off is carried out at a place lower than the least significant bit of a partial square root by one bit. The speed of operation can be improved by the provision of a partial square root calculation adding means.

In addition to the above, in the case of using a guard bit, a round bit and a sticky bit to round off a resulting square root, one bit below LSB at a time is taken as a guard bit and a round bit, and then the remaining bits and each bit in the residue are ORed, thereby giving a sticky bit. Accordingly, unlike the Newton-Raphson method, going over accounts is eliminated in the present invention.

BRIEF DESCRIPTION OF THE DRAWINGS

The present invention will be more clearly understood with the accompanied drawings wherein:

FIGS. 2A-2C show the output of each construction means in FIG. 1 using specific numeric values.

FIGS. 3A-3C show the output of each construction means continued from the numeric values in FIGS. 2A-2C.

FIGS. 8A-8C show the output of each construction means in FIG. 7 using specific numeric values.

FIGS. 17A–17C show the output of each construction means in FIG. 16 using specific numeric values.

FIGS. 18A–18C show the output of each construction means continued from the numeric values in FIGS. 17A–17C.

FIGS. 20A–20C show the output of each construction means in FIG. 19 using specific numeric values.

FIGS. 21A–21C show the output of each construction means continued from the numeric values in FIGS. 20A–20C.

PREFERRED EMBODIMENTS

In the first place, common particulars in each embodiment will be described.

In each of the preferred embodiments, radicand A is treated in the range of the following equation (14) which is obtained by right-shifting the point two bit places from the equation (1) in order that a resulting square root takes the same position as that of the point of a significant part of a floating-point in an IEEE standard.

$$1 \leq A < 2^2 \tag{14}$$

The approximation of square root's reciprocal is indexed by taking 12 bits (x indicates 0 or 1) as an address as shown in the equation (15).

$$01, xxxxxxxxxx \\ 1x, xxxxxxxxxx \tag{15}$$

Figure 13:
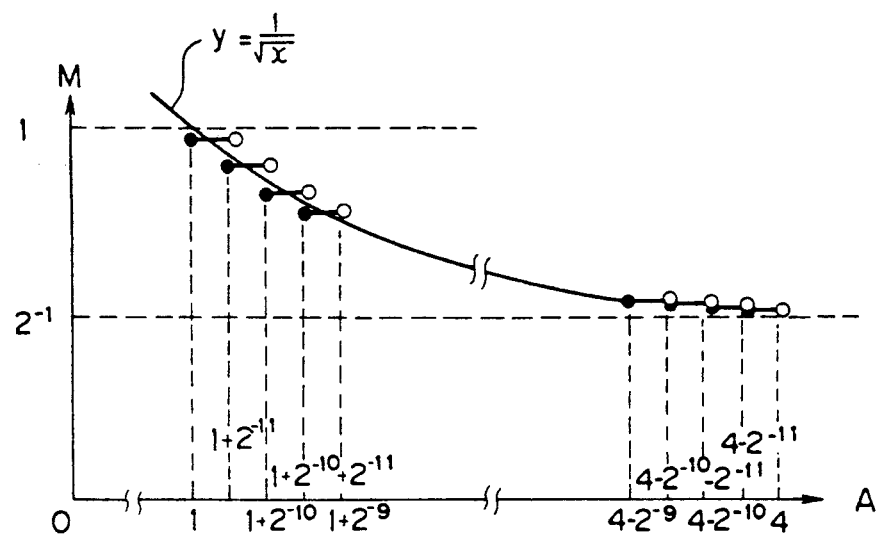
FIG. 13 shows a relation between a radicand and an approximation of square root's reciprocal, M.
Figure 14:
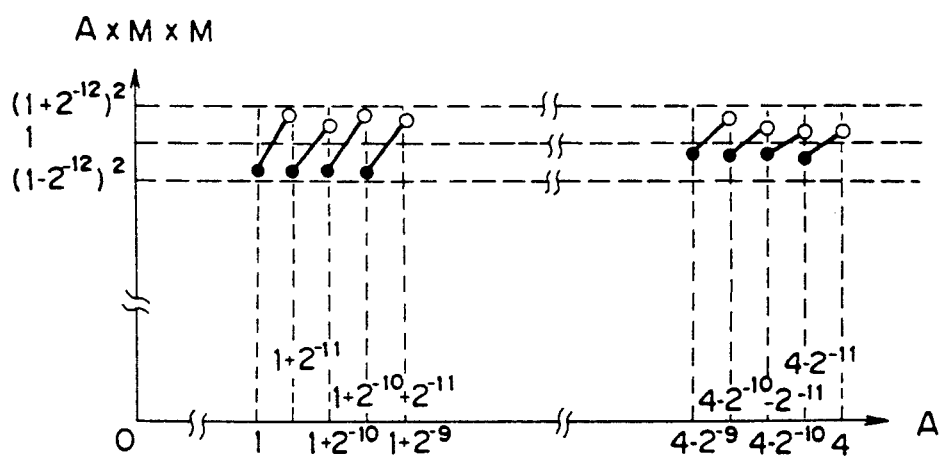
FIG. 14 shows a relation between A and $A \times M \times M$ when A is twice multiplied by M.
Figure 15:
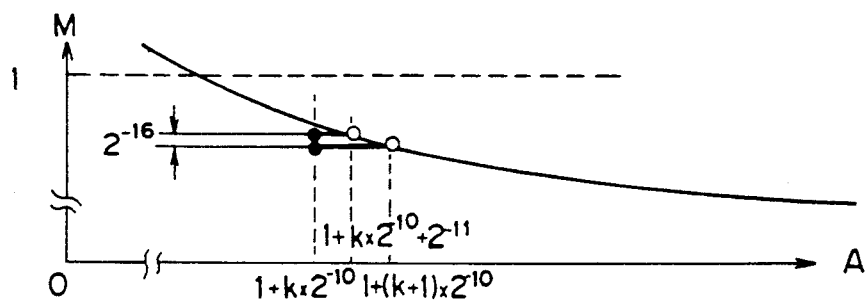
FIG. 15 is a diagram for the purposed of describing the improvement in precision of the approximation of square root's reciprocal, M.

Numeric values to be stored in the table information storing means were selected within the range where n=11 is satisfied in the equation (4), as an approximation of square root's reciprocal. The precision of an approximation of square root's reciprocal was confirmed with the help of a computer, the summary of which is shown below. M is a constant in $[1+k\times 2^{-10}, 1+(k+1)\times 2^{-10})$ (k=0, 1, ..., 3071) resulting from dividing the interval [1, 4] into 3072 equal divisions. To further improve the precision of an approximation of the square root's reciprocal, when the place of $2_{-11}$, which is lower than a least significant bit to be used as an address of the table information storing means for radicand by one bit, is "0", $2^{-16}$ is added to values output from the table information storing means by means of a method to be described below, which means that, as shown in the graph of FIG. 15, since $y = 1/\sqrt{x}$ is a curve moving down to the right, the value of the approximation of square root's reciprocal is padded by $2^{-16}$ at the left half of $[1+k\times 2^{-10}, 1+(k+1)\times 2^{-10})$. Thus, the graph of the approximation of square root's reciprocal with respect to the radicand A resulting from dividing the interval [1, 4] into 6144 equal divisions becomes a step function as shown in FIG. 13. On the other hand, FIG. 14 shows the graph of $A\times M\times M$ in which 6114 segments are a serrate shape. The precision obtained is shown below (hexadecimal notation).

Maximum: 1.001FD9048 in the case of 1.004

Minimum: 0.FFE001 in the case of 1.000.

The above values satisfy the equation 16 obtained from performing formula transformation in the equation (4) with n=11 and from squaring both sides thereof.

$$(1-0.001)^2 = 0.FFE00- \\ 1 \leq A\times M\times M \leq (1+0.001)^2 = 1.002001 \tag{16}$$

The values of $2^{-2}$ to $2^{-16}$ of square root's reciprocal are stored in the table information storing means. A sign bit which is always "0" and a $2^{-1}$ bit which is always "1" are not stored in the table. However, in the embodiments, it is troublesome to give an explanation in each embodiment in detail. Accordingly, each explanation is given assuming that "01" is included in the table as first two leading bits. When a multiplication is carried out, a multiplier is divided into groups in a 3-bit unit with one bit overlapped so as to generate a multiple of a multiplicand according to the Booth's algorithm as shown in Table, a tree of the carry-save adders continuously performs an operation until it becomes a single partial carry and a single partial sum and a carry-propagate adder carries out an addition of these two (i.e., the partial carry and the partial sum) to give a final product. In the multiplication of a residue and an approximation of square root's reciprocal, a value read out of the table is fed "1" at its leading end, while the one bit next to and on the right-hand of a bit serving as an address is inverted and is added to the end. In multiplication operations, by making the one bit that is added on the right a least significant bit, the effect not $2^{-17}$ times but $2^{-16}$ times is given.

TABLE

| Multiplier bits | | | |
|---|---|---|---|
| Sets now being scanned | High-order bits of lower sets | | Multiples of operation to |
| $a_{i+1}$ | $a_i$ | $a_{i-1}$ | be executed |
| 0 | 0 | 0 | 0 |
| 0 | 0 | 1 | +1 |
| 0 | 1 | 0 | +1 |
| 0 | 1 | 1 | +2 |
| 1 | 0 | 0 | −2 |
| 1 | 0 | 1 | −1 |
| 1 | 1 | 0 | −1 |
| 1 | 1 | 1 | 0 |

In an operation (R−S×T), R is input into a carry-save adder tree as a sort of multiple for the above described multiplying circuit construction. Additionally, by taking the complement of "1" of the input of the multiplier for making it to be the operation {R+S×(−T)} and by adding "1" as a least significant bit, the multiplier is substantially made to be the 2s complement in the (R−S×T) operation unit by the same effect as the above effect not $2^{-17}$ times but $2^{-18}$ times. Further, it is well known in the art that by suitably extending a sign bit to a high-order position, multiplication can be executed even with respect to negative numbers by means of the 2s complement notation.

In the embodiments 1 to 7 each including a rounding off means for partial square root values, a partial square root value calculation adder is provided within the multiplying circuit or the (R+S×T) operation unit. The reasons for this provision is to perform a carry-propagate addition for finding out a product at a stage where a partial carry and a partial sum are found in the multiplication and, at the same time, to carry out an addition for finding a partial square root value with a rounding off operation in order to improve the speed of operation.

The present invention is further intended for such a case that a partial square root value calculation adder is included within the multiplying circuit or the $(R+S\times T)$ operation unit in accordance with the embodiments of the invention described above. As it is troublesome to give an explanation about the partial square root value calculation adder in detail in each embodiment, here the one employed in the first embodiment will be described, and in the individual embodiments the description for internal operations for finding out a partial square root value by means of the multiplying circuit or the $(R+S\times T)$ operation unit is omitted. When a square root is found by a necessary number of digits, it may happen that it is lower by 1 in comparison with a true square root and a least significand bit (LSB). Therefore, the purpose of rounding off a square root is to avoid such a case that the square root of 1 becomes 0.111 ... (binary notation). On the contrary, when $b_i$ is greater than a correct partial square root value by $2^{-in}$, a one-bit-lower position is "0". The partial square root value is not further added by $2^{-in}$, so that there is no harmful influence caused by rounding off the partial square root value at a one-bit-lower position.

Figure 12:
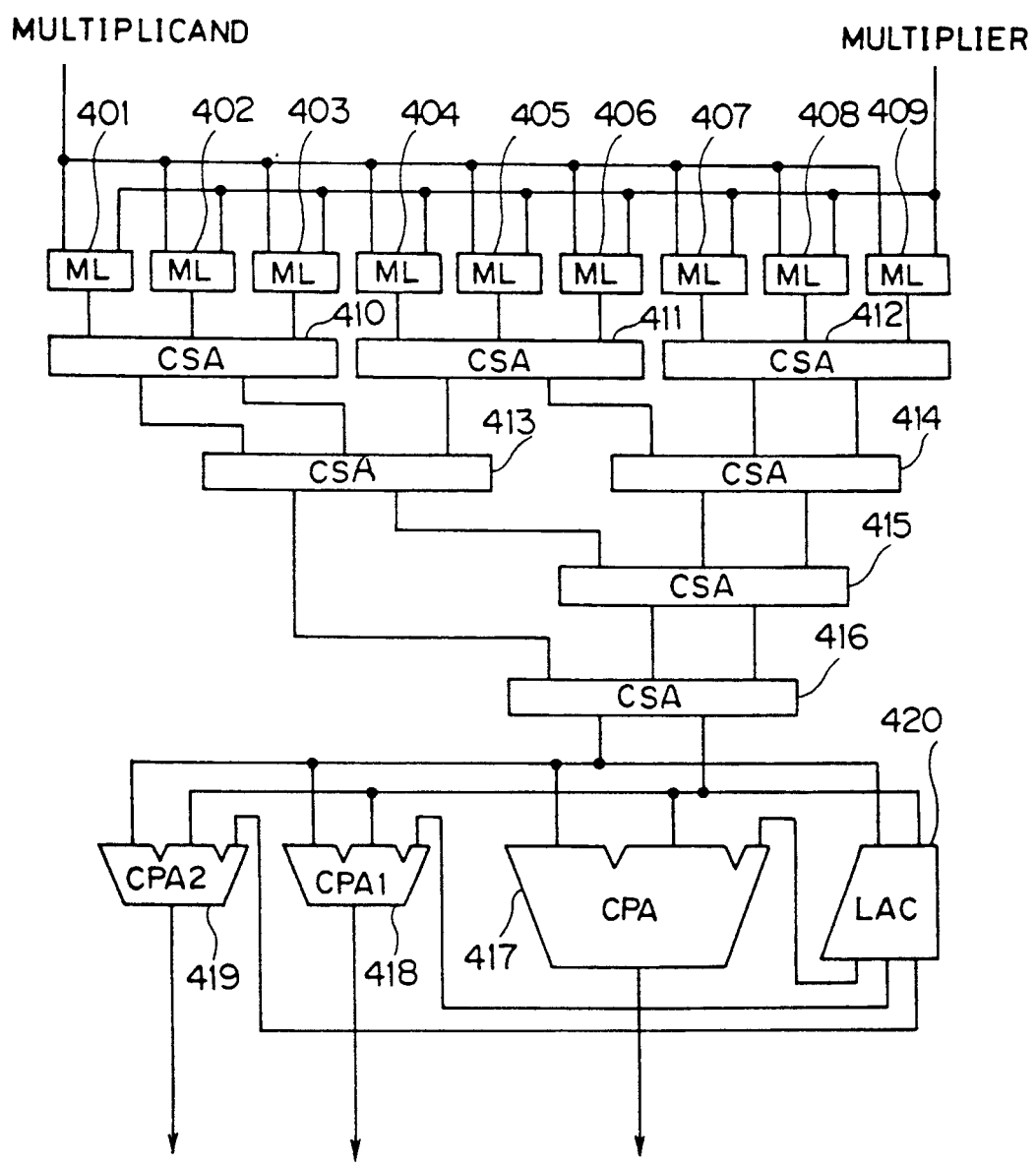
FIG. 12 is an internal block diagram of a multiplying circuit of a floating-point square root operation device of the first embodiment of the invention.

FIG. 12 is an internal block diagram of the multiplying circuit of the first embodiment of the present invention. In FIG. 12, the reference numerals 401 to 409 denotes multiple generators (MLs); 410 to 418, carry-save adders (CSAs); 417, a carry-propagate adder (CPA); 418 and 419, partial square root value calculation adders (CPA1 and CPA2); and 420, a look-ahead carry portion (LAC). The multiple generators 401 to 409 input respective multiplicands. And, with regard to multipliers, the one multiple generator inputs a 3-bit multiplier overlapped by one bit with the adjoining multiple generator and generates a multiple of the multiplicand as shown in Table. The outputs of the multiple generators 401 to 409 are fed into the carry-save adders 410 to 412 respectively, as shown in FIG. 12, and are finally arranged into two portions, namely a partial carry and a partial sum after the carry-save addition is carried out, by the carry-save adders 413 to 416. The bits of $2^{72}$ to $2^0$, $2^{71}$ to $2^{58}$ and $2^{72}$ to $2^{59}$ of the partial carry and the partial sum output by the carry-save adder 416 are fed into the carry-propagate adder 417 and the look-ahead carry portion 420, the first partial square value calculation adder 418 and the second partial square value calculation adder 419, respectively. The look-ahead carry portion 420 outputs to the first partial square root value calculation adder 418 while predicting a carry to $2^{58}$ and outputs to the second square root value calculation adder 419 while predicting a carry to $2^{59}$. Both the partial square root value calculation adders 418 and 419 perform a rounding off and an addition at the places of $2^{58}$ and $2^{59}$ respectively and output 13 bits of each of $2^{71}$ to $2^{59}$ and $2^{72}$ to $2^{60}$ as a partial square root value comprised of one bit for sign and 12 bits for data.

On the other hand, in the eighth embodiment in which no rounding off means for partial square root values is provided, when "1" is added to a partial square root value just prior the input of the $(R+S\times T)$ operation unit, the execution time of square root operations is affected greatly. In view of this, $\{R+S\times(T+1)+(T+1)\}$ is taken instead of $\{R+(S+1)\times(T+1)\}$, and with respect to a multiplier, the effect of adding "1" to a partial square root is given by adding "0" to a least significant bit in the inverting circuit. On the other hand, the $(R+S\times T+T)$ operation unit is used so as to deal with a multiplicand by inputting a multiplier into the carry-save adder tree as a sort of multiple under a certain condition.

The eight embodiments of the invention will be described below. In the embodiments, specific numeric values are used. These values are represented in hexadecimal notation unless otherwise noted. It seems that a sign bit is extra extended in some embodiments, since the values are referred to in two or more embodiments.

FIRST EMBODIMENT

Figure 1:
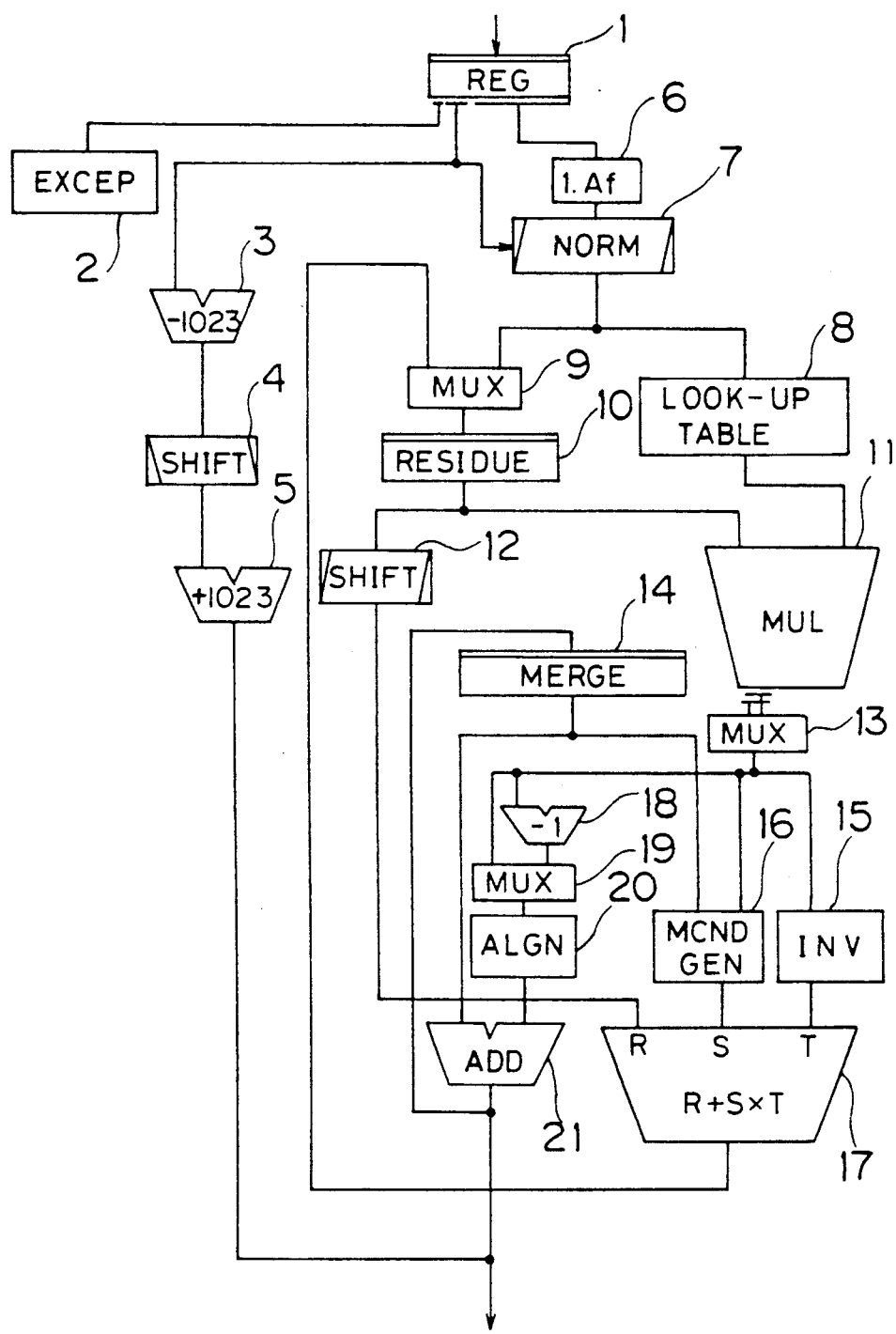
FIG. 1 is a block diagram of a floating-point square root operation device of a first embodiment of the present invention.

FIG. 1 is a block diagram of a floating-point square root operation device in accordance with a first embodiment of the invention. In the floating-point square root operation device of the first embodiment, a double-precision floating-point number in an IEEE standard is input and the square root of such a double-precision floating-point number is output wherein a bit length as being data for a partial square root value is "12" and there is a 1-bit overlap between partial square root values. In FIG. 1, the reference numeral 1 indicates an input register; 2, an exception detector; 3, an exponential constant subtracter; 4, a shifter; 5, an exponential constant adder; 6, a leading-bit adding circuit; 7, a normalizing circuit; 8, a table information storing unit; 9, a multiplexer; 10, a residue holding circuit; 11, a multiplying circuit; 12, a shifter; 13, a multiplexer; 14, a merged square root value holding circuit; 15, an inverting circuit; 16, a multiplicand generator; 17, a $(R+S\times T)$ operation unit; 18, a constant subtracter; 19, a multiplexer; 20, a digit aligning circuit; and 21, an adder.

The operation of the floating-point square root operation device of FIG. 1 will be described with the help of specific numeric values. FIGS. 2A-2C and 3A-3C show a process through which an operand input is processed at each means. In the first place, an operand, that is, 7C88B89EAF092E9F is input and set in the input register 1. The exception detector 2 carries out a positive-negative check for operands so that it can detect a data exception if an operand input is negative. Then the exception detector 2 notifies an external instruction executing control unit, connected to the floating-point square root operation device, of the fact that a data exception is taking place. In the case of the numeric values in this embodiment, the operand is positive (this premise is omitted below). Therefore, no data exceptions are detected. 3FF is subtracted from the exponents $2^{62}$ to $2^{52}$ of the output of the input register 1 by means of the exponential constant subtracter 3. Then these exponents are right-shifted one bit place by the shifter 4. Thereafter, 3FF is added by the exponential constant adder 5 to the exponents again, so that the resulting exponents are found. In the leading-bit adding circuit 6, a leading bit of "1" is added to the leading ends of the significand parts of $2^{51}$ to $2^0$ of the output of the input register 1. In the normalizing circuit 7, if the bit of $2^{52}$ of the output of the input register 1 is "1", the input is output after left-shifting it one bit place. On the other hand, if the bit of $2^{52}$ is "0", the input is output after left-shifting it two bit places. The table information storing unit 8 is fed 12 bits from $2^{54}$ to $2^{43}$ of the normalizing circuit 7, from which 091A0 is output. Further, the bit of $2^{42}$ of the normalizing circuit 7 shall be inverted and added as a least significant bit to this output, however, "1" is added thereto in this embodiment instead. Thus, a practical multiplier in the multiplying circuit 11 is 091A1. The multiplexer 9 selects the output of the normalizing circuit 7. The output thus selected by the multiplexer 9 is set in the residue holding circuit 10, at which point in time the merged square root value holding circuit 14 is reset to zero. In the multiplying circuit 11, 62E27ABC24BA7C is multiplied by 091A1 to give a resulting product, 0384077F3C120B983FC while at the same time results obtained by rounding off the product at the place of $2^{58}$ at the first iteration and at the place of $2^{59}$ at the subsequent iteration are fed to the multiplexer 13. The multiplexer 13 selects 13 bits from $2^{71}$ to $2^{59}$ of the multiplying circuit 11 as a first partial square root value comprised of one bit for sign and 12 bits for data. In the inverting circuit 15, the partial square root value is input thereinto which is bit-inverted, fed "1" to its least significant bit and output. Furthermore, in the multiplicand generator 16, the output of the multiplexer 13 is padded into $2^{56}$ to $2^{44}$, and other bits are output in the form of zero, at the first iteration. The $(R+S \times T)$ operation unit 17 executes the operation $(R+S \times T)$ by inputting the output of the residue holding circuit 10 to be output from the shifter 12 as R, which has been left-shifted eleven bit places, the output of the multiplicand generator 16 as S and the output of the inverting circuit 15 as T. 0FD5E125-D3E000 output from the $(R+S \times T)$ operation unit 17 is selected by the multiplexer 9 and set in the residue holding circuit 10. On the other hand, the constant subtracter 18 subtracts "1" from LSB of the output of the multiplexer 13. When the output of the $(R+S \times T)$ operation unit 17 is negative, the multiplexer 19 selects the output of the constant subtracter 18. In other cases other than that, the multiplexer 19 selects the output of the multiplexer 13. Judging from the foregoing conditions, the output of the multiplexer 13 is selected at the first iteration. The digit aligning circuit 20 carries out a digit adjustment in order to merge partial square root values at each iteration. More specifically, when a partial square root value is negative, first two leading bits of 13 bits of the output of the multiplexer 19 are inhibited to zero. On the other hand, when a partial square root value is positive, these 13 bits of the output of the multiplexer 19 are shifted so as to establish a bit weight balance against a merged square root value at a high-order position and are output. For the first partial square root value, input data are aligned in $2^{56}$ to $2^{44}$ for outputting. The adder 21 executes an addition by inputting the output of the merged square root value holding circuit 14 and the output of the digit aligning circuit 20, the result being set in the merged square root value holding circuit 14.

Then, a second iterative computation begins. The output of the table information storing unit 8 stays the same as the first iterative computation. 0FD5E125-D3E000 of a first residue $R_1$ that is set in the residue holding circuit 10 is multiplied by 091A1 by the multiplying circuit 11, the resulting product, 009021A0905CC1FE000 being output. 0090 of $2^{72}$ to $2^{60}$ is selected by the multiplexer 13 as a second partial square root value comprised of one bit for sign and 12 bits for data. In the inverting circuit 15, 0090 is converted into 1F6F by means of bit inversion, added "1" as its least significant bit and output. The $(R+S \times T)$ operation unit 17 executes an operation with 1F70 as a practical multiplier. On the other hand, in the multiplicand generator 16, the output of the merged square root value holding circuit 14 is left-shifted one bit place while at the same time 12 bits except the leading bit of 13 bits output from the multiplexer 13 are padded into $2^{44}$ to $2^{33}$ so that 0E1012000000000 is output. The $(R+S \times T)$ operation unit 17 executes the operation $(R+S \times T)$ by inputting R obtained by left-shifting the output of the residue holding circuit 10 to be output from the shifter 12 eleven bit places, S which is the output of the multiplicand generator 16 and T which is the output of the inverting circuit 15. 1E672E9F000000 output from the $(R+S \times T)$ operation unit 17 is selected by the multiplexer 9, which is set in the residue holding circuit 10. The multiplexer 19 selects the output of the multiplexer 13 and outputs it. The digit aligning circuit 20 aligns the input comprised of 13 bits in $2^{45}$ to $2^{33}$. The adder 21 executes an addition by inputting the output of the merged square root value holding circuit 14 and the output of the digit aligning circuit 20 and outputs 070812000000000. In the merged square root value holding circuit 14, the output of the adder 21 is set.

Next, a third iterative computation commences. The output of the table information storing unit 8 still remains the same as the first iterative computation. 1E67-2E9F000000 of a second residue $R_2$ that is set in the residue holding circuit 10 is multiplied by 091A1 by means of the multiplying circuit 11, the resulting product, 0114B904C60FF000000 being output. 0115 of $2^{72}$ to $2^{60}$ after a rounding off carried out at the place of $2^{59}$ is selected by the multiplexer 13 as a third partial square root value comprised of one bit for sign and 12 bits for data. The inverting circuit 15 inverts 0115 to make it 1EEA, adds "1" to it as its least significant bit and outputs it. In the $(R+S \times T)$ operation unit 17, an operation is executed with 1EEB as a practical multiplier. On the other hand, in the multiplicand generator 16, the output of the merged square root value holding circuit 14 is left-shifted one bit place while at the same time 12 bits except the leading bit of 13 bits output from the multiplexer 13 are padded into $2^{33}$ to $2^{22}$ to output 0E10240454000000. The $(R+S \times T)$ operation unit 17 executes the operation $(R+S \times T)$ by inputting R obtained by left-shifting the output of the residue holding circuit 10 to be output from the shifter 12 eleven bit places, S which is the output of the multiplicand generator 16 and T which is the output of the inverting circuit 15. C2056D11C00000 output from the $(R+S \times T)$ operation unit 17 is selected by the multiplexer 9 and set in the residue holding circuit 10. The multiplexer 19 selects the output of the constant subtracter 18 and outputs it. The digit aligning circuit 20 aligns the input of 13 bits in $2^{34}$ to $2^{22}$. The adder 21 executes an addition by inputting the output of the merged square root value holding circuit 14 and the output of the digit aligning circuit 20, thereby outputting 070812045000000. In the merged square root value holding circuit 14, the output of the adder 21 is set.

Then a fourth iterative computation begins. The output of the table information storing unit 8 still remains the same as the one of the first iterative computation. C2056D11C00000 of a third residue $R_3$ which is set in the residue holding circuit 10 is multiplied by 091A1 by means of the multiplying circuit 11, thereby the resulting product, 1DCBE1830A5E9C00000 being output. 1DCC of $2^{72}$ to $2^{60}$ after a rounding off carried out at the place of $2^{59}$ is selected by the multiplexer 13 as a fourth partial square root value comprised of one bit for sign and 12 bits for data. In the inverting circuit 15, 1DCC is converted into 0233 by means of bit inversion, added "1" as its least significant bit and output. The $(R+S \times T)$ operation unit 17 executes an operation with 0234 as a practical multiplier. On the other hand, in the multiplicand generator 16, the output of the merged square root value holding circuit 14 is left-shifted one bit place while at the same time 12 bits except the leading bit of 13 bits output from the multiplexer 13 are padded into $2^{22}$ to $2^{11}$ to output 0E102408A6E6000. The (R+S×T) operation unit 17 executes the operation (R+S×T) by inputting R obtained by left-shifting the output of the residue holding circuit 10 to be output from the shifter 12 eleven bit places, S which is the output of the multiplicand generator 16 and T which is the output of the inverting circuit 15. E4-5EBEFB2B8000 output from the (R+S×T) operation unit 17 is selected by the multiplexer 9, which is set in the residue holding circuit 10. The multiplexer 19 selects the output of the constant subtracter 18 and outputs it. The digit aligning circuit 20 inhibits first two leading bits of the input of 13 bits to zero and aligns the remaining 11 bits in $2^{21}$ to $2^{11}$. The adder 21 executes an addition by inputting the output of the merged square root value holding circuit 14 and the output of the digit aligning circuit 20, thereby outputting 0708120452E5000. The merged square root value holding circuit 14 sets the output of the adder 21.

Finally, a fifth iterative computation starts. The output of the table information storing unit 8 still remains unchanged (i.e., is the same as the one at the first iterative computation). E45EBEFB2B8000 of a fourth residue $R_4$ which is set in the residue holding circuit 10 is multiplied by 091A1 by the multiplying circuit 11, and the resulting product, 1F04849C25F99DB8000 is output. 1F05 of $2^{59}$ is $2^{60}$ after a rounding off carried out at the place of $2^{59}$ is selected by the multiplexer 13 as a fifth partial square root value composed of one bit for sign and 12 bits for data. In the inverting circuit 15, 1F05 is inverted, becomes 00FA and is output after "1", which serves as a least significant bit, is added thereto. The (R+S×T) operation unit 17 executes an operation with 00FB as a practical multiplier. On the other hand, in the multiplicand generator 16, the output of the merged square root value holding circuit 14 is left-shifted one bit place while at the same time 12 bits except the leading bit of the output of 13 bits output from the multiplexer 13 are padded into the positions from $2^{11}$ to $2^{0}$, and 0E102408A5CBF05 is output. The (R+S×T) operation unit 17 executes the operation (R+S×T) by inputting R obtained by left-shifting the output of the residue holding circuit 10 to be output from the shifter 12 eleven bit places, S which is the output of the multiplicand generator 16 and T which is the output of the inverting circuit 15. Output from the (R+S×T) operation unit 17 is 932D2104EF49E7. The multiplexer 19 selects the output of the constant subtracter 18 and outputs it. The digit aligning circuit 20 inhibits first two leading bits among the input of 13 bits to zero and aligns the remaining 11 bits in $2^{10}$ to $2^{0}$. The adder 21 executes an addition by inputting the output of the merged square root value holding circuit 14 and the output of the digit aligning circuit 20, thereby outputting 0708120452E5F04.

As final results, "0" as being a sign bit of $2^{63}$, 11 bits output from the exponential constant adder 5 as being exponent parts of $2^{62}$ to $2^{52}$, and $2^{53}$ to $2^{2}$ of the adder 21 as being significand parts of $2^{51}$ to $2^{0}$ are selected respectively and output from the square root operation device of FIG. 1 in the form of 5E3C2048114B97C1.

SECOND EMBODIMENT

Figure 4:
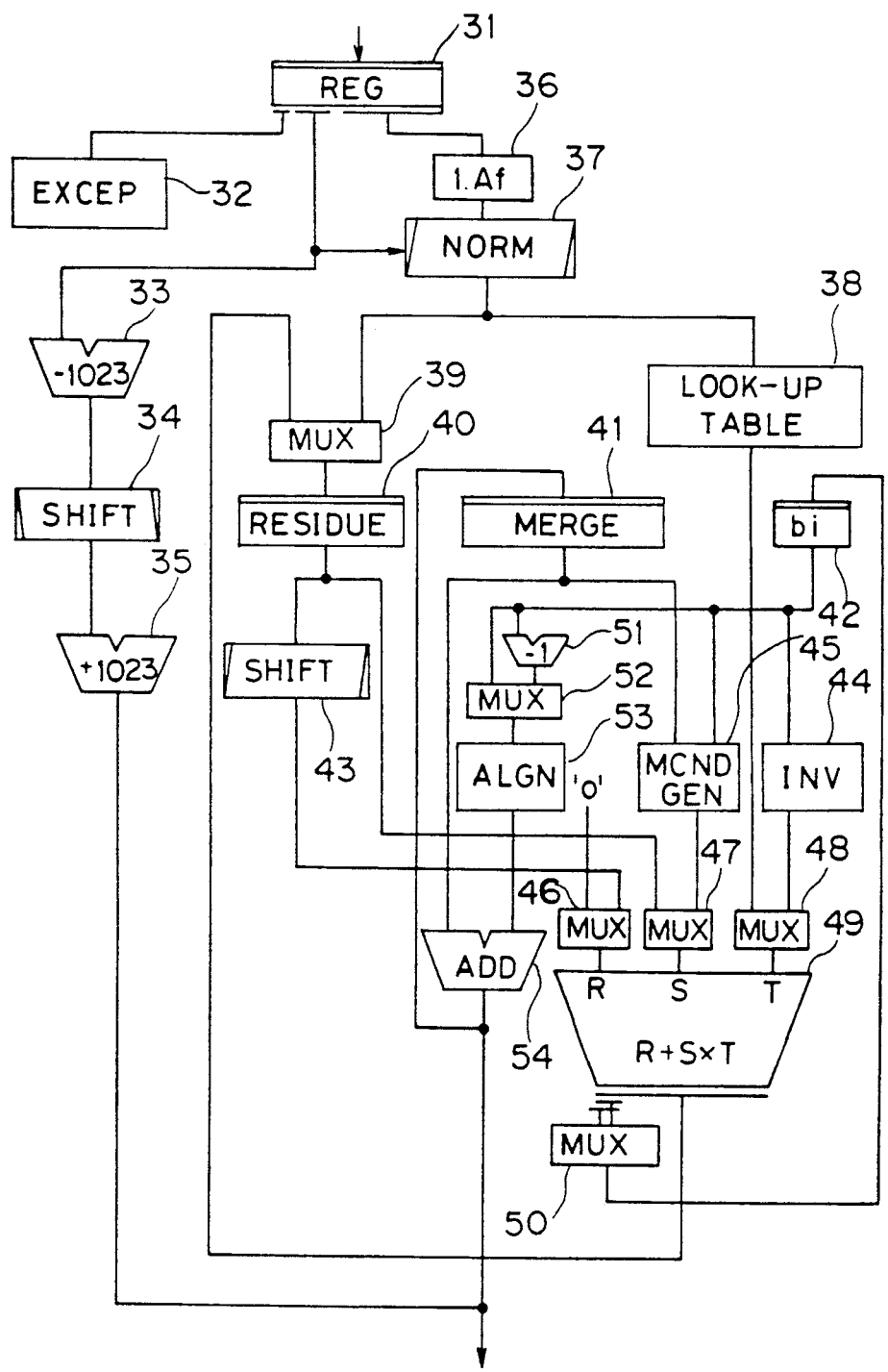
FIG. 4 is a block diagram of a floating-point square root operation device of a second embodiment of the invention.

FIG. 4 is a block diagram of a floating-point square root operation device in accordance with a second embodiment of the invention. In the floating-point square root operation device of the second embodiment, a double-precision floating-point number in an IEEE standard is input and the square root of such a double-precision floating-point number is output wherein a bit length as being data of a partial square root value is "12" and there is a 1-bit overlap between partial square root values. In FIG. 4, the reference numeral 31 denotes an input register; 32, an exception detector; 33, an exponential constant subtracter; 34, a shifter; 35, an exponential constant adder; 36, a leading-bit adding circuit; 37, a normalizing circuit; 38, a table information storing unit; 39, a multiplexer; 40, a residue holding circuit; 41, a merged square root value holding circuit; 42; a partial square root value holding circuit (bi); 43, a shifter; 44, an inverting circuit; 45, a multiplicand generator; 46, 47 and 48, multiplexers; 49, a (R+S×T) operation unit; 50, a multiplexer; 51, a constant subtracter; 52, a multiplexer; 53, a digit aligning circuit; and 54, an adder.

The operation of the floating-point square root operation device of FIG. 4 will be described using specified numeric values. In this embodiment, the same process as the foregoing first embodiment as shown in FIGS. 2A-2C and 3A-3C is taken for an operand input which is processed at each means. In the first place, 7C88B89EAF092E9F is input as an operand and set in the input register 31. The exception detector 32 carries out a positive-negative check for operands input so that it can detect a data exception when an operand is negative, thus informing an external instruction executing control unit, connected to the floating-point square root operation device, of the fact that a data exception is taking place. In the case of the numeric values used here, the operand is a positive one (this premise is omitted below). Therefore, no data exceptions are detected. 3FF is subtracted from the exponents of $2^{62}$ to $2^{52}$ of the output of the input register 31 by means of the exponential constant subtracter 33. Then these exponents are right-shifted one bit place by the shifter 34. Thereafter, 3FF is added by the exponential constant adder 35 to the exponents again, so that the resulting exponents are found. In the leading-bit adding circuit 36, a leading bit of "1" is added to the leading ends of the significand parts of $2^{51}$ to $2^{0}$ of the output of the input register 31. In the normalizing circuit 37, if the bit of $2^{52}$ of the output of the register 31 is "1", the input is output after left-shifting it one bit place. On the other hand, if the bit of $2^{52}$ is "0", the input is output after left-shifting it two bit places. The table information storing unit 38 is fed 12 bits from $2^{54}$ to $2^{43}$ of the normalizing circuit 37, from which 091A0 is output. Further, the bit of $2^{42}$ of the normalizing circuit 37 shall be inverted and added as a least significant bit to this output, however, "1" is added thereto in this embodiment instead. Thus, a practical multiplier in the (R+S×T) is 091A1. The multiplexer 39 selects an output of the normalizing circuit 37. The output thus selected by the multiplexer 39 is set in the residue holding circuit 40, at which point in time the merged square root value holding circuit 14 is reset to zero. The multiplexers 46, 47 and 48 select '0', the output of the residue holding circuit 40 and the output of the table information storing unit 38 respectively. In the (R+S×T) operation unit 49, 62E27ABC24BA7C is multiplied by 091A1, giving a product, 0384077F3C120B983FC while at the same time results, obtained by rounding the product at the place of $2^{58}$ at the first iteration and at the of $2^{59}$ at the subsequent iteration, are fed to the multiplexer 50. The multiplexer 50 selects 13 bits from $2^{71}$ to $2^{59}$ of the $(R+S\times T)$ operation unit 49 as a first partial square root value comprised of one bit for sign and 12 bits for data. The first partial square root value is set in the partial square root value holding circuit 42. In the shifter 43, the output of the residue holding circuit 40 is left-shifted eleven bit places. The inverting circuit 44 receives the partial square root value as an input, bit-inverts it, extends a 4-bit sign to a high-order position, adds "1" as its least significant bit and outputs it. Furthermore, in the multiplicand generator 45, the output of the partial square root value holding circuit 42 is padded into $2^{56}$ to $2^{44}$, and other bits are output in the form of zero, at the first iteration. The multiplexers 46, 47 and 48 select the output of the shifter 43, the output of the multiplicand generator 45 and the output of the inverting circuit 44 respectively. The $(R+S\times T)$ operating unit 49 executes the operation $(R+S\times T)$ by inputting R which is the output of the multiplexer 46, S which is the output of the multiplexer 47 and T which is the output of the multiplexer 48. 0FD5E125D3E000 output from the $(R+S\times T)$ operation unit 49 is selected by the multiplexer 39 and set in the residue holding circuit 40. On the other hand, the constant subtracter 51 subtracts "1" from LSB of the output of the partial square root value holding circuit 42. When the output of the $(R+S\times T)$ operation unit 49 is negative, the multiplexer 52 selects the output of the constant subtracter 51. On the other hand, in other case than that the multiplexer 52 selects the output of the partial square root value holding circuit 42. Judging from the above conditions, at the first iteration, the output of the partial square root value holding circuit 42 is selected. The digit aligning circuit 53 carries out a digit adjustment in order to merge partial square root values at each iteration. In other words, when the partial square root value is negative, first two leading bits of 13 bits of the output of the multiplexer 52 are inhibited to zero. On the other hand, when the partial square root value is positive, these 13 bits of the multiplexer 52 are shifted so as to establish a bit weight balance against a merged square root value at a high-order position and are output. With regard to the first partial square root value, input data are aligned in $2^{56}$ to $2^{44}$ and output. The adder 54 executes an addition by inputting the output of the merged square root value holding circuit 41 and the output of the digit aligning circuit 53 and sets the result in the merged square root value holding circuit 41.

Then, a second iterative computation begins. The output of the table information storing unit 38 stays unchanged at the second and subsequent iterative computations (i.e., is the same as the one at the first iterative computation). The multiplexers 46, 47 and 48 select '0', 0FD5E125D3E000 of a first residue $R_1$ that has been set in the residue holding circuit 40 and 091A1 which is the output of the table information storing unit 38 respectively. The $(R+S\times T)$ operation unit 49 executes the operation $(S\times T)$, outputting the resulting product, 009021A0905CC1FE000. 0090 from $2^{72}$ to $2^{60}$ is selected by the multiplexer 50 as a second partial square root value comprised of one bit for sign and 12 bits for data. This partial square root value is set in the partial square root value holding circuit 42. In the shifter 43, the output of the residue holding circuit 40 is left-shifted eleven bit places. The inverting circuit 44 inverts 0090, extends a 4-bit sign to a high-order position thereof, makes it 1FF6F, adds "1" as a least significant bit thereto, and outputs the same. The $(R+S\times T)$ operation unit 49 executes an operation with 1FF70 as a practical multiplier. On the other hand, in the multiplicand generator 45, the output of the merged square root value holding circuit 41 is left-shifted one bit place while at the same time 12 bits except the leading bit of 13 bits output from the partial square root value holding circuit 42 are padded into $2^{44}$ to $2^{33}$, 0E1012000000000 being output. The multiplexers 46, 47 and 48 select the output of the shifter 43, the output of the multiplicand generator 45 and the output of the inverting circuit 44 respectively. The $(R+S\times T)$ operation unit 49 executes the operation $(R+S\times T)$ by inputting R which is the output of the multiplexer 46, S which is the output of the multiplexer 47 and T which is the output of the multiplexer 48. 1E672E9F000000 output from the $(R+S\times T)$ operation unit 49 is selected by the multiplexer 39 and set in the residue holding circuit 40. The multiplexer 52 selects the output of the partial square root value holding circuit 42 and outputs it. The digit aligning circuit 53 aligns the input made up of 13 bits in $2^{45}$ to $2^{33}$. The adder 54 executes an addition by inputting the output of the merged square root value holding circuit 41 and the output of the digit aligning circuit 53, 070812000000000 being output. The merged square root value holding circuit 41 sets the output of the adder 54.

Next, a third iterative computation commences. The output of the table information storing unit 38 still remains unchanged (i.e., is the same as the one at the first iterative computation). The multiplexers 46, 47 and 48 select '0', 1E672E9F000000 of a second residue $R_2$ that is set in the residue holding circuit 40 and 091A1 which is the output of the table information storing unit 38 respectively. The $(R+S\times T)$ operation unit 49 executes the operation $(S\times T)$ and outputs the resulting product, 0114B904C60FF000000. 0115 of $2^{72}$ to $2^{60}$ after a rounding off carried out at the place of $2^{59}$ is selected by the multiplexer 50 as a third partial square root value made up of one bit for sign and 12 bits for data. This partial square root value is set in the partial square root value holding circuit 42. In the shifter 43, the output of the residue holding circuit 40 is left-shifted eleven bit places. The inverting circuit 44 inverts 0115, extends a 4-bit sign to a high-order position thereof, makes it 1FEEA, adds to it "1" as a least significant bit and outputs the same. The $(R+S\times T)$ operation unit 49 executes an operation with 1FEEB as a practical multiplier. On the other hand, in the multiplicand generator 45, the output of the merged square root value holding circuit 41 is left-shifted one bit place while at the same time 12 bits except the leading bit of 13 bits output from the partial square root value holding circuit 42 are padded into $2^{33}$ to $2^{22}$, 0E1024045400000 being output. The multiplexers 46, 47 and 48 select the output of the shifter 43, the output of the multiplicand generator 45 and the output of the inverting circuit 44 respectively. The $(R+S\times T)$ operation unit 49 executes the operation $(R+S\times T)$ by inputting R which is the output of the multiplexer 46, S which is the output of the multiplexer 47, and T which is the output of the multiplexer 48. C2056D11C00000 output from the $(R+S\times T)$ operation unit 49 is selected by the multiplexer 39 and set in the residue holding circuit 40. The multiplexer 52 selects the output of the constant subtractor 51 and outputs it. The digit aligning circuit 53 aligns the input of 13 bits in $2^{34}$ to $2^{22}$. The adder 54 executes an addition by inputting the output of the merged square root value holding circuit 41 and the output of the digit aligning circuit 53, thereby outputting 070812045000000. The merged square root value holding circuit 41 sets the output of the adder 54.

Then a fourth iterative computation begins. The output of the table information storing unit 38 still remains unchanged (i.e., is the same as the one at the first iterative computation). The multiplexers 46, 47 and 48 select '0' and C2056D11C000000 of a third residue $R_3$ which is set in the residue holding circuit 40 and 091A1 which is the output of the table information storing unit 38 respectively. The $(R+S \times T)$ operation unit 49 executes the operation $(S \times T)$ and outputs the resulting product, 1DCBE1830A5E9C00000. 1DCC of $2^{72}$ to $2^{60}$ after a rounding off carried out at the position of $2^{59}$ is selected by the multiplexer 50 as a fourth partial square root value comprised of one bit for sign and 12 bits for data. This partial square root value is set in the partial square root value holding circuit 42. In the shifter 43, the output of the residue holding circuit 40 is left-shifted eleven bit places. The inverting circuit 15 inverts 1DCC, extends a 4-bit sign to a high-order position thereof, makes it 00233, adds to it "1" as a least significant bit and outputs the same. The $(R+S \times T)$ operation unit 49 executes an operation with 00234 as a practical multiplier. On the other hand, in the multiplicand generator 45, the output of the merged square root value holding circuit 41 is left-shifted one bit place while at the same time 12 bits except the leading bit of 13 bits output from the partial square root value holding circuit 42 are padded into $2^{22}$ to $2^{11}$, 0E102408A6E6000 being output. The multiplexers 46, 47 and 48 select the output of the shifter 43, the output of the multiplicand generator 45 and the output of the inverting circuit 44 respectively. The $(R+S \times T)$ operation unit 49 executes the operation $(R+S \times T)$ by inputting R which is the output of multiplexer 46, S which is the output of the multiplexer 47 and T which is the output of the multiplexer 48, E4-5EBEFB2B8000 output from the $(R+S \times T)$ operation unit 49 is selected by the multiplexer 39 and set in the residue holding circuit 40. The multiplexer 52 selects the output of the constant subtractor 51 and outputs it. The digit aligning circuit 53 inhibits first two leading bits among the input of 13 bits to zero, and aligns the remaining 11 bits into $2^{21}$ to $2^{11}$. The adder 54 executes an addition by inputting the output of the merged square root value holding circuit 41 and the output of the digit aligning circuit 53, thereby outputting 0708120452E5000. The merged square root value holding circuit 41 sets the output of the adder 54.

Finally, a fifth iterative computation starts. The output of the table information storing unit 38 still remains unchanged (i.e., is the same as the one at the first iterative computation). The multiplexers 46, 47 and 48 select '0', E45EBEFB2B8000 of a fourth residue $R_4$ which is set in the residue holding circuit 40 and 091A1 which is the output of the table information storing unit 38 respectively. The $(R+S \times T)$ operation unit 49 executes the operation $(S \times T)$ and outputs the resulting product, 1F04849C25F99DB8000. 1F05 of $2^{72}$ to $2^{60}$ after a rounding off at the place of $2^{59}$ is selected by the multiplexer 50 as a fifth partial square root value of one bit for sign and 12 bits for data. This partial square root value is set in the partial square root holding circuit 42. In the shifter 43, the output of the residue holding circuit 40 is left-shifted eleven bit places. The inverting circuit 15 inverts 1F05, extends a 4-bit sign to a high-order position thereof, makes it 000FA, adds to it "1" as a least significant bit and outputs the same. The $(R+S \times T)$ operation unit 49 executes an operation with 00FB as a practical multiplier. On the other hand, in the multiplicand generator 45, the output of the merged square root value holding circuit 41 is left-shifted one bit place while at the same time 12 bits except the leading bit of the output of 13 bits output from the partial square root value holding circuit 42 are padded into $2^{11}$ to $2^0$ to output 0E102408A5CBF05. The multiplexers 46, 47 and 48 select the output of the shifter 43, the output of the multiplicand generator 45 and the output of the inverting circuit 44. The $(R+S \times T)$ operation unit 49 executes the operation $(R+S \times T)$ by inputting R which is the output of the multiplexer 46, S which is the output of the multiplexer 47 and T which is the output of the multiplexer 48. Output from the $(R+S \times T)$ operation unit 49 is 932D2104EF49E7. The multiplexer 52 selects the output of the constant substracter 51 and outputs it. The digit aligning circuit 53 inhibits first two leading bits among the input of 13 bits to zero and aligns the remaining 11 bits in $2^{10}$ to $2^0$. The adder 54 executes an addition by inputting the output of the merged square root value holding circuit 41 and the output of the digit aligning circuit 54, thereby outputting 0708120452E5F04.

As final results, namely "0" as being a sign bit for $2^{63}$, 11 bits output from the exponential constant adder 35 as exponent parts for $2^{62}$ to $2^{52}$, and $2^{53}$ to $2^2$ of the adder 54 as significand parts for $2^{51}$ to $2^0$ are selected respectively and are output from the square root operation device in FIG. 4 in the form of 5E3C2048114B97C1.

THIRD EMBODIMENT

Figure 5:
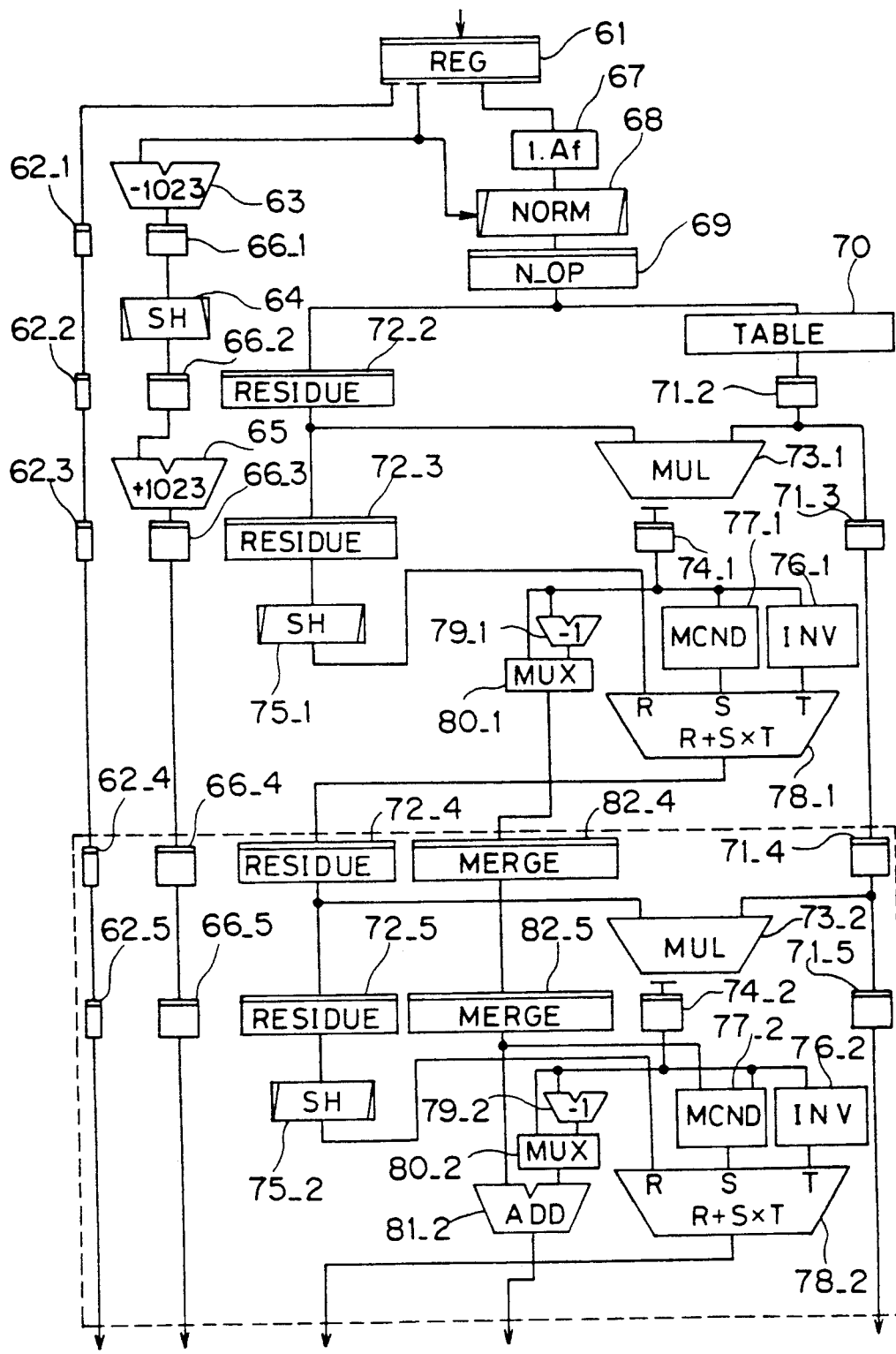
FIG. 5 is a block diagram showing one half of a floating-point vector square root operation device of a third embodiment of the invention.
Figure 6:
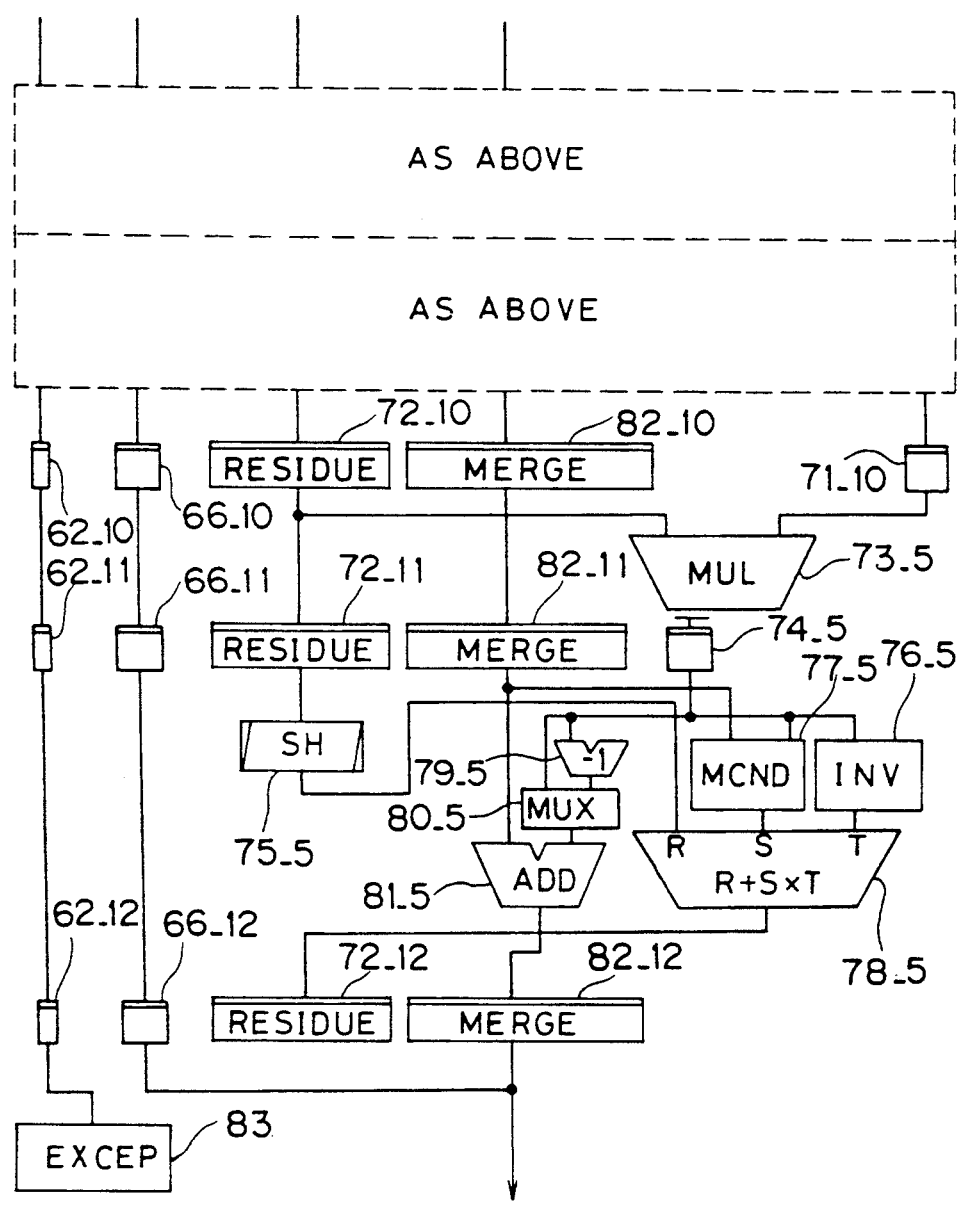
FIG. 6 is a block diagram showing the other half of the floating-point vector square root operation device in FIG. 5.

FIGS. 5 and 6 are block diagrams of a floating-point vector square root operation device in accordance with a third embodiment of the invention. In the floating-point vector square root operation device of the third embodiment, a double-precision floating-point number vector in an IEEE standard is input in element order and the square root vector of the double-precision floating-point number is output in element order, in which a bit length as being data for a partial square root value is 12 and there is a 1-bit overlap between partial square root values. In FIGS. 5 and 6, the reference numeral 61 denotes an input register; 62_1 to 62_12, exception detecting information holding circuits; 63, an exponential constant subtracter; 64, a shifter; 65, an exponential constant adder; 66_1 to 66_12, exponent holding circuits; 67, a leading-bit adding circuit; 68, a normalizing circuit; 69, a normalized operand register; 70, a table information storing unit; 71_2 to 71_10, table output information holding circuits; 72_2 to 72_12, residue holding circuits; 73_1 to 73_5, multiplying circuits; 74_to 74_5, partial square root value holding circuits; 75_1 to 75_5, shifters; 76_1 to 76_5, inverting circuits; 77_1 to 77_5, multiplicand generators; 78_1 to 78_5, $(R+S \times T)$ operation units; 79_1 to 79_5, constant subtracters; 80_1 to 80_5, multiplexers; 81_2 to 81_5, adders; 82_4 to 82_12, merged square root value holding circuits; and 83, an exception detector.

The operation of the floating-point vector square root operation devices of FIGS. 5 and 6 will be described using specified numeric values. In this embodiment, an input operand of one of elements of a vector is processed at each means in the same manner as the foregoing first embodiment of FIGS. 2A-2C and 3A-3C. The process of how a single element is processed at each stage is described below.

STAGE 0

First, 7C88B89EAF092E9F is input as an operand and is set in the input register 61. From the exponents of "$2^{62}$ to $2^{52}$ of the output of the input register 61, 3FF is subtracted by means of the exponential constant subtracter 63, while in the leading-bit adding circuit 67 a leading bit, "1" is added to the leading ends of the significand parts of $2^{51}$ to $2^0$ of the output of the input register 61. If the bit of $2^{52}$ of the output of the input register 61 is "1", the normalizing circuit 68 left-shifts the input one bit place and outputs it. If the bit of $2^{52}$ of the output of the input register 61 is "0", the normalizing circuit 68 left-shifts the input two bit places and outputs it.

STAGE 1

In the first place, one leading bit of the output of the input register 61 is set in the exception detecting information holding circuit 62_1. The output of the exponential constant subtracter 63 is set in the exponent holding circuit 66_1. The output of the normalizing circuit 68 is set in the normalized operand register 69. The output of the exponent holding circuit 66_1 is right-shifted one bit place by the shifter 64. The table information storing unit 70 is fed 12 bits from $2^{54}$ to $2^{43}$ output from the normalized operand register 69, from which 091A0 is output. Further, the bit of $2^{42}$ of the normalized operand register 69 shall be inverted and added as a least significant bit to this output, however, "1" is added thereto in this embodiment instead. Thus, a practical multiplier in the multiplying circuits 73_1 to 73_5 is 091A1.

STAGE 2

First, the output of the exception detecting information holding circuit 62_1 is set in the 62_2. The output of the shifter 64 is set in the exponent holding circuit 66_2. The output of the normalized operand register 69 is set in the residue holding circuit 72_2. The output of the table information storing unit 70 is set in the table output information holding circuit 71_2. 3FF is added to the output of the exponent holding circuit 66_2 by the exponential constant adder 65, and a resulting exponent is obtained. In the multiplying circuit 73_1, 62E2-7ABC24BA7C is multiplied by 091A1. The resulting product, 0384077F3C120B983FC is obtained.

STAGE 3

The output of the exponential constant adder 65 is set in the exponent holding circuit 66_3. 13 bits from $2^{71}$ to $2^{59}$ of the multiplying circuit 73_1 is set in the partial square root value holding circuit 74_1 as a first partial square root value made up of one bit for sign and 12 bits for data. The output of the exception detecting information holding circuit 62_2 is set in the 62_3. The output of the residue holding circuit 72_2 is set in the 72_3. The output of the table output information holding circuit 71_2 is set in the 71_3. In the shifter 75_1, the output of the residue holding circuit 72_3 is left-shifted eleven bit places. The inverting circuit 76_1 is fed the output of the partial square root value holding circuit 74_1, carries out a bit inversion, adds "1" to a least significant bit and outputs it. Furthermore, in the multiplicand generator 77_1, the output of the partial square root value holding circuit 74_1 is padded in $2^{56}$ to $2^{44}$, and other bits are output in the form of zero. The (R+S×T) operation unit 78_1 executes an operation by inputting R which is the output of the shifter 75_1, S which is the output of the multiplicand generator 77_1 and T which is the output of the inverting circuit 76_1. 0FD5E125D3E000 is output from the (R+S×T) operation unit 78_1. On the other hand, the constant subtracter 79_1 subtracts 1 from LSB of the output of the partial square root value holding circuit 74_1. When the output of the (R+S×T) operation unit 78_1 is negative, the multiplexer 80_1 selects the output of the constant subtracter 79_1, while in other cases other than that it selects the output of the partial square root value holding circuit 74_1. At this embodiment, judging from the above condition, the output of the partial square root value holding circuit 74_1 is selected.

STAGE 4

Firstly, the output of the (R+S×T) operation unit 78_1 is set in the residue holding circuit 72_4. Data which align 13 bits of the output of the multiplexer 80_1 in $2^{56}$ to $2^{44}$ and makes other bits zero are set in the merged square root value holding circuit 82_4. The output of the exception detecting information holding circuit 62_3 is set in the 62_4. The output of the exponent holding circuit 66_3 is set in the 66_4. The output of the table output information holding circuit 71_3 is set in the 71_4. 0FD5E125D3E000 of a first residue $R_1$ set in the residue holding circuit 72_4 is multiplied by 091A1 output from the table output information holding circuit 71_4 by means of the multiplying circuit 73_2, thereby outputting the resulting product, 009021A0905CC1FE000.

STAGE 5

0090 from $2^{72}$ to $2^{60}$ of the output of the multiplying circuit 73_2 is set in the partial square root value holding circuit 74_2, as a second partial square root value comprised of one bit for sign and 12 bits for data. The output of the exception detecting information holding circuit 62_4 is set in the 62_5. The output of the exponent holding circuit 66_4 is set in the 66_5. The output of the residue holding circuit 72_4 is set in the 72_5. The output of the merged square root value holding circuit 82_4 is set in the 82_5. The output of the table output information holding circuit 71_4 is set in the 71_5. In the shifter 75_2, the output of the residue holding circuit 72_5 is left-shifted eleven bit places. In the inverting circuit 76_2, 0090 is inverted, becomes 1F6F, is fed "1" as a least significant bit, and is output. The (R+S×T) operation unit 78_2 executes an operation with 1F70 as a practical multiplier. On the other hand, in the multiplicand generator 77_2, the output of the merged square root value holding circuit 82_5 is left-shifted one bit place while at the same time 12 bits except the leading bit of 13 bits output from the partial square root value holding circuit 74_2 are padded into $2^{44}$ to $2^{33}$, 0E1012000000000 being output. The (R+S×T) operation unit 78_2 executes the operation (R+S×T) by inputting R which is the output of the shifter 75_2, S which is the output of the multiplicand generator 77_2 and T which is the output of the inverting circuit 76_2. 1E672E9F000000 is output from the (R+S×T) operation 78_2. The multiplexer 80_2 selects the output of the partial square root holding circuit 74_2 and outputs it. With regard to the output of the merged square root value holding circuit 82_5 and the output of the multiplexer 80_2, the adder 81_2 aligns 13 bits in $2^{45}$ to $2^{33}$, inputs them, executes addition and outputs 07081200000000.

STAGE 6

Firstly, the output of the (R+S×T) operation unit 78_2 is set in the residue holding circuit 72_6. The output of the adder 81_2 is set in the merged square root value holding circuit 82_6. The output of the exception detecting information holding circuit 62_5 is set in the 62_6. The output of the exponent holding circuit 66_5 is set in the 66_6. The output of the table output information holding circuit 71_5 is set in the 71_6. 1E672E9F000000 of a second residue $R_2$ set in the residue holding circuit 72_6 is multiplied by 091A1 output from the table output information holding circuit 71_6 by means of the multiplying circuit 73_3. The resulting product, 0114B904C60FF000000 is output.

STAGE 7

In the first place, 0115 of $2^{72}$ to $2^{60}$ of the output after a rounding off at the place of $2^{59}$ of the multiplying circuit 73_3 is set in the partial square root value holding circuit 74_3, as a third partial square root value comprised of one bit for sign and 12 bits for data. The output of the exception detecting information holding circuit 62_6 is set in the 62_7. The output of the exponent holding circuit 66_6 is set in the 66_7. The output of the residue holding circuit 72_6 is set in the 72_7. The output of the merged square root value holding circuit 82_6 is set in the 82_7. The output of the table output information holding circuit 71_6 is set in the 71_7. In the shifter 75_3, the output of the residue holding circuit 72_7 is left-shifted eleven bit places. In the inverting circuit 76_3, 0115 is inverted, becomes 1EEA, is fed "1" as a least significant bit and is output. The (R+S×T) operation unit 78_3 executes an operation with 1EEB as a practical multiplier. On the other hand, in the multiplicand generator 77_3, the output of the merged square root value holding circuit 82_7 is left-shifted one bit place while at the same time 12 bits except the leading bit of 13 bits output from the partial square root value holding circuit 74_3 are padded into $2^{33}$ to $2^{22}$ to output 0E1024045400000. The (R+S×T) operation unit 78_3 executes the operation (R+S×T) by inputting R which is the output of the shifter 75_3, S which is the output of the multiplicand generator 77_3 and T which is the output of the inverting circuit 76_3. C2056D11C00000 is output from the (R+S×T) operation 78_3. The multiplexer 80_3 selects the output of the constant subtractor 79_3 and outputs it. With regard to the output of the merged square root value holding circuit 82_7 and the output of the multiplexer 80_3, the adder 81_3 aligns 13 bits in $2^{34}$ to $2^{22}$, inputs them, executes an addition and outputs 070812045000000.

STAGE 8

Firstly, the output of the (R+S×T) operation unit 78_3 is set in the residue holding circuit 72_8. The output of the adder 81_3 is set in the merged square root value holding circuit 82_8. The output of the exception detecting information holding circuit 62_7 is set in the 62_8. The output of the exponent holding circuit 66_7 is set in the 66_8. The output of the table output information holding circuit 71_7 is set in the 71_8. C2056D11C00000 of a third residue $R_3$ set in the residue holding circuit 72_8 is multiplied by 091A1 output from the table output information holding circuit 71_8 by means of the multiplying circuit 73_4. The resulting product, 1DCBE1830A5E9C00000 is output.

STAGE 9

In the first place, 1DCC of $2^{72}$ to $2^{60}$ of the output after the execution of a rounding off at the place of $2^{59}$ of the multiplying circuit 73_4 is set in the partial square root value holding circuit 74_4, as a fourth partial square root value comprised of one bit for sign and 12 bits for data. The output of the exception detecting information holding circuit 62_8 is set in the 62_9. The output of the exponent holding circuit 66_8 is set in the 66_9. The output of the residue holding circuit 72_8 is set in the 72_9. The output of the merged square root value holding circuit 82_8 is set in the 82_9. The output of the table output information holding circuit 71_8 is set in the 71_9. In the shifter 75_4, the output of the residue holding circuit 72_9 is left-shifted eleven bit places. In the inverting circuit 76_4, 1DCC is converted into 0233 by bit inversion, is fed "1" as a least significant bit and is output. The (R+S×T) operation unit 78_4 executes an operation with 0234 as a practical multiplier. On the other hand, in the multiplicand generator 77_4, the output of the merged square root value holding circuit 82_9 is left-shifted one bit place while at the same time 12 bits except the leading bit of 13 bits output from the partial square root value holding circuit 74_4 are padded into $2^{22}$ to $2^{11}$ to output 0E1024-08A6E6000. The (R+S×T) operation unit 78_4 executes the operation (R+S×T) by inputting R which is the output of the shifter 75_4, S which is the output of the multiplicand generator 77_4 and T which is the output of the inverting circuit 76_4. E4-5EBEFB2B8000 is output from the (R+S×T) operation 78_4. The multiplexer 80_4 selects the output of the constant subtracter 79_4 and outputs it. With regard to the output of the merged square root value holding circuit 82_9 and the output of the multiplexer 80_4, the adder 81_4 aligns 13 bits in $2^{21}$ to $2^{11}$, inputs them, executes an addition and outputs 0708120452E5000.

STAGE 10

Firstly, the output of the (R+S×T) operation unit 78_4 is set in the residue holding circuit 72_10. The output of the adder 81_4 is set in the merged square root value holding circuit 82_10. The output of the exception detecting information holding circuit 62_9 is set in the 62_10. The output of the exponent holding circuit 66_9 is set in the 66_10. The output of the table output information holding circuit 71_9 is set in the 71_10. E45EBEFB2B8000 of a fourth residue $R_4$ set in the residue holding circuit 72_8 is multiplied by 091A1 output from the table output information holding circuit 71_10 by means of the multiplying circuit 73_5. The resulting product, 1F04849C25F99DB8000 is output.

STAGE 11

In the first place, 1DCC of $2^{72}$ to $2^{60}$ of the output after the execution of a rounding off at the place of $2^{59}$ of the multiplying circuit 73_5 is set in the partial square root value holding circuit 74_5, as a fifth partial square root value comprised of one bit for sign and 12 bits for data. The output of the exception detecting information holding circuit 62_10 is set in the 62_11. The output of the exponent holding circuit 66_10 is set in the 66_11. The output of the residue holding circuit 72_10 is set in the 72_11. The output of the merged square root value holding circuit 62_10 is set in the 62_11. The output of the table output information holding circuit 71_10 is set in the 71_11. In the shifter 75_5, the output of the residue holding circuit 72_11 is left-shifted eleven bit places. In the inverting circuit 76_5, 1F05 is converted into 00FA by bit inversion, is fed "1" as a least significant bit and is output. The $(R+S\times T)$ operation unit 78_5 executes an operation with 00FB as a practical multiplier. On the other hand, in the multiplicand generator 77_5, the output of the merged square root value holding circuit 82_11 is left-shifted one bit place while at the same time 12 bits except the leading bit of 13 bits output from the partial square root value holding circuit 74_5 are padded into $2^{11}$ to $2^0$ to output 0E102408A5CBF05. The $(R+S\times T)$ operation unit 78_5 executes the operation $(R+S\times T)$ by inputting R which is the output of the shifter 75_5, S which is the output of the multiplicand generator 77_5 and T which is the output of the inverting circuit 76_5. 932D2104EF49E7 is output from the $(R+S\times T)$ operation 78_5. The multiplexer 80_5 selects the output of the constant subtractor 79_5 and outputs it. With regard to the output of the merged square root value holding circuit 82_11 and the output of the multiplexer 80_5, the adder 81_5 aligns 13 bits in $2^{12}$ to $2^0$, inputs them, executes an addition and outputs 0708120452E5F04.

STAGE 12

Firstly, the output of the $(R+S\times T)$ operation unit 78_5 is set in the residue holding circuit 72_12. The output of the adder 81_5 is set in the merged square root value holding circuit 82_12. The output of the exception detecting information holding circuit 62_11 is set in the 62_12. The output of the exponent holding circuit 66_11 is set in the 66_12. The exception detector 83 carries out a positive-negative check for operands input by the output of the exception detecting information holding circuit 62_12 so that it can detect a data exception when operands input are negative, informing an external instruction executing control unit, connected to the floating-point vector square root operation device, of the fact that a data exception is occurring. In the case of the numeric values used here, the operand is positive. Therefore, no data exceptions are detected.

As the result of the above, the results, namely "0" as being a sign bit for $2^{63}$, 11 bits output from the exponent holding circuit 66_12 as being exponent parts for $2^{62}$ to $2^{52}$, and $2^{53}$ to $2^2$ output from the merged square root value holding means as being significand parts for $2^{51}$ to $2^0$ are selected respectively, and are output from the vector square root operation devices in FIGS. 5 and 6 in the form of 5E3C2048114B97C1.

FOURTH EMBODIMENT

Figure 7:
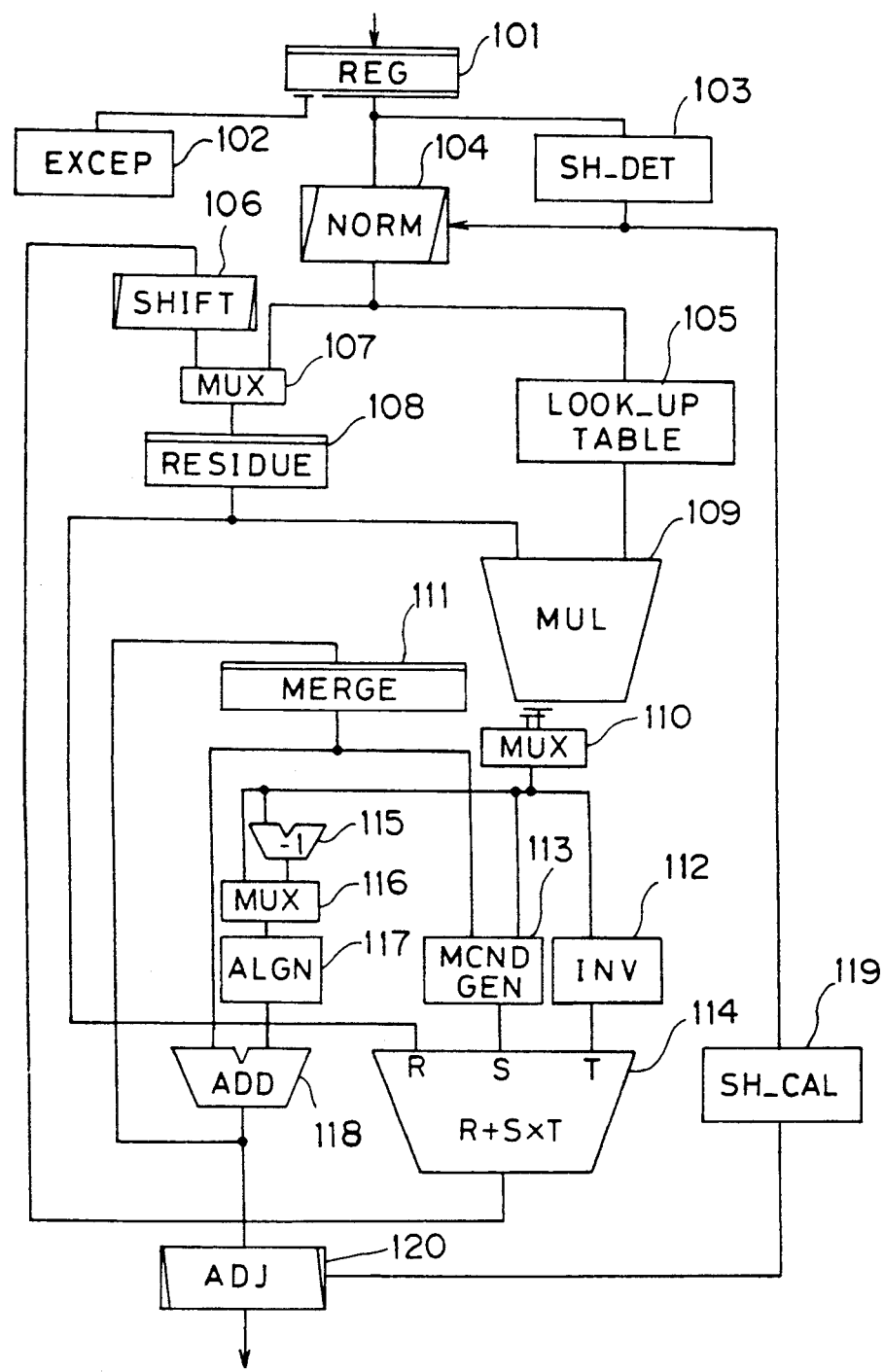
FIG. 7 is a block diagram of a floating-point square root operation device of a fourth embodiment of the present invention.

FIG. 7 is a block diagram of a fixed-point square root operation device in accordance with a fourth embodiment of the invention. In the fixed-point square root operation device of the fourth embodiment, a 64-bit fixed-point number in 2s complement representation is input and a 32-bit square root in 2s complement representation is output, in which a bit length as being data for a partial square root value is "12" and there is a 1-bit overlap between partial square root values. In FIG. 7, the reference numeral 101 denotes an input register; 102, an exception detector; 103, a normalizing shift count detector; 104, a normalizing circuit; 105, a table information storing unit; 106, a shifter; 107, a multiplexer; 108, a residue holding circuit; 109, a multiplying circuit; 110, a multiplexer; 111, a merged square root value holding circuit; 112, an inverting circuit; 113, a multiplicand generator; 114, a $(R+S\times T)$ operation unit; 115, a constant subtracter; 116, a multiplexer; 117, a digit aligning circuit; 118, an adder; 119, a digit adjustment shift count calculator; and 120, a digit adjustor.

The operation of the fixed-point square root operation device of FIG. 7 will be described using specified numeric values. FIGS. 8A-8C show a process in which an operand input is processed at each means. In the first place, 000614CB57ED84AD is input as a operand, which is set in the input register 101. The exception detector 102 carries out a checking for first two leading bits of the operand input. In other words, the exception detector 102 detects a data exception when these two digits are "10" or "11", and further detects an overflow exception when they are "01", informing an external instruction executing control unit, connected to the fixed-point square root operation device, of the fact that an exception is occurring. In the numeric values used here, no exception is detected (this premise will be omitted below). The normalizing shift count detector 103 detects the number of shifts in order to carry out bit-normalization in a two bit unit, from which "12" is output. The normalizing circuit 104 receives from the normalizing shift count detector 103 an instruction (i.e., the shift count=12) so that it left-shifts the input data twelve bit places and outputs it. The table information storing unit 105 is fed 12 bits from $2^{63}$ to $2^{52}$ of the normalizing circuit 104, from which 0CFA4 is output. Additionally, the bit of $2^{51}$ of the normalizing circuit 104 shall be inverted and added to this output as a least significant bit, however, "0" is added thereto in this embodiment instead. 0CFA4 becomes a practical multiplier in the multiplying circuit 109. The multiplexer 107 selects the output with the addition of a 4-bit zero at its leading end of the normalizing circuit 104. This output thus selected is set in the residue holding circuit 108, at which point in time the merged square root value holding circuit 111 is reset to zero. In the multiplying circuit 109, 0614CB57ED84AD000 is multiplied by 0CFA4 and the resulting product, 04EEB5BE5D6270E1D4000 is found while at the same time results, obtained by rounding off the product at the place of $2^{67}$ at the first iteration and at the place of $2^{68}$ at the following iteration, are fed to the multiplexer 110. The multiplexer 110 selects 13 bits from $2^{80}$ to $2^{68}$ of the multiplying circuit 109 as a first partial square root value comprising of one bit for sign and 12 bits for data. The inverting circuit 112 is fed the partial square root value, carries out a bit inversion, adds "1" to its least significant bit and outputs it. The sign of the first partial square root value is positive and a sign bit is "0". In the multiplicand generator 113, the output of the multiplexer 110 is padded into $2^{54}$ to $2^{42}$ while other bits are output in the form of zero, at the first iteration. The $(R+S\times T)$ operating unit 114 executes the operation $(R+S\times T)$ by inputting R which is the output of the residue holding circuit 108, S which is the output of the multiplicand generator 113 and T which is the output of the inverting circuit 112. FFFF0317ED84AD000 output from the $(R+S\times T)$ operation unit 114 is left-shifted by the shifter 106 eleven bit places, is selected by the multiplexer 107, and is set in the residue holding circuit 108. On the other hand, the constant subtracter 115 subtracts "1" from LSB of the output of the multiplexer 110. When the output of the (R+S×T) operation unit 114 is negative, the multiplexer 116 selects the output of the constant subtracter 115. On the other hand, in other cases other than that, it selects the output of the multiplexer 110. At the first iteration, judging from the above conditions, the output of the constant subtracter 115 is selected. The digit aligning circuit 117 carries out a digit adjustment in order to merge partial square root values at each iteration. In other words, when the partial square root value is negative, first two leading bits of 13 bits of the output of the multiplexer 116 are inhibited to zero. On the other hand, when the partial square root value is positive, these 13 bits of the output of the multiplexer 116 are shifted so as to establish a bit weight balance against a merged square root value at a high-order position and are output. On the first partial square root value, input data are aligned in $2^{54}$ to $2^{42}$ and are output. The adder 118 executes an addition by inputting the output of the merged square root value holding circuit 111 and the output of the digit aligning circuit 117 and sets the result in the merged square root value holding circuit 111.

Then, a second iterative computation begins. The output of the table information storing unit 105 stays unchanged at the second and subsequent iterative computations (i.e., is the same as the one at the first iterative computation), F818BF6C256800000 of a first residue $R_1$ set in the residue holding circuit 108 is multiplied by OCFA4 by means of the multiplying circuit 109, and the resulting product, F996F2A313870EA000000 is output. 1CCB from $2^{81}$ to $2^{69}$ is selected by the multiplexer 110 as a second partial square root value comprising of one bit for sign and 12 bits for data. In the inverting circuit 112, 1CBB is converted into 0334 by means of bit inversion, is fed "1" as a least significant bit, and is output. The (R+S×T) operation unit 114 executes an operation with 0335 as a practical multiplier. On the other hand, in the multiplicand generator 113, the output of the merged square root value holding circuit 111 is left-shifted one bit place while at the same time 12 bits except the leading bit of 13 bits output from the multiplexer 110 are padded into $2^{42}$ to $2^{31}$ to output 027766580000000. The (R+S×T) operation unit 114 executes the operation (R+S×T) by inputting R which is the output of the residue holding circuit 108, S which is the output of the multiplicand generator 113 and T which is the output of the inverting circuit 112. 0001AAA45D6800000 output from the (R+S×T) operation unit 114 is left-shifted eleven bit places by the shifter 106, which is selected by the multiplexer 107 and set in the residue holding circuit 108. The multiplexer 116 selects the output of the multiplexer 110 and outputs it. The digit aligning circuit 117 zero-inhibits first two leading bits of the input of 13 bits and aligns the remaining 11 bits in $2^{41}$ to $2^{31}$. The adder 118 executes an addition by inputting the output of the merged square root value holding circuit 111 and the output of the digit aligning circuit 117 and outputs 13BA65800000000. In the merged square root value holding circuit 111, the output of the adder 118 is set.

Next, a third iterative computation commences. The output of the table information storing unit 105 still remains the same as the first iterative computation. 0D5522EB400000000 of a second residue $R_2$ set in the residue holding circuit 108 is multiplied by OCFA4 by means of the multiplying circuit 109, and the resulting product. 0AD061C69775000000000 is output. 0568 of $2^{81}$ to $2^{69}$ is selected by the multiplexer 110, as a third partial square root value comprising of one bit for sign and 12 bits for data. In the inverting circuit 112, 0568 is converted into 1A97 by means of bit inversion, is fed "1" as a least significant bit and is output. In the (R+S×T) operation unit 114, an operation is executed with 1A98 as a practical multiplier. On the other hand, in the multiplicand generator 113, the output of the merged square root value holding circuit 111 is left-shifted one bit place while at the same time 12 bits except the leading bit of 13 bits output from the multiplexer 110 are padded into $2^{31}$ to $2^{20}$ to output 02774CB56800000. The (R+S×T) operation unit 114 executes the operation (R+S×T) by inputting R which is the output of the residue holding circuit 108, S which is the output of the multiplicand generator 113 and T which is the output of the inverting circuit 112. 00002C3685C000000 output from the (R+S×T) operation unit 114 is output. The multiplexer 116 selects the output of the multiplexer 110 and outputs it. The digit aligning circuit 117 aligns the input of 13 bits in $2^{32}$ to $2^{20}$. The adder 118 executes an addition by inputting the output of the merged square root value holding circuit 111 and the output of the digit aligning circuit 117, and outputs 13BA65D68000000. The digit adjustment shift count calculator 119 right-shifts "12", received from the normalizing shift count detector 103, one bit place, making it "6". Then the digit adjustment shift count detector 119 adds a constant, or "25" to it and outputs "31". The digit adjustor 120 right-shifts the output of the adder 118 by "31" as instructed by the digit adjustment shift count calculator 119 and outputs the final result (i.e., 02774CBA).

FIFTH EMBODIMENT

Figure 9:
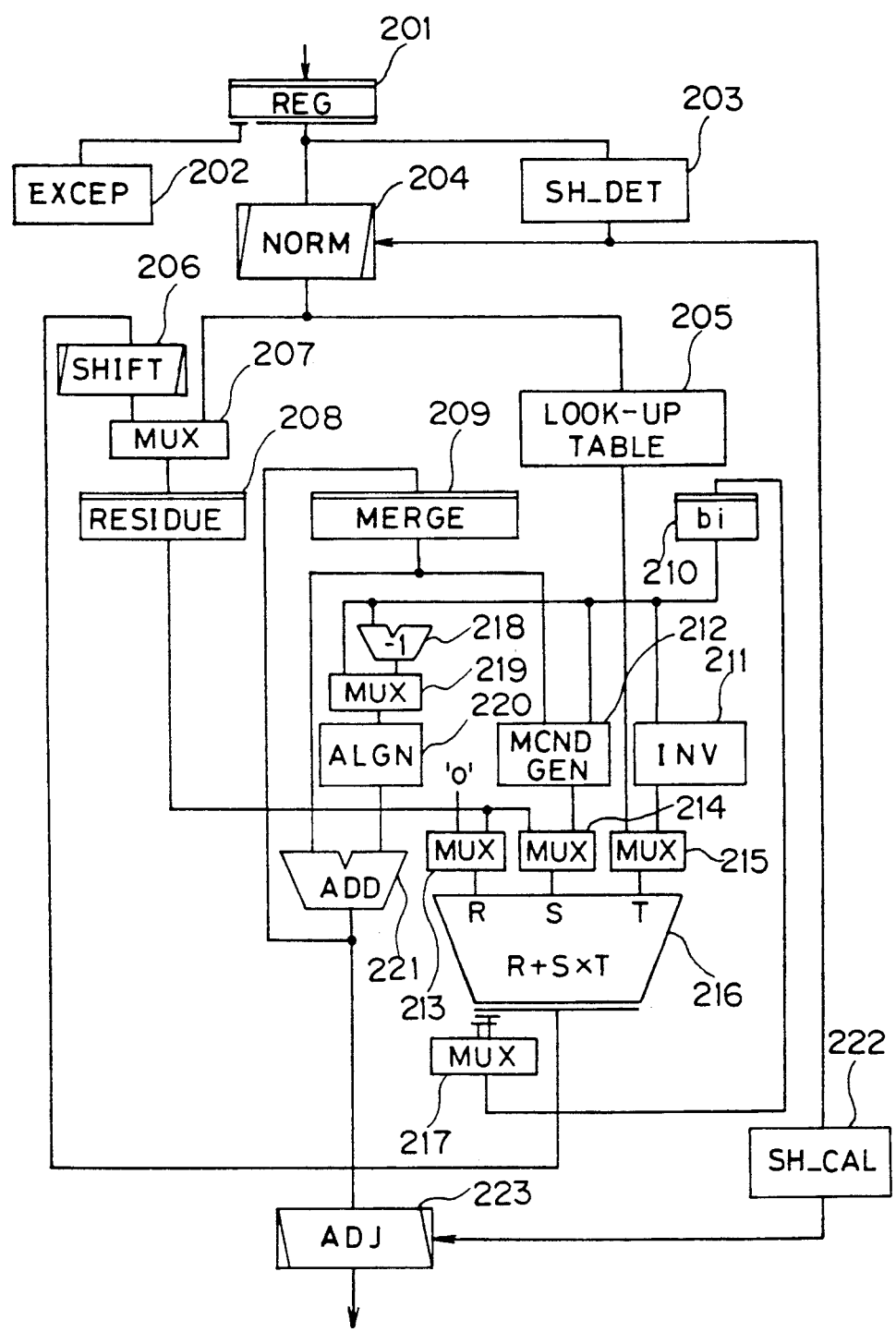
FIG. 9 is a block diagram of a floating-point square root operation device of a fifth embodiment of the present invention.

FIG. 9 is a block diagram of a fixed-point square root operation device in accordance with a fifth embodiment of the invention. In the fixed-point square root operation device of the fifth embodiment, a 64-bit fixed-point number in 2s complement representation is input and a 32-bit square root in 2s complement representation is output, in which a bit length as being data for a partial square root value is "12" and there is a 1-bit overlap between partial square root values. In FIG. 9, the reference numeral 201 denotes an input register; 202, an exception detector; 203, a normalizing shift count detector; 204, a normalizing circuit; 205, a table information storing unit; 206, a shifter; 207, a multiplexer; 208, a residue holding circuit; 209, a merged square root value holding circuit; 210, a partial square root value holding circuit; 211, an inverting circuit; 212, a multiplicand generator; 213 to 215, multiplexers; 216, a (R+S×T) operation unit; 217, a multiplexer; 218, a constant subtracter; 219, a multiplexer; 220, a digit aligning circuit; 221, an adder; 222, a digit adjustment shift count calculator; and 223, a digit adjustor.

The operation of the fixed-point square root operation device of FIG. 9 will be described using specific numeric values. In the same way as the fourth embodiment in FIG. 8, an operand input is processed at each means. In the first place, 000614CB57ED84AD is input as a operand, and is set in the input register 201. The exception detector 202 carries out a checking for first two leading bits of the operand input. In other words, the exception detector 202 detects a data exception when these two bits are "10" or "11", and further detects an overflow exception when they are "01", informing an external instruction executing control unit, connected to the fixed-point square root operation device, of the fact that an exception is occurring. In the case of the numeric values used here, no exceptions are detected (this premise will be omitted below). The normalizing shift count detector 203 detects the number of shifts in order to carry out bit-normalization in a two bit unit and outputs "12". The normalizing circuit 204 receives from the normalizing shift count detector 203 an instruction (i.e., the shift count=12), left-shifts the input data twelve bit places and outputs it. The table information storing unit 205 is fed 12 bits from $2^{63}$ to $2^{52}$ of the normalizing circuit 204, from which 0CFA4 is output. Further, the bit of $2^{51}$ of the normalizing circuit 204 shall be inverted and added to this output as a least significant bit, however, "0" is added thereto in this embodiment instead. 0CFA4 becomes a practical multiplier in the (R+S×T) operation unit 216. The multiplexer 207 selects the output with the addition of a 4-bit zero at its leading end of the normalizing circuit 204. This output thus selected is set in the residue holding circuit 208, at which point in time the merged square root value holding circuit 209 is reset to zero. The multiplexers 213, 214 and 215 select '0', the output of the residue holding circuit 208 and the output of the table information storing unit 205 respectively. In the (R+S×T) operation unit 216, 0614CB57ED84AD000 is multiplied by 0CFA4, and the resulting product, 04EEB5BED6270E1D4000 is found while at the same time results, obtained by rounding off the product at the place of $2^{67}$ at the first iteration and at the place of $2^{68}$ at the subsequent iteration, are output to the multiplexer 217. The multiplexer 217 selects 13 bits from $2^{80}$ to $2^{68}$ of the (R+S×T) operation unit 216 as a first partial square root value comprising of one bit for sign and 12 bits for data. This partial square root value is set in the partial square root value holding circuit 210. The inverting circuit 210 receives the output of the partial square root value holding circuit 210, bit-inverts it, extends a 4-bit sign to a high-order position, adds 1 to its least significant bit and outputs it. In the multiplicand generator 212, the output of the partial square root value holding circuit 210 is padded into $2^{54}$ to $2^{42}$ while other bits are output in the form of zero, at the first iteration. The multiplexers 213, 214 and 215 select the output of the residue holding circuit 208, the output of the multiplicand generator 212 and the output of the inverting circuit 211 respectively. The (R+S×T) operating unit 216 executes the operation (R+S×T) by inputting R which is the output of the multiplexer 213, S which is the output of the multiplexer 214 and T which is the output of the multiplexer 215. FFFF0317ED84AD000 output from the (R+S×T) operation unit 216 is left-shifted eleven bit places by the shifter 206, is selected by the multiplexer 207, and is set in the residue holding circuit 208. On the other hand, the constant subtracter 218 subtracts 1 from LSB of the output of the partial square root value holding circuit 210. When the output of the (R+S×T) operation unit 216 is negative, the multiplexer 219 selects the output of the constant subtractor 218, while in other cases other than that it selects the output of the partial square root value holding circuit 210. At the first iteration, judging from the above conditions, the output of the constant subtracter 218 is selected. The digit aligning circuit 220 carries out a digit adjustment in order to merge partial square root values at each iteration. In other words, when the partial square root value is negative, first two leading bits of 13 bits of the output of the multiplexer 219 are inhibited to zero. On the other hand, when the partial square root value is positive, these 13 bits of the output of the multiplexer 219 are shifted so as to establish a bit weight balance against a merged square root values at a high-order position and are output. On the first partial square root value, input data are aligned in $2^{54}$ to $2^{42}$ and are output. The adder 221 executes an addition by inputting the output of the merged square root value holding circuit 209 and the output of the digit aligning circuit 220, and sets the result in the merged square root value holding circuit 209.

Then, a second iterative computation begins. The output of the table information storing unit 205 stays unchanged at the second and subsequent iterative computations (i.e., stays the same as the one at the first iterative computation). The multiplexers 213, 214 and 215 select '0', F818BF6C256800000 of a first residue $R_1$ that is set in the residue holding circuit 208 and 0CFA4 which is the output of the table information storing unit 205 respectively. The (R+S×T) operation unit 49 executes the operation (S×T), thereby outputting the resulting product, F996F2A313870EA000000. 1CCB from $2^{81}$ to $2^{69}$ is selected by the multiplexer 217 as a second partial square root value comprising of one bit for sign and 12 bits for data. This partial square root value is set in the partial square root value holding circuit 210. The inverting circuit 211 inverts 1CCB, extends a 4-bit sign to a high-order position, makes it 0034, adds "1" as its least significant bit and outputs it. The (R+S×T) operation unit 216 executes an operation with 00335 as a practical multiplier. On the other hand, in the multiplicand generator 212, the output of the merged square root value holding circuit 209 is left-shifted one bit place while at the same time 12 bits except the leading bit of 13 bits output from the partial square root value holding circuit 210 are padded into $2^{42}$ to $2^{31}$ to output 027766580000000. The multiplexers 213, 214 and 215 select the output of the residue holding circuit 208, the output of the multiplicand generator 212 and the output of the inverting circuit 211 respectively. The (R+S×T) operation unit 216 executes the operation (R+S×T) by inputting R (i.e., the output of the multiplexer 213), S (the output of the multiplexer 214) and T (the output of the multiplexer 215). 0001AAA45D6800000 output by the (R+S×T) operation unit 216 is left-shifted eleven bit places by the shifter 206, is selected by the multiplexer 207 and is set in the residue holding circuit 208. The multiplexer 219 selects the output of the partial square root holding circuit 210 and outputs the selected output. The digit aligning circuit 220 inhibits first two leading bit of the input of 13 bits to zero and aligns the remaining 11 bits in $2^{41}$ to $2^{31}$. The adder 220 execute an addition by inputting the output of the merged square root value holding circuit 209 and the output of the digit aligning circuit 220 and outputs 13BA65800000000. In the merged square root value holding circuit 209, the output of the adder 221 is set.

Next, a third iterative computation commences. The output of the table information storing unit 205 still remains unchanged (i.e., stays the same as the one at the first iterative computation). The multiplexers 213, 214 and 215 select '0', 0D5522EB400000000 of a second residue $R_2$ set in the residue holding circuit 208 and 0CFA4 which is the output of the table information storing unit 205 respectively. The (R+S×T) operation unit 216 executes the operation (S×T) and outputs the resulting product, 0AD061C69775000000000. 0568 of $2^{81}$ to $2^{69}$ is selected by the multiplexer 217 as a third partial square root value comprised of one bit for sign and 12 bits for data. This partial square root value is set in the partial square root value holding circuit 210. The inverting circuit 211 inverts 0568, extends a 4-bit sign to a high-order position, makes it 1FA97, adds "1" as its least significant bit and outputs it. The (R+S×T) operation unit 216 executes an operation with 1FE98 as a practical multiplier. On the other hand, in the multiplicand generator 212, the output of the merged square root value holding circuit 209 is left-shifted one bit place while at the same time 12 bits except the leading bit of 13 bits output by the partial square root value holding circuit 210 are padded into $2^{31}$ to $2^{20}$ to output 02774CB56800000. The multiplexers 213, 214 and 215 select the outputs of the residue holding circuit 208, the multiplicand generator 212 and the inverting circuit 211 respectively. The (R+S×T) operation unit 216 executes the operation (R+S×T) by inputting R which is the output of the multiplexer 213, S which is the output of the multiplexer 214 and T which is the output of the multiplexer 215. 00002C3685C000000 is output by the (R+S×T) operation unit 216. The multiplexer 219 selects the output of the partial square root value holding circuit 210 and outputs the selected output. The digit aligning circuit 220 aligns the input comprised of 13 bits in $2^{32}$ to $2^{20}$. The adder 221 executes an addition by inputting the output of the merged square root value holding circuit 209 and the output of the digit aligning circuit 220 and outputs 13BA65D68000000. In the digit adjustment shift count calculator 222, "12" from the normalizing shift count detector 203 is right-shifted one bit place to make it "6" and then is fed a constant (="25") to output "31". In the digit adjustor 223, the output of the adder 221 is right-shifted by "31" as instructed by the digit adjustment shift count calculator 222, so that 02774CBA is output as a final result.

SIXTH EMBODIMENT

Figure 10:
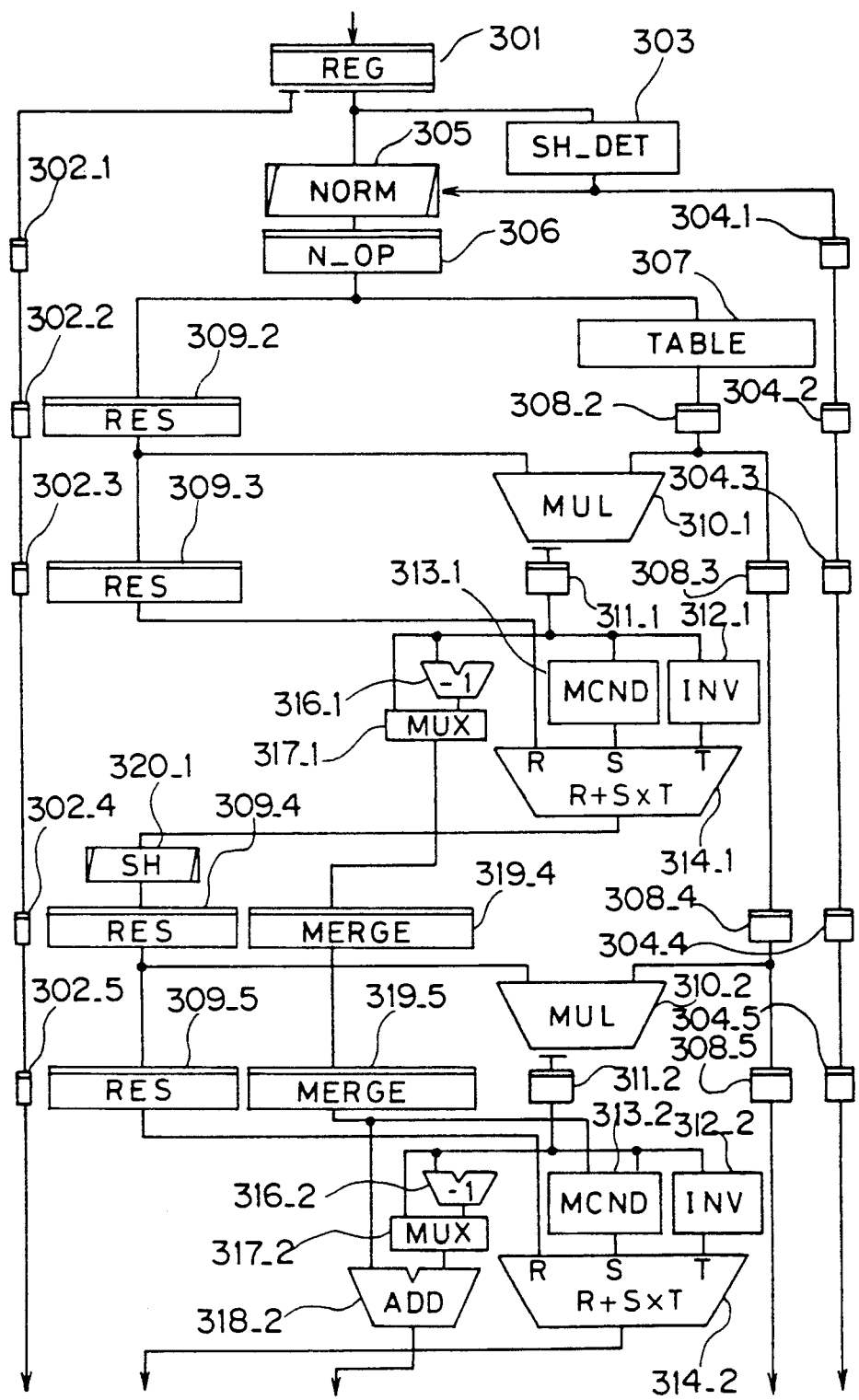
FIG. 10 is a block diagram showing one half of a floating-point vector square root operation device of a sixth embodiment of the invention.
Figure 11:
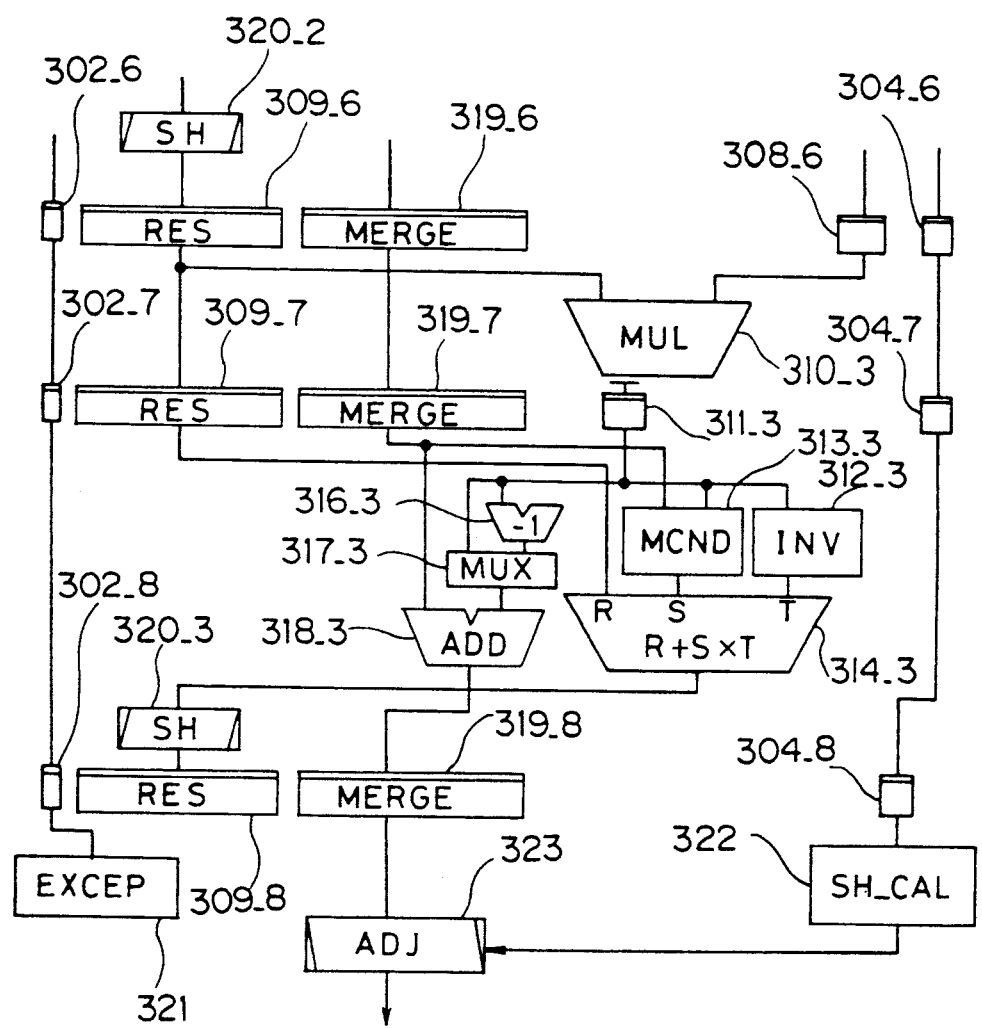
FIG. 11 is a block diagram showing the other half of the floating-point vector square root operation device in FIG. 10.

FIGS. 10 and 11 are block diagrams of a fixed-point vector square root operation device in accordance with a sixth embodiment of the invention. In the fixed-point vector square root operation device of the instance embodiment, a 64-bit fixed-point number vector in 2s complement representation is input in element order and a 32-bit square root vector in 2s complement representation is output in element order wherein a bit length as being data of a partial square root value is "12" and there is a 1-bit overlap between partial square root values. In FIGS. 10 and 11, the reference numeral 301 denotes an input register; 302_1 to 302_8, exception detecting information holding circuits; 303, a normalizing shift count detector; 304_1 to 304_8, normalizing shift count holding circuits; 305, a normalizing circuit; 306, a normalized operand register; 307, a table information storing unit; 308_2 to 308_6, table output information holding circuits; 309_2 to 309_8, residue holding circuits; 310_1 to 310_3, multiplying circuits; 311_1 to 311_3, partial square root value holding circuits; 312_1 to 312_3, inverting circuits; 313_1 to 313_3, multiplicand generators; 314_1 to 314_3, (R+S×T) operation units; 316_1 to 316_3, constant subtracters; 317_1 to 317_3, multiplexers; 318_1 to 318_2, adders; 319_4 to 319_8, merged square root value holding circuit; 320_1 to 320_3, shifters; 321, an exception detector; 322, a digit adjustment shift count calculator; and 323, a digit adjustor.

The operation of the fixed-point vector square root operation device of FIGS. 10 and 11 will be described using specific numeric values. In the same manner as FIGS. 8A–8C used in the fourth embodiment, an operand of one of elements of a vector input is processed subsequently at each means. The process of how one element is processed at each stage is described below.

STAGE 0

First, 000614CB57ED84AD is input as an operand, which then is set in the input register 301. The normalizing shift count detector 303 detects the number of shifts for carrying out bit-normalization in a two bit unit, from which "12" is output. The normalizing circuit 305 receives from the normalizing shift count detector 303 an instruction (i.e., the number of shifts=12) and left-shifts the input data twelve bit places to output it.

STAGE 1

In the first place, first two leading bits of the output of the input register 301 are set in the exception detecting information holding circuit 302_1. The output of the normalizing circuit 305 is set in the normalized operand register 306. The output of the normalizing shift count detector 303 is set in the normalizing shift count holding circuit 304_1. The table information storing unit 307 is fed 12 bits from $2^{63}$ to $2^{52}$ of the normalized operand register 306, from which 0CFA4 is output. Although one bit of $2^{51}$ of the normalized operand register 306 shall be inverted and added to the output 0CFA4 as a least significant bit, "0" is added in this embodiment instead, and a practical multiplier in the multiplying circuits 310_1 to 310_3 is 0CFA4.

STAGE 2

The output of the exception detecting information holding circuit 302_1 is set in the 302_2. The output of the normalized operand register 306 with the addition of a 4-bit zero in its leading end is set the residue holding circuit 309_2. The output of the table information storing unit 307 is set in the table output information holding circuit 308_2. The output of the normalizing shift count holding circuit 304_1 is set in the 304_2. In the multiplying circuit 310_1, 0614CB57ED84AD0000 is multiplied by 0CFA4. The resulting product, 04EEB5-BE5D6270E1D4000 is obtained.

STAGE 3

First, 13 bits from $2^{80}$ to $2^{68}$ of the multiplying circuit 310_1 is set in the partial square root value holding circuit 311_1 as a first partial square root value comprised of one bit for sign and 12 bits for data. The output of the exception detecting information holding circuit 302_2 is set in the 302_3. The output of the residue holding circuit 309_2 is set in the 309_3. The output of the table output information holding circuit 308_2 is set in the 308_3. The output of the normalizing shift count holding circuit 304_2 is set in the 304_3. In the inverting circuit 312_1, the output of the partial square root value holding circuit 311_1 is input, is inverted, is added "1" as its least significant bit, and is output. Furthermore, in the multiplicand generator 313_1, the output of the partial square root value holding circuit 311_1 is padded into $2^{54}$ to $2^{42}$ while other bits are output in the form of zero. The (R+S×T) operation unit 314_1 executes an operation by inputting R which is the output of the residue holding means 309_3, S which is the output of the multiplicand generator 313_1 and T which is the output of the inverting circuit 312_1. FFFF0317ED84AD000 output from the (R+S×T) operation unit 314_1 is left-shifted eleven bit places by shifter 320_1. On the other hand, the constant subtracter 316_1 subtracts "1" from the least significant bit in the output of the partial square root value holding circuit 311_1. When the output of the (R+S×T) operation unit 314_1 is negative, the multiplexer 317_1 selects the output of the constant subtracter 316_1 while, in other cases other than that, it selects the output of the partial square root value holding circuit 311_1. In this embodiment, judging from the above conditions, the output of the constant subtracter 316_1 is selected.

STAGE 4

Firstly, the output of the shifter 320_1 is set in the residue holding circuit 308_4. Data which align 13 bits output by the multiplexer 317_1 in $2^{54}$ to $2^{42}$ and makes other bits zero are set in the merged square root value holding circuit 319_4. The output of the exception detecting information holding circuit 302_3 is set in the 302_4. The output of the table output information holding circuit 308_3 is set in the 308_4. The output of the normalizing shift count holding circuit 304_3 is set in the 304_4. F818BF6C256800000 of a first residue $R_1$ set in the residue holding circuit 309_4 is multiplied by 0CFA4 output from the table output information holding circuit 308_4 by means of the multiplying circuit 310_2. The resulting product, F996F2A3138-70EA000000 is output.

STAGE 5

1CCB of $2^{81}$ to $2^{69}$ of the output of the multiplying circuit 310_2 is set in the partial square root value holding circuit 311_2, as a second partial square root value comprised of one bit for sign and 12 bits for data. The output of the exception detecting information holding circuit 302_4 is set in the 302_5. The output of the residue holding circuit 309_4 is set in the 309_5. The output of the merged square root value holding circuit 319_4 is set in the 319_5. The output of the table output information holding circuit 308_4 is set in the 308_5. The output of the normalizing shift count holding circuit 304_4 is set 304_5. In the inverting circuit 312_2, 1CCB is converted into 0334 by means of bit inversion, is added "1" as its least significant bit and is output. The (R+S×T) operation unit 314_2 executes an operation with 0335 as a practical multiplier. On the other hand, in the multiplicand generator 313_2, the output of the merged square root value holding circuit 319_5 is left-shifted one bit place while at the same time 12 bits except the leading bit of 13 bits output by the partial square root value holding circuit 311_2 are padded into $2^{42}$ to $2^{31}$ to output 027766580000000. The (R+S×T) operation unit 314_2 executes the operation (R+S×T) by inputting R which is the output of the residue holding circuit 309_5, S which is the output of the multiplicand generator 313_2, T which is the output of the inverting circuit 312_2. 0001AAA45D6800000 output from the (R+S×T) operation 314_2 is left-shifted eleven bit places by means of the shifter 320_2. The multiplexer 317_2 selects the output of the partial square root holding circuit 311_2, inhibits first two leading bits thereof to zero, outputs the remaining 11 bits. The adder 318_1 aligns the outputs of the merged square root value holding circuit 319_5 and the multiplexer 317_2 in $2^{41}$ to $2^{31}$, inputs them, executes an addition and outputs 13BA65800000000.

STAGE 6

Firstly, the output of the shifter 320_2 is set in the residue holding circuit 309_6. The output of the adder 318_1 is set in the merged square root value holding circuit 319_6. The output of the exception detecting information holding circuit 302_5 is set in the 302_6. The output of the table output information holding circuit 308_5 is set in the 308_6. The output of the normalizing shift count holding circuit 304_5 is set in the 304_6. 0D5522EB400000000 of a second residue $R_2$ set in the residue holding circuit 309_6 is multiplied by 0CFA4 output from the table output information holding circuit 308_4 by means of the multiplying circuit 310_3. The resulting product, 0AD061C697750000000 is output.

STAGE 7

0568 of $2^{81}$ to $2^{69}$ of the output of the multiplying circuit 310_2 is set in the partial square root value holding circuit 311_3, as a third partial square root value comprised of one bit for sign and 12 bits for data. The output of the exception detecting information holding circuit 302_6 is set in the 302_7. The output of the residue holding circuit 309_6 is set in the 309_7. The output of the merged square root value holding circuit 319_6 is set in the 319_7. The output of the normalizing shift count holding circuit 304_6 is set in the 304_7. In the inverting circuit 312_3, 0568 is converted into 1A97 by means of bit inversion, is added "1" as its least significant bit and is output. The (R+S×T) operation unit 314_3 executes an operation with 1A98 as a practical multiplier. On the other hand, in the multiplicand generator 313_3, the output of the merged square root value holding circuit 319_7 is left-shifted one bit place while at the same time 12 bits except the leading bit of 13 bits output by the partial square root value holding circuit 311_3 are padded into $2^{31}$ to $2^{20}$ to output 02774CB56800000. The (R+S×T) operation unit 314_3 executes the operation (R+S×T) by inputting R which is the output of the residue holding circuit 309_7, S which is the output of the multiplicand generator 313_3 and T which is the output of the inverting circuit 312_3. 00002C3685C000000 output from the (R+S×T) operation 314_3 is left-shifted eleven bit places by means of the shifter 320_3. The multiplexer 317_3 the output of the partial square root holding circuit 311_3 and outputs 13 bits. The adder 318_3 aligns the outputs of both the merged square root value holding circuits 319_7 and the multiplexer 317_3 in $2^{32}$ to $2^{20}$, inputs them, executes an addition and outputs 13BA65D68000000.

STAGE 8

First, the output of the shifter 320_3 is set in the residue holding circuit 309_8. The output of the adder 318_2 is set in the merged square root value holding circuit 319_8. The output of the exception detecting information holding circuit 302_7 is set in the 302_8. The output of the normalizing shift count holding circuit 304_7 is set in the 304_8. The exception detector 321 carries out a checking for the two bits output by the exception detector 321. In other words, the exception detector 321 detects a data exception when these two bits are in the form of "10" or "11", and further detects an overflow exception when they are in the form of "01", informing an external instruction executing control unit, connected to the fixed-point vector square root operation device, of the fact that such an exception is occurring. In the case of the numeric values used here, no exceptions are detected. In the digit adjustment shift count calculator 322, "12" from the normalizing shift count holding circuit 304_8 is right-shifted one bit place to give "6" and then is fed a constant (="25") to output "31". In the digit adjustor 323, the output of the merged square root value holding circuit 319_8 is right-shifted by "31" as instructed by the digit adjustment shift count calculator 322, so that 02774CBA is output as final result.

SEVENTH EMBODIMENT

Figure 16:
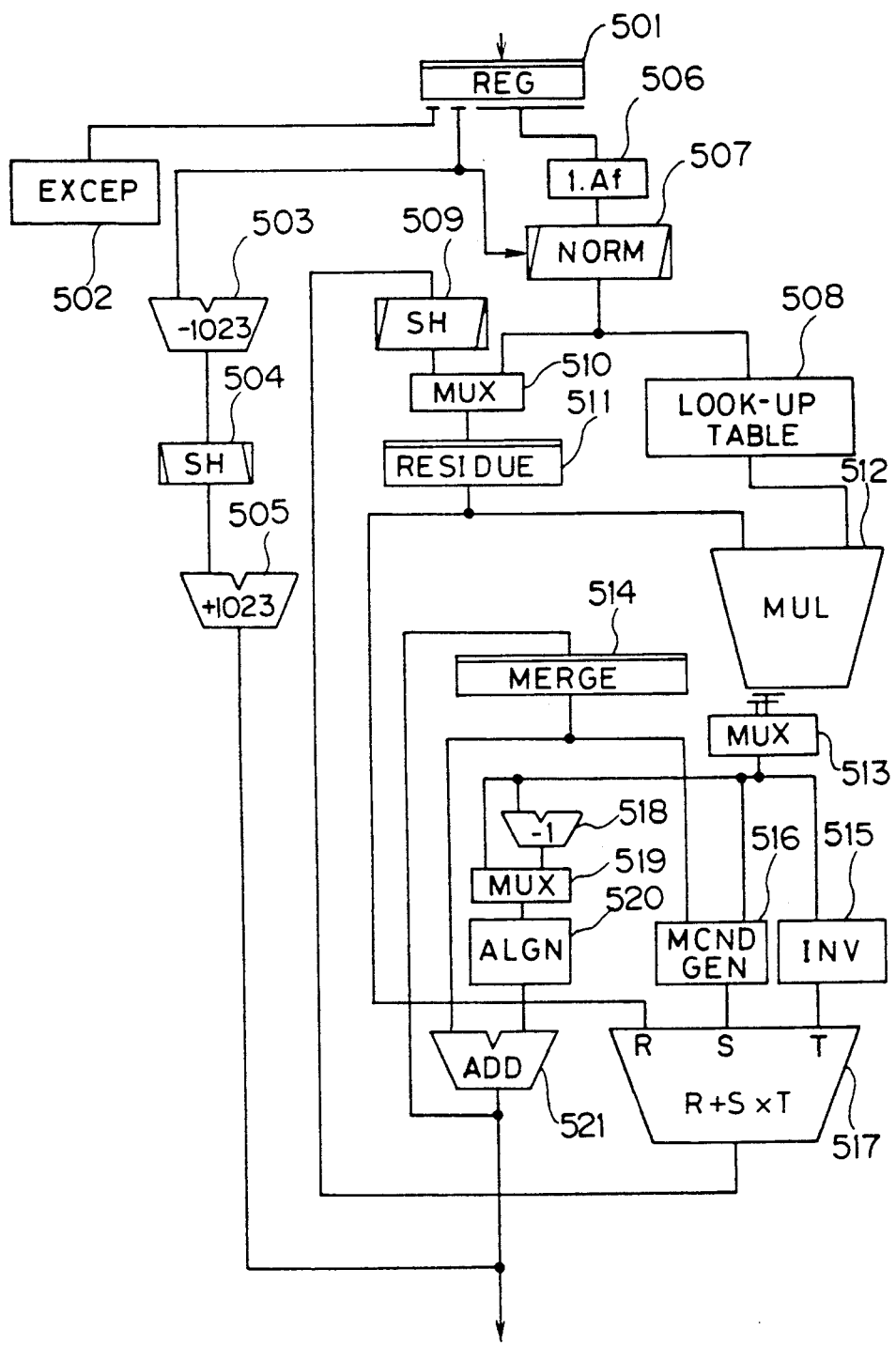
FIG. 16 is a block diagram of a floating-point square root operation device of a seventh embodiment of the present invention.

FIG. 16 is a block diagram of a floating-point square root operation device in accordance with a seventh embodiment of the invention. In the floating-point square root operation device of this embodiment, a double-precision floating-point number in an IEEE standard is input and the square root of the double-precision floating-point number is output, wherein a bit length as being data of a partial square root value is "12" and there is a 1-bit overlap between partial square root values. In FIG. 16, the reference numeral 501 denotes an input register; 502, an exception detector; 503, an exponential constant subtracter; 504, a shifter; 505, an exponential constant adder; 506, a leading-bit adding circuit; 507, a normalizing circuit; 508, a table information storing unit; 509, a shifter; 510, a multiplexer; 511, a residue holding circuit; 512, a multiplying circuit; 513, a multiplexer; 514, a merged square root value holding circuit; 515, an inverting circuit; 516, a multiplicand generator; 517, a $(R+S\times T)$ operation unit; 518, a constant subtracter; 519, a multiplexer; 520, a digit aligning circuit; and 521, an adder.

The operation of the floating-point square root operation device of FIG. 16 will be described using specific numeric values. FIGS. 17A-C and 18A-C show a process in which an operand is input and then is processed at each means. In the first place, 7C88B89EAF092E9F is input as a operand, and is set in the input register 501. The exception detector 502 carries out a positive-negative check for operands so that it can detect a data exception if an operand input is negative and then informs an external instruction executing control unit, connected to the floating-point square root operation device, of the fact that such a data exception is occurring. In the case of numeric values used here, the operand is a positive one (hereinafter, this premise is emitted). Therefore, no data exceptions are detected by the exception detector 2. From the exponents of $2^{62}$ to $2^{52}$ in the output of the input register 501, 3FF is subtracted by the exponential constant subtracter 503. Then these exponents are right-shifted one bit place by the shifter 504. Thereafter, 3FF is added again by the exponential constant adder 5 to the exponents, so that the resulting exponent is found. In the leading-bit adding circuit 506, to the significand parts of $2^{51}$ to $2^0$ of the output of the input register 501, "1" serving as a leading bit is added to the leading end thereof. In the normalizing circuit 507, if the bit of $2^{52}$ of the output of the input register 501 is "1", the input is output after left-shifting it twelve bit places while if the same is "0", the input is output after left-shifting it thirteen bit places. The table information storing unit 508 is fed 12 bits from $2^{65}$ to $2^{54}$ of the normalizing circuit 507, from which 091A0 is output. Further, the bit of $2^{53}$ of the normalizing circuit 507 should inverted and added to this output to make it serve as a least significant bit, however, "1" is added instead in this embodiment, and 091A1 serves as a practical multiplier in the multiplying circuit 512. The multiplexer 510 selects the output of the normalizing circuit 507 and outputs it. This output is set in the residue holding circuit 511, at which point in time the merged square root value holding circuit 514 is reset to zero. In the multiplying circuit 512, 31713D5E125D3E000 is multiplied by 091A1, and the resulting product, that is, 1C203BF9E0905CC1FE000 is found while at the same time results, obtained by rounding off the product at the place of $2^{69}$ at the first iteration and at the place of $2^{70}$ at subsequent iteration are fed to the multiplexer 513. The multiplexer 513 selects 13 bits from $2^{82}$ to $2^{70}$ of the multiplying circuit 512 as a first partial square root value comprised of one bit for sign and 12 bits for data. The partial square root value is input into the inverting circuit 515 in which it is inverted, is added "1" as its least significant bit, and is output. Furthermore, in the multiplicand generator 516, the output of the multiplexer 513 is padded into $2^{56}$ to $2^{44}$ while other bits are output in the form of zero, at the first iteration. The $(R+S\times T)$ operating unit 517 executes the operation $(R+S\times T)$ by inputting R that is the output of the residue holding circuit 511, S that is the output of the multiplicand generator 516 and T that is the output of the inverting circuit 515. 0000FD5E125D3E000 output from the $(R+S\times T)$ operation unit 517 is left-shifted eleven bit places by the shifter 509, is selected by the multiplexer 510 and is set in the residue holding circuit 511. On the other hand, the constant subtracter 518 subtracts "1" from the least significant bit of the output of the multiplexer 513. When the output of the $(R+S\times T)$ operation unit 517 is negative, the multiplexer 519 selects the output of the constant subtracter 518 while it selects the output of the multiplexer 513 when the output of the $(R+S\times T)$ operation unit 517 is one other than negative. At the first iteration, judging from the above conditions, the output of the multiplexer 513 is selected. The digit aligning circuit 520 carries out a digit adjustment in order to merge individual partial square root values at each iteration. In other words, when the partial square root value is negative, first two leading bits of 13 bits of the output of the multiplexer 519 are inhibited to zero. On the other hand, when the partial square root value is positive, these 13 bits of the multiplexer 519 are shifted so as to establish a bit weight balance against a merged square root value at a high-order position and are output. On the first partial square root value, input data are aligned in $2^{56}$ to $2^{44}$ and are output. The adder 521 executes an addition by inputting the output of the merged square root value holding circuit 514 and the output of the digit aligning circuit 520, and sets the result in the merged square root value holding circuit 514.

Then, a second iterative computation begins. The output of the table information storing unit 508 stays unchanged at the second and subsequent iterative computations (i.e., is the same as the one at the first iterative computation). 07EAF092E9F000000 of a first residue $R_1$ set in the residue holding circuit 511 is multiplied by 091A1 by the multiplying circuit 512, and the resulting product, 04810D0482E60FF000000 is output. 0090 from $2^{83}$ to $2^{71}$ is selected by the multiplexer 513 as a second partial square root value comprised of one bit for sign and 12 bit for data. In the inverting circuit 515, 0090 is converted into 1F6F by means of bit inversion, is added "1" as its least significant bit, and is output. The $(R+S\times T)$ operation unit 517 executes an operation with 1F70 as a practical multiplier. On the other hand, in the multiplicand generator 516, the output of the merged square root value holding circuit 514 is left-shifted one bit place while at the same time 12 bits except the leading bit of 13 bits output from the multiplexer 510 are padded into $2^{44}$ to $2^{33}$ to output 0E1012000000000. The $(R + S \times T)$ operation unit 517 executes the operation $(R + S \times T)$ by inputting R which is the output of the residue holding circuit 511, S which is the output of the multiplicand generator 516 and T which is the output of the inverting circuit 515. 0001E672E9F000000 output from the $(R+S \times T)$ operation unit 517 is left-shifted eleven bit place by means of the shifter 509, is selected by the multiplexer 510 and is set in the residue holding circuit 511. The multiplexer 519 selects the output of the multiplexer 513 and outputs the selected output. The digit aligning circuit 520 aligns the input of 13 bits in $2^{45}$ to $2^{33}$. The adder 521 executes an addition by inputting the output of the merge square root value holding circuit 514 and the output of the digit aligning circuit 520 and outputs 070812000000000. In the merged square root value holding circuit 514, the output of the adder 521 is set.

Next, a third iterative computation commences. The output of the table information storing unit 508 still remains unchanged (i.e., is the same as the one at the first iterative computation). A second residue $R_2$, 0F33974F800000000 set in the residue holding circuit 511 is multiplied by 091A1 by means of the multiplying circuit 11, and the resulting product, the product, 08A5C826307F800000000 is output. 0115 of $2^{83}$ to $2^{71}$ after the execution of a rounding off at the place of $2^{70}$ is selected by the multiplexer 513, as a third partial square root value comprised of one bit for sign and 12 bits for data. In the inverting circuit 515, 0115 is inverted, becomes 1EEA, is fed "1" as its least significant bit and is output. In the $(R+S \times T)$ operation unit 517, an operation is executed with IEEB as a practical multiplier. On the other hand, in the multiplicand generator 516, the output of the merged square root value holding circuit 514 is left-shifted one bit place while at the same time 12 bits except the leading bit of 13 bits output by the multiplexer 513 are padded into $2^{33}$ to $2^{22}$ to output 0E1024045400000. The $(R+S \times T)$ operation unit 517 executes the operation $(R+S \times T)$ by inputting R (the output of the residue holding circuit 511), S (the output of the multiplicand generator 516) and T (the output of the inverting circuit 515). FFFC2056D11C00000 output from the R+S$\times$T) operation unit 517 is left-shifted by the shifter 509 eleven bit places, is selected by the multiplexer 510, and is set in the residue holding circuit 511. The multiplexer 519 selects the output of the constant subtracter 518 and outputs the selected output. The digit aligning circuit 520 aligns the input of 13 bits in $2^{34}$ to $2^{22}$. The adder 521 executes an addition by inputting the output of the merged square root value holding circuit 514 and the output of the digit aligning circuit 520 and outputs 070812045000000. In the merged square root value holding circuit 514, the output of the adder 521 is set.

Then a fourth iterative computation begins. The output of the table information storing unit 508 still remains unchanged (i.e., is the same as the one at the first iterative computation). E102B688E00000000 of a third residue $R_3$ which is set in the residue holding circuit 511 is multiplied by 091A1 by means of the multiplying circuit 512, and the resulting product, EE5F0C1852-F4E00000000 is output. 1DCC of $2^{83}$ to $2^{71}$ after the execution of a rounding off at the place of $2^{70}$ is selected by the multiplexer 513, as a fourth partial square root value comprised of one bit for sign and 12 bits for data. In the inverting circuit 515, 1DCC is inverted, becomes 0233, is added "1" as its least significant bit and is output. The $(R+S \times T)$ operation unit 517 executes an operation using 0234 as a practical multiplier. On the other hand, in the multiplicand generator 516, the output of the merged square root value holding circuit 514 is left-shifted one bit place while at the same time 12 bits except the leading bit of 13 bits output from the multiplexer 513 are padded into $2^{22}$ to $2^{11}$ to output 0E1024-08A6E6000. The $(R+S \times T)$ operation unit 517 executes the operation $(R+S \times T)$ by inputting R which is the output of the residue holding circuit 511, S which is the output of the multiplicand generator 516 and T which is the output of the inverting circuit 515. FFFE4-5EBEFB2B8000 output from the $(R+S \times T)$ operation unit 517 is left-shifted by the shifter 509 eleven bit places, is selected by the multiplexer 510 and then is set in the residue holding circuit 511. The multiplexer 519 selects the output of the constant subtracter 518 and outputs the selected output. The digit aligning circuit 520 inhibits first two leading bits of the input of 13 bits to zero and aligns the remaining 11 bits into $2^{21}$ to $2^{11}$. The adder 521 executes an addition by inputting the output of the merged square root value holding circuit 514 and the output of the digit aligning circuit 520, and outputs 0708120452E5000. In the merged square root value holding circuit 514, the output of the adder 521 is set.

Finally, a fifth iterative computation starts. The output of the table information storing unit 508 still remains the same as the first iterative computation. F22F5F7D95C000000 of a fourth residue $R_4$ which is set in the residue holding circuit 511 is multiplied by 091A1 by the multiplying circuit 512, and the resulting product, F82424E12FCCEDC000000 is output. 1F05 of $2^{83}$ to $2^{71}$ after the execution of a rounding off at the place of $2^{70}$ is selected by the multiplexer 513, as a fifth partial square root value comprised of one bit for sign and 12 bits for data. In the inverting circuit 515, 1F05 is inverted, becomes 00FA, is added "1" as a least significant bit and is output. The $(R+S \times T)$ operation unit 517 executes an operation with 00FB as a practical multiplier. On the other hand, in the multiplicand generator 516, the output of the merged square root value holding circuit 514 is left-shifted one bit place while at the same time 12 bits except the leading bit of the output of 13 bits output from the multiplexer 513 are padded into the positions from $2^{11}$ to $2^0$ to output 0E1024-08A5CBF05. The $(R+S \times T)$ operation unit 517 executes the operation $(R+S \times T)$ by inputting R which is the output of the residue holding circuit 511, S which is the output of the multiplicand generator 516 and T which is the output of the inverting circuit 515. Output from the $(R+S \times T)$ operation unit 517 is FFF932D2104EF49E7. The multiplexer 519 selects the output of the constant subtracter 518 and outputs it. The digit aligning circuit 520 inhibits first two leading bits of the input of 13 bits to zero, and aligns the remaining 11 bits in $2^{10}$ to $2^0$. The adder 521 executes an addition by inputting the output of the merged square root value holding circuit 514 and the output of the digit aligning circuit 520, and outputs 0708120452E5F04.

Accordingly, the final results, namely "0" as being a sign bit for $2^{63}$, 11 bits output by the exponential constant adder 505 as being exponent parts for $2^{62}$ to $2^{52}$, and $2^{53}$ to $2^2$ of the adder 521 as being significand parts for $2^{51}$ to $2^0$ are selected respectively, and are output from the square root operation device as shown in FIG. 16 in the form of 5E3C2048114B97C1.

EIGHTH EMBODIMENT

Figure 19:
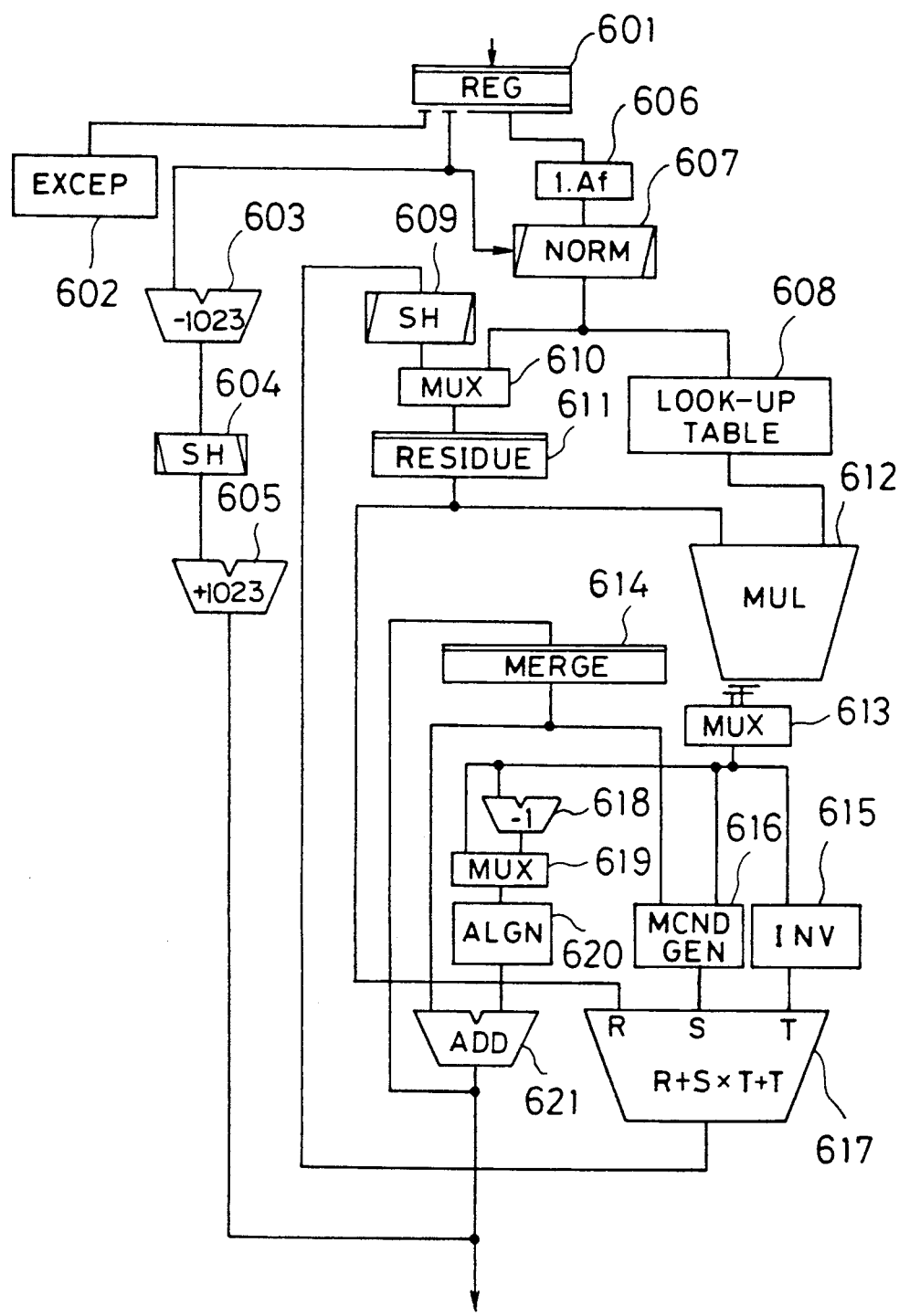
FIG. 19 is a block diagram of a floating-point square root operation device of an eighth embodiment of the present invention.

FIG. 19 is a block diagram of a floating-point square root operation device in accordance with an eighth embodiment of the invention. In the floating-point square root operation device of the this embodiment, a double-precision floating-point number in an IEEE standard is input and the square root of the double-precision floating-point number is output, in which a bit length as being data for a partial square root value is "12" and there is a 1-bit overlap between partial square root values. In FIG. 19, the reference numeral 601 denotes an input register; 602, an exception detector; 603, an exponential constant subtracter; 604, a shifter; 605, an exponential constant adder; 606, a leading-bit adding circuit; 607, a normalizing circuit; 608, a table information storing unit; 609, a shifter; 610, a multiplexer; 611, a residue holding circuit; 612, a multiplying circuit; 613, a multiplexer; 614, a merged square root value holding circuit; 615, an inverting circuit; 616, a multiplicand generator; 617, a ($R+S \times T+T$) operation unit; 618, a constant subtracter; 619, a multiplexer; 620, a digit aligning circuit; and 621, an adder.

The operation of the floating-point square root operation device of FIG. 19 will be described using specific numeric values. FIGS. 20A–20C and 21A–21C show a process in which an operand input is processed at each means. In the first place, 104C4EBDC46C3EBE is input as a operand, which is set in the input register 601. The exception detector 602 carries out a positive-negative check for operands so that it can detect a data exception if an operand input is negative, informing an external instruction executing control unit, connected to the floating-point square root operation device, of the fact that a data exception is occurring. In the case of the numeric values used here, the operand is a positive one (hereinafter, this premise is emitted). Therefore, no data exceptions are detected. From the exponents of $2^{62}$ to $2^{52}$ in the output of the input register 601, 3FF is subtracted by the exponential constant subtracter 603. Then these exponents are right-shifted one bit place by the shifter 604. Thereafter, 3FF is added by the exponential constant adder 605 to the exponents again, so that the resulting exponent are found. In the leading-bit adding circuit 606, to the significand parts of $2^{51}$ to $2^0$ in the output of the input register 601, "1" as a leading bit is added to the leading end thereof. In the normalizing circuit 607, if the bit of $2^{52}$ of the output of the input register 601 is "1", the input is output after left-shifting it twelve bit places while if the same is "0", the input is output after left-shifting it thirteen bit places. The table information storing unit 608 is fed 13 bits from $2^{65}$ to $2^{53}$ of the normalizing circuit 607, from which 0881A is output. Additionally, the bit of $2^{52}$ of the normalizing circuit 607 shall be inverted and added to this output as a least significant bit, however, "1" is added thereto in the instant embodiment instead, and 0881B serves as a practical multiplier in the multiplying circuit 612. The multiplexer 610 selects the output of the normalizing circuit 607, and the output thus selected is set in the residue holding circuit 611, at which point in time the merged square root value holding circuit 614 is reset to zero. In the multiplying circuit 612, 389C9B88D87D7C000 is multiplied by 0881B, and the resulting product, that is, 1E192B251A717F1C14000 is found. The multiplexer 613 selects 13 bits from $2^{82}$ to $2^{70}$ of the multiplying circuit 612 as a first partial square root value comprised of one bit for sign and 12 bits for data. The partial square root value is input into the inverting circuit 615, is inverted therein, is added "1" as its least significant bit and is output, however, if the partial square root value is negative at the fifth iteration, "0" is added as a least significant bit thereof in the inverting circuit 615 so as to correct the fact that the partial square root is calculated a little greater in a negative direction. Furthermore, in the multiplicand generator 616, the output of the multiplexer 613 is padded into $2^{56}$ to $2^{44}$ while other bits are output in the form of zero, at the first iteration. The ($R+S \times T+T$) operating unit 617 executes the operation ($R+S \times T+T$) only when the partial square root value is negative at the fifth iteration and, in other cases other than that, executes the operation ($R+S \times T$), by inputting R that is the output of the residue holding circuit 611, S that is the output of the multiplicand generator 616 and T that is the output of the inverting circuit 615. By carrying out a digit adjustment in order that a corresponding bit to the least significant bit of a partial square root goes to the place of $2^0$, $+T$ in ($R+S \times T+T$) is input into a carry-save adder tree. 00027788D87D7C000 output from the ($R+S \times T+T$) operation unit 617 is left-shifted eleven bit places by the shifter 609, is selected by the multiplexer 610, and is set in the residue holding circuit 611. On the other hand, the constant subtracter 618 subtracts "1" from LSB of the output of the multiplexer 613. When the output of the multiplexer 613 is positive and the output of the ($R+S \times T+T$) operation unit 617 is negative, the multiplexer 619 selects the output of the constant subtracter 618 while it selects the output of the multiplexer 613 in other cases other than that. At the first iteration, judging from the above conditions, the output of the multiplexer 613 is selected. The digit aligning circuit 620 carries out a digit adjustment in order to merge individual partial square root values at each iteration. More specifically, when the partial square root value is negative, first two leading bits of 13 bits of the output of the multiplexer 619 are inhibited to zero. On the other hand, when the partial square root value is positive, these 13 bits of the output of the multiplexer 619 are shifted so as to establish a bit weight balance against a merged square root value at a high-order position and then are output. On the first partial square root value, input data are aligned in $2^{56}$ to $2^{44}$ and are output. The adder 621 executes an addition by inputting the output of the merged square root value holding circuit 614 and the output of the digit aligning circuit 620, and sets the result in the merged square root value holding circuit 614.

Then, a second iterative computation begins. The output of the table information storing unit 608 stays unchanged at the second and subsequent iterative computations (i.e., is the same as the one at the first iterative computation). 13BC46C3EBE000000 of a first residue $R_1$ set in the residue holding circuit 611 is multiplied by 0881B by the multiplying circuit 612, and the resulting product, 0A7E1A738BF8E0A000000 is output. 014F of $2^{83}$ to $2^{71}$ is selected by the multiplexer 613 as a second partial square root value comprised of one bit for sign and 12 bit for data. In the inverting circuit 615, 014F is converted into 1EB0 by means of bit inversion, is added "1" as its least significant bit, and is output. The ($R+S \times T+T$) operation unit 617 executes an operation with 1EB1 as a practical multiplier. On the other hand, in the multiplicand generator 616, the output of the merged square root value holding circuit 614 is left-shifted one bit place while at the same time 12 bits except the leading bit of 13 bits output from the multiplexer 613 are padded into $2^{44}$ to $2^{33}$ to output 0F0C29E000000000. The $(R+S\times T+T)$ operation unit 617 executes the operation $(R+S\times T)$ by inputting R which is the output of the residue holding circuit 611, S which is the output of the multiplicand generator 616 and T which is the output of the inverting circuit 615. 000B5BF7CBE000000 output from the $(R+S\times T+T)$ operation unit 617 is left-shifted eleven bit place by means of the shifter 609, is selected by the multiplexer 610 and is set in the residue holding circuit 611. The multiplexer 619 selects the output of the multiplexer 613 and outputs the selected output. The digit aligning circuit 620 aligns the input of 13 bits in $2^{45}$ to $2^{33}$. The adder 621 executes an addition by inputting the output of the merged square root value holding circuit 614 and the output of the digit aligning circuit 620, and outputs 078629E00000000. In the merged square root value holding circuit 614, the output of the adder 621 is set.

Next, a third iterative computation commences. The output of the table information storing unit 608 still remains unchanged (i.e., is the same as the one at the first iterative computation). A second residue $R_2$, 5ADFBE5F000000000 set in the residue holding circuit 611 is multiplied by 0881B by means of the multiplying circuit 612, and the resulting product, the product, 305072BB8C05000000000 is output. 060A of $2^{83}$ to $2^{71}$ is selected by the multiplexer 613, as a third partial square root value comprised of one bit for sign and twelve bits for data. In the inverting circuit 615, 060A is inverted, becomes 19F5, is fed "1" as its least significant bit and is output. In the $(R+S\times T+T)$ operation unit 617, an operation is executed with 19F6 as a practical multiplier. On the other hand, in the multiplicand generator 616, the output of the merged square root value holding circuit 614 is left-shifted one bit place while at the same time 12 bits except the leading bit of 13 bits output by the multiplexer 613 are padded into $2^{33}$ to $2^{22}$ to output 0F0C53D82800000. The $(R+S\times T+T)$ operation unit 17 executes the operation $(R+S\times T)$ by inputting R (the output of the residue holding circuit 611), S (the output of the multiplicand generator 616) and T (the output of the inverting circuit 615). FFFF4C079E7000000 output from the $(R+S\times T+T)$ operation unit 617 is left-shifted by the shifter 609 eleven bit places, is selected by the multiplexer 610, and is set in the residue holding circuit 611. The multiplexer 619 selects output of the constant subtracter 618 and outputs the selected output. The digit aligning circuit 620 aligns the input of 13 bits in $2^{34}$ to $2^{22}$. The adder 621 executes an addition by inputting the output of the merged square root value holding circuit 614 and the output of the digit aligning circuit 620, and outputs 078629F82400000. In the merged square root value holding circuit 614, the output of the adder 621 is set.

Then a fourth iterative computation begins. The output of the table information storing unit 608 still remains unchanged (i.e., is the same as the one at the first iterative computation). FA603CF3800000000 of a third residue $R_3$ which is set in the residue holding circuit 611 is multiplied by 0881B by means of the multiplying circuit 612, and the resulting product, FD028887C9A-E800000000 is output. 1FA0 of $2^{83}$ to $2^{71}$ is selected by the multiplexer 613, as a fourth partial square root value comprised of one bit for sign and 12 bits for data. In the inverting circuit 615, 1FA0 is inverted, becomes 005F, is added "1" as its least significant bit and is output. The $(R+S\times T+T)$ operation unit 617 executes an operation using 0060 as a practical multiplier. On the other hand, in the multiplicand generator 616, the output of the merged square root value holding circuit 614 is left-shifted one bit place while at the same time 12 bits except the leading bit of 13 bits output from the multiplexer 613 are padded into $2^{22}$ to $2^{11}$ to output 0F0C53F04FD0000. The $(R+S\times T+T)$ operation unit 617 executes the operation $(R+S\times T)$ by inputting R which is the output of the residue holding circuit 611, S which is the output of the multiplicand generator 616 and T which is the output of the inverting circuit 615. 0004DC6D9DEE00000 output from the $(R+S\times T+T)$ operation unit 617 is left-shifted by the shifter 609 eleven bit places, is selected by the multiplexer 610 and is set in the residue holding circuit 611. The multiplexer 619 selects the output of the multiplexer 613, and outputs the selected output. The digit aligning circuit 620 inhibits first two leading bits of the input of 13 bits to zero and aligns the remaining 11 bits in $2^{21}$ to $2^{11}$. The adder 621 executes an addition by inputting the output of the merged square root value holding circuit 614 and the output of the digit aligning circuit 620, and outputs 078629F827D0000. In the merged square root value holding circuit 614, the output of the adder 621 is set.

Finally, a fifth iterative computation starts. The output of the table information storing unit 608 still remains unchanged (i.e., is the same as the one at the first iterative computation). 26E36CEF700000000 of a fourth residue $R_4$ which is set in the residue holding circuit 614 is multiplied by 0881B by the multiplying circuit 612, and the resulting product, 14A-CEBDBB0C0D00000000 is output. 0295 of $2^{83}$ to $2^{71}$ is selected by the multiplexer 613, as a fifth partial square root value comprised of one bit for sign and 12 bits for data. In the inverting circuit 615, 0295 is inverted, becomes 1D6A, is added "1" serving as its least significant bit and is output. The $(R+S\times T+T)$ operation unit 617 executes an operation with 1D6B as a practical multiplier. On the other hand, in the multiplicand generator 616, the output of the merged square root value holding circuit 614 is left-shifted one bit place while at the same time 12 bits except the leading bit of the output of 13 bits output from the multiplexer 613 are padded into $2^{11}$ to $2^{0}$ to output 0F0C53F04FA0295. The $(R+S\times T+T)$ operation unit 617 executes the operation $(R+S\times T)$ by inputting R which is the output of the residue holding circuit 611, S which is the output of the multiplicand generator 616 and T which is the output of the inverting circuit 615. Output from the $(R+S\times T+T)$ operation unit 617 is 00089833F26775547. The multiplexer 619 selects the output of the multiplexer 613, and outputs the selected output. The digit aligning circuit 620 aligns the input of 13 bits in $2^{12}$ to $2^{0}$. The adder 621 executes an addition by inputting the output of the merged square root value holding circuit 614 and the output of the digit aligning circuit 620, and outputs 078629F827D0295. In addition, only when the partial square root is negative and the residue is positive at the fifth iteration, an initial carry is added to $2^{0}$ in the adder 621.

As the result of the above, the final results, namely "0" as being a sign bit for $2^{63}$, 11 bits output by the exponential constant adder 605 as being exponent parts for $2^{62}$ to $2^{52}$, and $2^{53}$ to $2^{2}$ of the adder 621 as being significant parts for $2^{51}$ to $2^0$ are selected respectively, and are output from the square root operation device in FIG. 19 as 281E18A7E09F40A5.

In the vector square root operation devices of the third embodiment (FIGS. 5 and 6) and the sixth embodiment (FIGS. 10 and 11), a number of data holding means are provided, however, the arrangement for such a data holding means in the operation device should be decided, depending upon hardware circuits available in order to suitably obtain a pipeline pitch. To find out an exponent part is carried out more easily than to find out a significant part. Accordingly, in the vector square root operation device according to the third embodiment, it is preferable to insert an operating means for exponents between any exponent holding means until which the operation result as for the exponent has not been found.

Furthermore, in the eighth embodiment (FIG. 19), if the $(R+S\times T+T)$ operation unit is provided in the place of the $(R+S\times T)$ and adding means, which executes a rounding off at a place lower than the least significant digit of the partial square root value, is further included in the multiplying unit, it becomes the seventh embodiment. It is obvious that, like the relationship between the seventh and eighth embodiments, the square root operation device without any rounding off means corresponding to the sixth embodiment can be constructed from the first embodiment in which the rounding off means is provided. Therefore, such an embodiment is not described here.

What I claim is:

1. A square root operation device to find a square root on a floating-point number input operand where a base of an exponent is 2, comprising:

exponential constant subtracting means for removing a bias of the exponent of said floating-point number input operand, exponent shifting means for right-shifting an output of said exponential constant subtracting means one bit place, exponential constant adding means for adding the bias of the exponent to an output of said exponent shifting means, normalizing means for left-shifting, when a value of the exponent less the bias is odd, a mantissa in said floating-point number input operand one bit place in order to cause the value of the exponent less the bias to be even, table information storing means for indexing an approximation of square root's reciprocal by designating high-order bits in an output of said normalizing means as an address, residue holding means for holding a residue when the square root is found by sequentially iterating a fixed number of bits beginning from a high-order position and descending in a downward order, multiplying means for executing a multiplication by inputting the residue output from said residue holding means and the approximation of square root's reciprocal output from said table information storing means, as a multiplicand and a multiplier respectively, merged square root value holding means for holding a merged square root value as a combination of individual partial square root values which are high-order positions in the resulting product output from said multiplying means at each iteration, inverting means for inverting the partial square root value output from said multiplying means at every bit, multiplicand generating means for generating a multiplicand by left-shifting an output of said merged square root value holding means one bit place, with the partial square root value output from said multiplying means, residue shifting means for left-shifting the residue output from said residue holding means by a difference obtained by subtracting a bit length overlapping between the adjacent partial square root values from a bit length of the partial square root value, $(R+S\times T+T)$ operating means for executing the operation $(R+S\times T)$ or the operation $(R+S\times T+T)$ by inputting a residue R output by said residue shifting means after shifting, a multiplicand S output from said multiplicand generating means and a multiplier T output from said inverting means, respectively, a holding data switching multiplexer for selecting either the output of said normalizing means or an output of said $(R+S\times T+T)$ operating means, as an input of said residue holding means, constant subtracting means for subtracting 1 from a least significant bit in the partial square root value output from said multiplying means, a correcting multiplexer for selecting either the partial square root value output from said multiplying means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value.

2. The square root operation device of claim 1, including $(R+S\times T)$ operating means in the place of said $(R+S\times T+T)$ operating means, in order to exclusively execute the operation $(R+S\times T)$, and partial square root value calculation adding means at an outputting stage of said multiplying means in order to execute a rounding off at a place lower than the least significant bit in the partial square root value by one bit.

3. A square root operation device to find a square root on a floating-point number input operand where a base of an exponent is 2, comprising:

exponential constant subtracting means for removing a bias of the exponent of said floating-point number input operand, exponent shifting means for right-shifting an output of said exponential constant subtracting means one bit place, exponential constant adding means for adding the bias of the exponent to an output of said exponent shifting means, normalizing means for left-shifting, when a value of the exponent less the bias is odd, a mantissa in said floating-point number input operand one bit place in order to cause the value of the exponent less the bias to be even, table information storing means for indexing an approximation of square root's reciprocal by designating high-order bits in an output of said normalizing means as an address, residue holding means for holding a residue when the square root is found by sequentially iterating a fixed number of bits beginning from a high-order position and descending in a downward order, partial square root value holding means for holding a partial square root value at each iteration, and merged square root value holding means for holding a merged square root value as a combination of the individual partial square root values at each iteration, residue shifting means for left-shifting the residue output from said residue holding means by a difference obtained by subtracting a bit length overlapping between the adjacent partial square root values from a bit length of the partial square root value, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, a residue multiplexer for selecting either a constant 0 or a residue output by said residue shifting means after shifting, a multiplicand multiplexer for selecting either the residue output from said residue holding means or an output of said multiplicand generating means, a multiplier multiplexer for selecting either the approximation of square root's reciprocal output from said table information storing means or an output of said inverting means, $(R+S\times T+T)$ operating means for executing the operation $(R+S\times T)$ or the operation $(R+S\times T+T)$ by inputting an output R of said residue multiplexer, an output S of said multiplicand multiplexer, and an output T of said multiplier multiplexer, respectively, a holding data switching multiplexer for selecting either the output of said normalizing means or an output of said $(R+S\times T+T)$ operating means, as an input of said residue holding means, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value, wherein high-order positions in the output of said $(R+S\times T+T)$ operating means are sequentially held in said partial square root value holding means, as the partial square root value.

4. The square root operation device of claim 3, including $(R+S\times T)$ operating means in the place of said $(R+S\times T+T)$ operating means, in order to exclusively execute the operation $(R+S\times T)$, and partial square root value calculation adding means at an outputting stage of said $(R+S\times T)$ operating means in order to execute a rounding off at a place lower than the least significant bit in the partial square root value by one bit.

5. A square root operation device to find a square root vector in the order of element on an input operand in the order of element of a vector comprising a floating-point number where a base of an exponent is 2, comprising:

a preprocessing unit for performing a preprocess on said input operand, a main unit provided with first through last main circuits the number of which corresponds to that of iterating processes for repeatedly finding a partial square root value until a bit length of a merged square root value as a combination of the individual partial square root values becomes greater than that of a target square root, and a post-processing unit for performing a post-process on an output of said main unit, said preprocessing unit comprising:

an input register for holding said input operand, exponential constant subtracting means for removing a bias of the exponent form an exponent part in an output of said input register, exponent holding means for holding an output of said exponential constant subtracting means, normalizing means for left-shifting, when a value of the exponent less the bias is odd, a mantissa part in the output of said input register one bit place in order to cause the value of the exponent less the bias to be even, a normalized operand register for holding an output of said normalizing means, exponent shifting means for right-shifting an output of said exponent holding means one bit place, exponential constant adding means for adding the bias of the exponent to an output of said exponent shifting means, and table information storing means for indexing an approximation of square root's reciprocal by designating high-order bits in an output of said normalized operand register as an address, said first main circuit in said main unit comprising:

exponent holding means, residue holding means and table output information holding means which are connected to said exponential constant adding means, said normalized operand register and said table information storing means in said preprocessing unit respectively, in order to synchronize pipeline operations, multiplying means for executing a multiplication by inputting an output of said residue holding means as a multiplicand and an output of said table output information holding means as a multiplier so as to output high-order positions in the resulting product as a partial square root value, partial square root value holding means for holding the partial square root value output from said multiplying means, residue shifting means for left-shifting a residue output from said residue holding means by a difference obtained by subtracting a bit length overlapping between the adjacent partial square root values from a bit length of the partial square root value, inverting means for inverting the partial square root value output from said partial square root value holding means at every bit, multiplicand generating means for generating a multiplicand from the partial square root value output from said partial square root value holding means, (R+S×T+T) operating means for executing the operation (R+S×T) or the operation (R+S×T+T) by inputting a residue R output by said residue shifting means after shifting, a multiplicand S output from said multiplicand generating means and a multiplier T output from said inverting means, respectively, constant subtracting means for subtracting 1 from a least significant bit in the partial square root value output from said partial square root value holding means, and a correcting multiplexer for selecting either the partial square root value output from said partial square root value holding means or an output of said constant subtracting means so as to output the one thus selected as a corrected partial square root value, said second and subsequent main circuits in said main unit each comprising:

exponent holding means, residue holding means, merged square root value holding means and table output information holding means in order to synchronize pipeline operations, multiplying means for executing a multiplication by inputting an output of said residue holding means as a multiplicand and an output of said table output information holding means as a multiplier so as to output high-order positions in the resulting product as a partial square root value, partial square root value holding means for holding the partial square root value output from said multiplying means, residue shifting means for left-shifting a residue output from said residue holding means by a difference obtained by subtracting a bit length overlapping between the adjacent partial square root values from a bit length of the partial square root value, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, (R+S×T+T) operating means for executing the operation (R+S×T) or the operation (R+S×T+T) by inputting a residue R output by said residue shifting means after shifting, a multiplicand S output from said multiplicand generating means and a multiplier T output from said inverting means, respectively, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with a merged square root value output from said merged square root value holding means, and merged square root value calculation adding means for adding the merged square root value output from said merged square root value holding means and an output of said digit aligning means in order to output a renewed merged square root value, wherein:

in said second and subsequent main circuits, said exponent holding means is connected to said exponent holding means in the preceding main circuit, said residue holding means is connected to said (R+S×T+T) operating means in the preceding main circuit, and said table output information holding means is connected to said table output information holding means in the preceding main circuit, in said second main circuit, said merged square root value holding means is connected to said correcting multiplexer in said first main circuit, and in said third and subsequent main circuit, said merged square root value holding means is connected to said merged square root value calculation adding means in the preceding main circuit, said post-processing unit comprising:

exponent holding means and merged square root value holding means which are connected to said exponent holding means and said merged square root value holding means in said last main circuit of said main unit respectively, in order to synchronize pipeline operations.

6. The square root operation device of claim 5, including individual (R+S×T) operating means in the place of said respective (R+S×T+T) operating means, in order to exclusively execute the operation (R+S×T), and partial square root value calculation adding means at an outputting stage of each of said multiplying means in order to execute a rounding off at a place lower than the least significant bit in the partial square root value by one bit.

7. A square root operation device to find a square root on a fixed-point number input operand, comprising:

normalizing shift count detecting means for finding a shift count when said fixed-point number input operand is bit-normalized in a two bit unit, normalizing means for left-shifting said fixed-point number input operand on the basis of the shift count output from said normalizing shift count detecting means, table information storing means for indexing an approximation of square root's reciprocal by designating high-order bits in an output of said normalizing means as an address, residue holding means for holding a residue when the square root is found by sequentially iterating a fixed number of bits beginning from a high-order position and descending in a downward order, multiplying means for executing a multiplication by inputting the residue output from said residue holding means and the approximation of square root's reciprocal output from said table information storing means, as a multiplicand and a multiplier respectively, merged square root value holding means for holding a merged square root value as a combination of individual partial square root values which are high-order positions in the resulting product output from said multiplying means at each iteration, inverting means for inverting the partial square root value output from said multiplying means at every bit, multiplicand generating means for generating a multiplicand by left-shifting an output of said merged square root value holding means one bit place, with the partial square root value output from said multiplying means, $(R+S\times T+T)$ operating means for executing the operation $(R+S\times T)$ or the operation $(R+S\times T+T)$ by inputting a residue R output from said residue holding means, a multiplicand S output from said multiplicand generating means and a multiplier T output from said inverting means, respectively, shifting means for left-shifting an output of said $(R+S\times T+T)$ operating means by a difference obtained by subtracting a bit length overlapping between the adjacent partial square root values from a bit length of the partial square root value, a holding data switching multiplexer for selecting either the output of said normalizing means or an output of said shifting means, as an input of said residue holding means, constant subtracting means for subtracting 1 from a least significant bit in the partial square root value output from said multiplying means, a correcting multiplexer for selecting either the partial square root value output from said multiplying means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, merged square root value calculation adding means for adding the merged square root value output from said merged square root value holding means and an output of said digit aligning means in order to output a renewed merged square root value, digit adjustment shift count calculating means for calculating a shift count of right-shifting to be carried out to the merged square root value output from said merged square root value calculation adding means on the basis of an output of said normalizing shift count detecting means, in order to obtain a target square root, and digit adjusting means for outputting the target square root by right-shifting the merged square root value output from said merged square root value calculation adding means on the basis of the shift count output from said digit adjustment shift count calculating means.

8. The square root operation device of claim 7, including $(R+S\times T)$ operating means in the place of said $(R+S\times T+T)$ operating means, in order to exclusively execute the operation $(R+S\times T)$, and partial square root value calculation adding means at an outputting stage of said multiplying means in order to execute a rounding off at a place lower than the least significant bit in the partial square root value by one bit.

9. The square root operation device of claim 7, wherein the output of said merged square root value holding means is an input of said digit adjusting means.

10. The square root operation device of claim 9, including $(R+S\times T)$ operating means in the place of said $(R+S\times T+T)$ operating means, in order to exclusively execute the operation of $(R+S\times T)$, and partial square root value calculation adding means at an outputting stage of said multiplying means in order to execute a rounding off at a place lower than the least significant bit in the partial square root value by one bit.

11. A square root operation device to find a square root on a fixed-point number input operand, comprising:

normalizing shift count detecting means for finding a shift count when said fixed-point number input operand is bit-normalized in a two bit unit, normalizing means for left-shifting said fixed-point number input operand on the basis of the shift count output from said normalizing shift count detecting means, table information storing means for indexing an approximation of square root's reciprocal by designating high-order bits in an output of said normalizing means as an address, residue holding means for holding a residue when the square root is found by sequentially iterating a fixed number of bits beginning from a high-order position and descending in a downward order, partial square root value holding means for holding the partial square root value at each iteration, and merged square root value holding means for holding a merged square root value as a combination of the individual partial square root values at each iteration, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, a residue multiplexer for selecting either a constant 0 or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, $(R+S\times T+T)$ operating means for executing the operation $(R+S\times T)$ or the operation $(R+S\times T+T)$ by inputting an output R of said residue multiplexer, an output S of said multiplicand multiplexer and an output T output from said multiplier multiplexer, respectively, shifting means for left-shifting an output of said (R+S×T+T) operating means by a difference obtained by subtracting a bit length overlapping between the adjacent partial square root values from a bit length of the partial square root value, a holding data switching multiplexer for selecting either the output of said normalizing means or an output of said shifting means, as an input of said residue holding means, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, merged square root value calculation adding means for adding the merged square root value output from said merged square root value holding means and an output of said digit aligning means in order to output a renewed merged square root value, digit adjustment shift count calculating means for calculating a shift count of right-shifting to be carried out to the merged square root value output from said merged square root value calculation adding means on the basis of an output of said normalizing shift count detecting means, in order to obtain a target square root, and digit adjusting means for outputting the target square root by right-shifting the merged square root value output from said merged square root value calculation adding means on the basis of the shift count output from said digit adjustment shift count calculating means, wherein high-order positions in the output of said (R+S×T+T) operating means are sequentially held in said partial square root value holding means, as the partial square root value.

12. The square root operation device of claim 11, including (R+S×T) operating means in the place of said (R+S×T+T) operating means, in order to exclusively execute the operation (R+S×T), and partial square root value calculation adding means at an outputting stage of said (R+S×T) operating means in order to execute a rounding off at a place lower than the least significant bit in the partial square root value by one bit.

13. The square root operation device of claim 11, wherein the output of said merged square root value holding means is an input of said digit adjusting means.

14. The square root operation device of claim 13, including (R+S×T) operating means in the place of said (R+S×T+T) operating means, in order to exclusively execute the operation (R+S×T), and partial square root value calculation adding means at an outputting stage of said (R+S×T) operating means in order to execute a rounding off at a place lower than the least significant bit in the partial square root value by one bit.

15. A square root operation device to find a square root vector in the order of element on an input operand in the order of element of a vector comprising a fixed-point number, comprising:

a preprocessing unit for performing a preprocess on said input operand, a main unit provided with first through last main circuits the number of which corresponds to that of iterating processes for repeatedly finding a partial square root value until a bit length of a merged square root value as a combination of the individual partial square root values becomes greater than that of a target square root, and a post-processing unit for performing a post-process on an output of said main unit, said preprocessing unit comprising:

an input register for holding said input operand, normalizing shift count detecting means for finding a shift count when an output of said input register is bit-normalized in a two bit unit, normalizing means for left-shifting the output of said input register on the basis of the shift count output from said normalizing shift count detecting means, normalized operand register for holding an output of said normalizing means, normalizing shift count holding means for holding an output of said normalizing shift count detecting means, table information storing means for indexing an approximation of square root's reciprocal by designating high-order bits in an output of said normalized operand register as an address, said first main circuit in said main unit comprising:

residue holding means, table output information holding means and normalizing shift count holding means which are connected to said normalized operand register, said table information storing means and normalizing shift count holding means in said preprocessing unit respectively, in order to synchronize pipeline operations, multiplying means for executing a multiplication by inputting an output of said residue holding means as a multiplicand and an output of said table output information holding means as a multiplier so as to output high-order positions in the resulting product thus calculated as a partial square root value, partial square root value holding means for holding the partial square root value output from said multiplying means, inverting means for inverting the partial square root value output from said partial square root value holding means at every bit, multiplicand generating means for generating a multiplicand from the partial square root value output from said partial square root value holding means, (R+S×T+T) operating means for executing the operation (R+S×T) or the operation (R+S×T+T) by inputting a residue R output from said residue holding means, a multiplicand S output from said multiplicand generating means and a multiplier T output from said inverting means respectively, shifting means for left-shifting an output from said (R+S×T+T) operating means by a difference obtained by subtracting a bit length overlapping between the adjacent partial square root values from a bit length of the partial square root value, constant subtracting means for subtracting 1 from a least significant bit in the partial square root value output from said partial square root value holding means, and a correcting multiplexer for selecting either the partial square root value output from said partial square root value holding means or an output of said constant subtracting means so as to output the one thus selected as a corrected partial square root value, said second and subsequent main circuits in said main unit each comprising:

residue holding means, merged square root value holding means, table output information holding means and normalizing shift count holding means in order to synchronize pipeline operations, multiplying means for executing a multiplication by inputting an output of said residue holding means as a multiplicand and an output of said table output information holding means as a multiplier so as to output high-order positions in the resulting product as a partial square root value, partial square root value holding means for holding the partial square root value output from said multiplying means, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, $(R+S\times T+T)$ operating means for executing the operation $(R+S\times T)$ or the operation $(R+S\times T+T)$ by inputting a residue R output from said residue holding means, a multiplicand S output from said multiplicand generating means and a multiplier T output from said inverting means, respectively, shifting means for left-shifting an output from said $(R+S\times T+T)$ operating means by a difference obtained by subtracting a bit length overlapping between the adjacent partial square root values from a bit length of the partial square root value, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with a merged square root value output from said merged square root value holding means, and merged square root value calculation adding means for adding the merged square root value output from said merged square root value holding means and an output of said digit aligning means in order to output a renewed merged square root value, wherein:

in said second and subsequent main circuits, said residue holding means is connected to the shifting means in the preceding main circuit, said table output information holding means is connected to said table output information holding means in the preceding main circuit and said normalizing shift count holding means is connected to said normalizing shift count holding means in the preceding main circuit, in said second main circuit, said merged square root value holding means is connected to said correcting multiplexer in said first main circuit, and in said third and subsequent main circuits, said merged square root value holding means is connected to said merged square root value calculation adding means in the preceding main circuits, said post-processing unit comprising:

merged square root value holding means and normalizing shift count holding means which are connected to said merged square root value calculation adding means and said normalizing shift count holding means in said last main circuit in said main unit, respectively, digit adjustment shift count calculating means for calculating a shift count of right-shifting to be carried out to the merged square root value output from said merged square root value calculation adding means on the basis of an output of said normalizing shift count detecting means, in order to obtain a target square root, and digit adjusting means for outputting the target square root by left-shifting the merged square root value output from said merged square root value calculation adding means on the basis of the shift count output from said digit adjustment shift count calculating means.

16. The square root operation device of claim 15, including individual $(R+S\times T)$ operating means in the place of said respective $(R+S\times T+T)$ operating means, in order to exclusively execute the operation $(R+S\times T)$, and partial square root value calculation adding means at an outputting stage of each of said multiplying means in order to execute a rounding off at a place lower than the least significant bit in the partial square root value by one bit.

17. A square root operation device to find a square root on a floating-point number input operand where a base of an exponent is 2, comprising:

exponential constant subtracting means for removing a bias of the exponent of said floating-point number input operand, exponent shifting means for right-shifting an output of said exponential constant subtraction means one bit place, exponential constant adding means for adding the bias of the exponent to an output of said exponent shifting means, normalizing means for left-shifting, when a value of the exponent less the bias is odd, a mantissa in said floating-point number input operand one bit place in order to cause the value of the exponent less the bias to be even, table information storing means for indexing an approximation of square root's reciprocal by designating high-order bits in an output of said normalizing means as an address, residue holding means for holding a residue when the square root is found by sequentially iterating a fixed number of bits beginning from a high-order position and descending in a downward order, multiplying means for executing a multiplication by inputting the residue output from said residue holding means and the approximation of square root's reciprocal output from said table information storing means, as a multiplicand and a multiplier respectively, merged square root value holding means for holding a merged square root value as a combination of individual partial square root values which are high-order positions in the resulting product output from said multiplying means at each iteration, inverting means for inverting the partial square root value output from said multiplying means at each bit, multiplicand generating means for generating a multiplicand by left-shifting an output of said merged square root value holding means one bit place, with the partial square root value output from said multiplying means, (R+S×T+T) operating means for executing the operation (R+S×T) or the operation (R+S×T+T) by inputting a residue R output from said residue holding means, a multiplicand S output from said multiplicand generating means and a multiplier T output from said inverting means, respectively, operation result shifting means for left-shifting an output from said (R+S×T+T) operating means by a difference obtained by subtracting a bit length overlapping between the adjacent partial square root values from a bit length of the partial square root value, a holding data switching multiplexer for selecting either the output of said normalizing means or an output of said operation result shifting means, as an input of said residue holding means, constant subtracting means for subtracting 1 from a least significant bit of the partial square root value output from said multiplying means, a correcting multiplexer for selecting either the partial square root value output from said multiplying means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value.

18. The square root operation device of claim 17, including (R+S×T) operating means in the place of said (R+S×T+T) operating means, in order to exclusively execute the operation of (R+S×T), and partial square root value calculation adding means at an outputting stage of said multiplying means in order to execute a rounding off at a place lower than the least significant bit in the partial square root value by one bit.

19. A square root operation device to find a square root on a floating-point number input operand where a base of an exponent is 2, comprising:

exponential constant subtracting means for removing a bias of the exponent of said floating-point number input operand, exponent shifting means for right-shifting an output of said exponential constant subtracting means one bit place, exponential constant adding means for adding the bias of the exponent to an output of said exponent shifting means, normalizing means for left-shifting, when a value of the exponent less the bias is odd, a mantissa in said floating-point number input operand one bit place in order to cause the value of the exponent less the bias to be even, table information storing means for indexing an approximation of square root's reciprocal by designating high-order bits in an output of said normalizing means as an address, residue holding means for holding a residue when the square root is found by sequentially iterating a fixed number of bits beginning from a high position and descending in a downward order, partial square root value holding means for holding a partial square root value at each iteration, and merged square root value holding means for holding a merged square root value as a combination of the individual partial square root value at each iteration, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, a residue multiplexer for selecting either a constant O or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, (R+S×T+T) operating means for executing the operation (R+S×T) or the operation (R+S×T+T) by inputting an output R of said residue multiplexer, an output S of said multiplicand multiplexer, and an output T of said multiplier multiplexer, respectively, operation result shifting means for left-shifting an output of said (R+S×T+T) operating means by a difference obtained by subtracting a bit length overlapping between the adjacent partial square root values from a bit length of the partial square root value, a holding data switching multiplexer for selecting either the output of said normalizing means or an output of said operation result shifting means, as an input of said residue holding means, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correction multiplexer to be merged with the merged square root value output from said merged square root value holding means, and merged square root value calculation adding means for adding the merged square root value output from said merged square root value holding means to an output of said digit aligning means in order to output a renewed merged square root value, wherein high-order positions in the output of said $(R+S \times T+T)$ operating means are sequentially held in said partial square root value holding means, as the partial square root value.

20. The square root operation device of claim 19, including $(R+S \times T)$ operating means in the place of said $(R+S \times T+T)$ operating means, in order to exclusively execute the operation $(R+S \times T)$, and partial square root value calculation adding means at an outputting stage of said $(R+S \times T)$ operating means in order to execute a rounding off at a place lower than the least significant bit in the partial square root value by one bit.

21. A square root operation device to find a square root vector in the order of element on an input operand in the order of element of a vector comprising a floating-point number where a base of an exponent is 2, comprising:

a preprocessing unit for performing a preprocess on said input operand, a main unit provided with first through last main circuits the number of which corresponds to that of iterating processes for repeatedly finding a partial square root value until a bit length of a merged square root value as a combination of the individual partial square root values becomes greater than that of a target square root, and a post-processing unit for performing a post-process on an output of said main unit, said preprocessing unit comprising:

an input register for holding said input operand, exponential constant subtracting means for removing a bias of the exponent from an exponent part in an output of said input register, exponent holding means for holding an output of said exponential constant subtracting means, normalizing means for left-shifting, when a value of the exponent less the bias is odd, a mantissa part in the output of said input register one bit place in order to cause the value of the exponent less the bias to be even, a normalized operand register for holding an output of said normalizing means, exponent shifting means for right-shifting an output of said exponent holding means one bit place, exponential constant adding means for adding the bias of the exponent to an output of said exponent shifting means, and table information storing means for indexing an approximation of square root's reciprocal by designating high-order bits in an output of said normalized operand register as an address, said first main circuit in said main unit comprising:

exponent holding means, residue holding means and table output information holding means which are connected to said exponential constant adding means, said normalized operand register and said table information storing means in said preprocessing unit respectively, in order to synchronize pipeline operations, multiplying means for executing a multiplication by inputting an output of said residue holding means as a multiplicand and an output of said table output information holding means as a multiplier so as to output high-order positions in the resulting product as a partial square root value, partial square root value holding means for holding the partial square root value output from said multiplying means, inverting means for inverting the partial square root value output from said partial square root value holding means at each bit, multiplicand generating means for generating a multiplicand from the partial square root value output from said partial square root value holding means, $(R+S \times T+T)$ operating means for executing the operation $(R+S \times T)$ or the operation $(R+S \times T+T)$ by inputting a residue R output from said residue holding means, a multiplicand S output from said multiplicand generating means and a multiplier T output from said inverting means, respectively, operation result shifting means for left-shifting an output of said $(R+S \times T+T)$ operating means by a difference obtained by subtracting a bit length overlapping between the adjacent partial square root values from a bit length of the partial square root value, constant subtracting means for subtracting 1 from a least significant bit in the partial square root value output from said partial square root value holding means, and a correcting multiplexer for selecting either the partial square root value output from said partial square root value holding means or an output of said constant subtracting means so as to output the one thus selected as a corrected partial square root value, said second and subsequent main circuits in said main unit each comprising:

exponent holding means, residue holding means, merged square root value holding means and table output information holding means in order to synchronize pipeline operations, multiplying means for executing a multiplication by inputting an output of said residue holding means as a multiplicand and an output of said table output information holding means as a multiplier so as to output high-order positions in the resulting product as the partial square root value, partial square root value holding means for holding the partial square root value output from said multiplying means, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, (R+S×T+T) operating means for executing the operation (R+S×T) or the operation (R+S×T+T) by inputting a residue R output from said residue holding means, a multiplicand S output from said multiplicand generating means and a multiplier T output from said inverting means, respectively, operation result shifting means for left-shifting an output of said (R+S×T+T) operating means by a difference obtained by subtracting a bit length overlapping between the adjacent partial square root values from a bit length of the partial square root value, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with a merged square root value output from said merged square root value holding means, and merged square root value calculation adding means for adding the merged square root value output from said merged square root value holding means and an output of said digit aligning means in order to output a renewed merged square root value, wherein:

in said second and subsequent main circuits, said exponent holding means is connected to said exponent holding means in the preceding main circuit, said residue holding means is connected to said operation result shifting means in the preceding main circuit, and said table output information holding means is connected to said table output information holding means in the preceding main circuit, in said second main circuit, said merged square root value holding means is connected to said correcting multiplexer in said first main circuit, and in said third and subsequent main circuits, said merged square root value holding means is connected to said merged square root value calculation adding means in the preceding main circuit, said post-processing unit comprising:

exponent holding means and merged square root value holding means which are connected to said exponent holding means and said merged square root value holding means in said last main circuit of said main unit respectively in order to synchronize pipeline operations.

22. The square root operation device of claim 21, including individual (R+S×T) operating means in the place of said respective (R+S×T+T) operating means, in order to exclusively execute the operation (R+S×T), and partial square root value calculation adding means at an outputting stage of each of said multiplying means in order to execute a rounding off at a place lower than the least significant bit in the partial square root value by one bit.

23. A square root operation device to find a square root on an input operand which is normalized in a two bit unit comprising:

table information storing means for indexing an approximation of square root's reciprocal by designating high-order bits in said input operand as an address, residue holding means for holding a residue when the square root is found by sequentially iterating a fixed number of bits beginning from a high-order position and descending in a downward order, multiplying means for executing a multiplication by inputting the residue output from said residue holding means and the approximation of square root's reciprocal output from said table information storing means, as a multiplicand and a multiplier respectively, merged square root value holding means for holding a merged square root value as a combination of individual partial square root values which are high-order positions in the resulting product output from said multiplying means at each iteration, inverting means for inverting the partial square root value output from said multiplying means at every bit, multiplicand generating means for generating a multiplicand by left-shifting an output of said merged square root value holding means one bit place, with the partial square root value output from said multiplying means, shifting means for left-shifting the residue output from said residue holding means by a difference obtained by subtracting a bit length overlapping between the adjacent partial square root values from a bit length of the partial square too value, (R+S×T+T) operating means for executing the operation (R+S×T) or the operation (R+S×T+T) by inputting a residue R output by said shifting means after shifting, a multiplicand S output from said multiplicand generating means and a multiplier T output from said inverting means, respectively, a holding data switching multiplexer for selecting either said input operand or an output of said (R+S×T+T) operating means, as an input of said residue holding means, constant subtracting means for subtracting 1 from a least significant bit in the partial square root value output from said multiplying means, a correcting multiplexer for selecting either the partial square root value output from said multiplying means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value.

24. The square root operation device of claim 23, including (R+S×T) operating means in the place of said (R+S×T+T) operating means, in order to exclusively execute the operation of (R+S×T), and partial square root value calculation adding means at an outputting stage of said multiplying means in order to execute a rounding off at a place lower than the least significant bit in the partial square root value by one bit.

25. A square root operation device to find a square root on an input operand which is normalized in a two bit unit, comprising:

table information storing means for indexing an approximation of square root's reciprocal by designating high-order bits in said input operand as an address, residue holding means for holding a residue when the square root is found by sequentially iterating a fixed number of bits beginning from a high-order position and descending in a downward order, partial square root value holding means for holding a partial square root value at each iteration, and merged square root value holding means for holding a merged square root value as a combination of the individual partial square root values at each iteration, shifting means for left-shifting the residue output from said residue holding means by a difference obtained by subtracting a bit length overlapping between the adjacent partial square root values from a bit length of the partial square root value, inverting means for inverting the partial square root value output from said partial square root value holding means at every bit, multiplicand generating means for generating a multiplicand by left-shifting an output of said merged square root value holding means one bit place, with the partial square root value output from said partial square root value holding means, a residue multiplexer for selecting either a constant 0 or a residue output by said shifting means after shifting, a multiplicand multiplexer for selecting either the residue output from said residue holding means or an output of said multiplicand generating means, a multiplier multiplexer for selecting either the approximation of square root's reciprocal output from said table information storing means or an output of said inverting means, (R+S×T+T) operating means for executing the operation (R+S×T) or the operation (R+S×T+T) by inputting an output R of said residue multiplexer, an output S of said multiplicand multiplexer, and an output T of said multiplier multiplexer, respectively, a holding data switching multiplexer for selecting either said input operand or an output of said (R+S×T+T) operating means, as an input of said residue holding means, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value, wherein high-order positions in the output of said (R+S×T+T) operating means are sequentially held in said partial square root value holding means, as the partial square root value.

26. The square root operation device of claim 25, including (R+S×T) operating means in the place of said (R+S×T+T) operating means, in order to exclusively execute the operation of (R+S×T), and partial square root value calculation adding means and an outputting stage of said (R+S×T) operating means in order to execute a rounding off at a place lower than the least significant bit in the partial square root value by one bit.

27. A square root operation device to find a square root on an input operand which is normalized in a two bit unit, comprising:

table information storing means for indexing an approximation of square root's reciprocal by designating high-order bits in said input operand as an address, residue holding means for holding a residue when the square root is found by sequentially iterating a fixed number of bits beginning from a high-order position and descending in a downward order, multiplying means for executing a multiplication by inputting the residue output from said residue holding means and the approximation of square root's reciprocal output from said table information storing means, as a multiplicand and a multiplier respectively, merged square root value holding means for holding a merged square root value as a combination of individual partial square root values which are high-order positions in the resulting product output from said multiplying means at each iteration, inverting means for inverting the partial square root value output from said multiplying means at every bit, multiplicand generating means for generating a multiplicand by left-shifting an output of said merged square root value holding means one bit place, with the partial square root value output from said multiplying means, (R+S×T+T) operating means for executing the operation (R+S×T) or the operation (R+S×T+T) by inputting a residue R output from said residue holding means, a multiplicand S output from said multiplicand generating means, and a multiplier T output from said inverting means, respectively, shifting means for left-shifting an output of said (R+S×T+T) operating means by a difference obtained by subtracting a bit length overlapping between the adjacent partial square root values from a bit length of the partial square root value, a holding data switching multiplexer for selecting either said input operand or an output of said shifting means, as an input of said residue holding means, constant subtracting means for subtracting 1 from a least significant bit in the partial square root value output from said multiplying means, a correcting multiplexer for selecting either the partial square root value output from said multiplying means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value.

28. The square root operation device of claim 27, including (R+S×T) operating means in the place of said (R+S×T+T) operating means, in order to exclusively execute the operation (R+S×T), and partial square root value calculation adding means at an outputting stage of said multiplying means in order to execute a rounding off at a place lower than the least significant bit in the partial square root value by one bit.

29. A square root operation device to find a square root on an input operand which is normalized in a two bit unit, comprising:

table information storing means for indexing an approximation of square root's reciprocal by designating high-order bits in said input operand as an address, residue holding means for holding a residue when the square root is found by sequentially iterating a fixed number of bits beginning from a high-order position and descending in a downward order, partial square root value holding means for holding a partial square root value at each iteration, and merged square root value holding means for holding a merged square root value as a combination of the individual partial square root values at each iteration, inverting means for inverting the partial square root value output from said partial square root value holding means at every bit, multiplicand generating means for generating a multiplicand by left-shifting an output of said merged square root value holding means one bit place, with the partial square root value output form said partial square root value holding means, a residue multiplexer for selecting either a constant 0 or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, (R+S×T+T) operating means for executing the operation (R+S×T) or the operation (R+S×T+T) by inputting an output R of said residue multiplexer, an output S of said multiplicand multiplexer, and an output T of said multiplier multiplexer, respectively, shifting means for left-shifting an output of said (R+S×T+T) operating means by a difference obtained by subtracting a bit length overlapping between the adjacent partial square root values from a bit length of the partial square root value, a holding data switching multiplexer for selecting either said input operand or an output of said shifting means, as an input of said residue holding means, constant subtracting means for subtracting 1 from a least significant bit in the partial square root value output from said partial square root value holding means, a correcting multiplexer for selecting either the partial square root value output from said partial square root value holding means or an output of said constant subtracting means so as to output the one thus selected as a corrected partial square root value, digit aligning means for carrying out a digit adjustment to enable the corrected partial square root value output from said correcting multiplexer to be merged with the merged square root value output from said merged square root value holding means, and merged square root value calculation adding means for adding the merged square root value output from said merged square root value holding means and an output of said digit aligning means in order to output a renewed merged square root value, wherein high-order positions in the output of said (R+S×T+T) operating means are sequentially held in said partial square root value holding means, as the partial square root value.

30. The square root operation device of claim 29, including (R+S×T) operating means in the place of said (R+S×T+T) operating means, in order to exclusively execute the operation (R+S×T), and partial square root value calculation adding means at an outputting stage of said (R+S×T) operating means in order to execute a rounding off at a place lower than the least significant bit in the partial square root value by one bit.

* * * * *